United States Patent
Zhu et al.

(10) Patent No.: US 12,335,172 B2
(45) Date of Patent: Jun. 17, 2025

(54) METHOD AND APPARATUS FOR BEAM MANAGEMENT, MEASUREMENT AND REPORTING FOR INTER-CELL OPERATION

(71) Applicant: Samsung Electronics Co., Ltd., Suwon-si (KR)

(72) Inventors: Dalin Zhu, Richardson, TX (US); Md. Saifur Rahman, Plano, TX (US); Eko Onggosanusi, Coppell, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 17/581,714

(22) Filed: Jan. 21, 2022

(65) Prior Publication Data

US 2022/0239423 A1  Jul. 28, 2022

Related U.S. Application Data

(60) Provisional application No. 63/300,916, filed on Jan. 19, 2022, provisional application No. 63/285,342, filed on Dec. 2, 2021, provisional application No. 63/275,282, filed on Nov. 3, 2021, provisional application No. 63/254,864, filed on Oct. 12, 2021, provisional application No. 63/244,587, filed on Sep.
(Continued)

(51) Int. Cl.
*H04L 5/00* (2006.01)

(52) U.S. Cl.
CPC .......... *H04L 5/0032* (2013.01); *H04L 5/0048* (2013.01); *H04L 5/0053* (2013.01)

(58) Field of Classification Search
CPC ... H04L 5/0032; H04L 5/0048; H04L 5/0053; H04L 5/0094
See application file for complete search history.

(56) References Cited

U.S. PATENT DOCUMENTS

| | | | |
|---|---|---|---|
| 2021/0168779 A1* | 6/2021 | Mondal | H04B 7/0874 |
| 2021/0399784 A1* | 12/2021 | Deghel | H04W 72/21 |
| 2022/0045893 A1 | 2/2022 | Yamada et al. | |

FOREIGN PATENT DOCUMENTS

| | | |
|---|---|---|
| JP | 2020-107950 A | 7/2020 |
| WO | 2020144637 A1 | 7/2020 |

OTHER PUBLICATIONS

International Search Report and Written Opinion issued May 19, 2022 regarding Application No. PCT/KR2022/001325, 7 pages.
(Continued)

*Primary Examiner* — Jianye Wu

(57) ABSTRACT

Methods and apparatuses for beam management, measurement and reporting for inter-cell operation in a wireless communication system. A method for operating a user equipment (UE) includes receiving a configuration for inter-cell operation, receiving a transmission configuration indication (TCI) state for a channel or a reference signal (RS), receiving information for configuring a TCI state group, and receiving an indication for associating the TCI state group with a physical cell identity (PCI). The method further includes determining, based on the information and the indication, an association between the TCI state and a PCI and determining, based on the TCI state and the association, a receive filter for reception of the channel or the RS.

20 Claims, 19 Drawing Sheets

Related U.S. Application Data 15, 2021, provisional application No. 63/142,351, filed on Jan. 27, 2021, provisional application No. 63/141,261, filed on Jan. 25, 2021.

(56) References Cited

OTHER PUBLICATIONS

Vivo, "Further discussion on multi beam enhancement", 3GPP TSG RAN WG1 #104-e, R1-2100421, Jan. 2021, 29 pages.
Ericsson, "Enhancements on Multi-beam Operation", 3GPP TSG-RAN WG1 Meeting #104-e, R1-2101313, Jan. 2021, 22 pages.
"3rd Generation Partnership Project; Technical Specification Group Radio Access Network; NR; Radio Resource Control (RRC) protocol specification (Release 16)", 3GPP TS 38.331 V16.3.1, Jan. 2021, 932 pages.
Extended European Search Report issued May 6, 2024 regarding Application No. 22742921.4, 8 pages.
Lenovo et al., "Enhancements on Multi-TRP inter-cell operation", 3GPP TSG RAN WG1#104-e, R1-2100275, Jan. 2021, 5 pages.
NTT Docomo, Inc, "Discussion on beam management for MTRP", 3GPP TSG RAN WG1 #104-e, R1-2101600, Jan. 2021, 8 pages.
"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.
"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.
"LTE; Evolved Universal Terrestrial Radio Access (E-UTRA); Physical layer procedures (3GPP TS 36.213 version 16.4.0 Release 16)", ETSI TS 136 213 V16.4.0, Feb. 2021, 577 pages.
"LTE; Evolved Universal Terrestrial Radio Access (E-UTRA); Medium Access Control (MAC) protocol specification 3GPP TS 36.321 version 16.4.0 Release 16)", ETSI TS 136 321 V16.4.0, Apr. 2021, 144 pages.
"LTE; Evolved Universal Terrestrial Radio Access (E-UTRA); Radio Resource Control (RRC); Protocol specification (3GPP TS 36.331 version 16.4.0 Release 16)", ETSI TS 136 331 V16.4.0, Apr. 2021, 1093 pages.
"5G; NR; Physical channels and modulation (3GPP TS 38.211 version 16.4.0 Release 16)", ETSI TS 138 211 V16.4.0, Jan. 2021, 137 pages.
"5G; NR; Multiplexing and channel coding (3GPP TS 38.212 version 16.4.0 Release 16)", ETSI TS 138 212 V16.4.0, Jan. 2021, 155 pages.
"5G; NR; Physical layer procedures for control (3GPP TS 38.213 version 16.4.0 Release 16)", ETSI TS 138 213 V16.4.0, Jan. 2021, 185 pages.
"5G; NR; Physical layer procedures for data (3GPP TS 38.214 version 16.4.0 Release 16)", ETSI TS 138 214 V16.4.0, Jan. 2021, 173 pages.
"5G; NR; Physical layer measurements (3GPP TS 38.215 version 16.4.0 Release 16)", ETSI TS 138 215 V16.4.0, Jan. 2021, 31 pages.
"5G; NR; Medium Access Control (MAC) protocol specification (3GPP TS 38.321 version 16.4.0 Release 16)", ETSI TS 138 321 V16.4.0, Apr. 2021, 159 pages.
"5G; NR; Radio Resource Control (RRC); Protocol specification (3GPP TS 38.331 version 16.4.1 Release 16)", ETSI TS 138 331 V16.4.1, Apr. 2021, 932 pages.
"3rd Generation Partnership Project; Technical Specification Group Radio Access Network; NR; Requirements for support of radio resource management (Release 17)", 3GPP TS 38.133 V17.0.0, Dec. 2020, 1812 pages.

\* cited by examiner

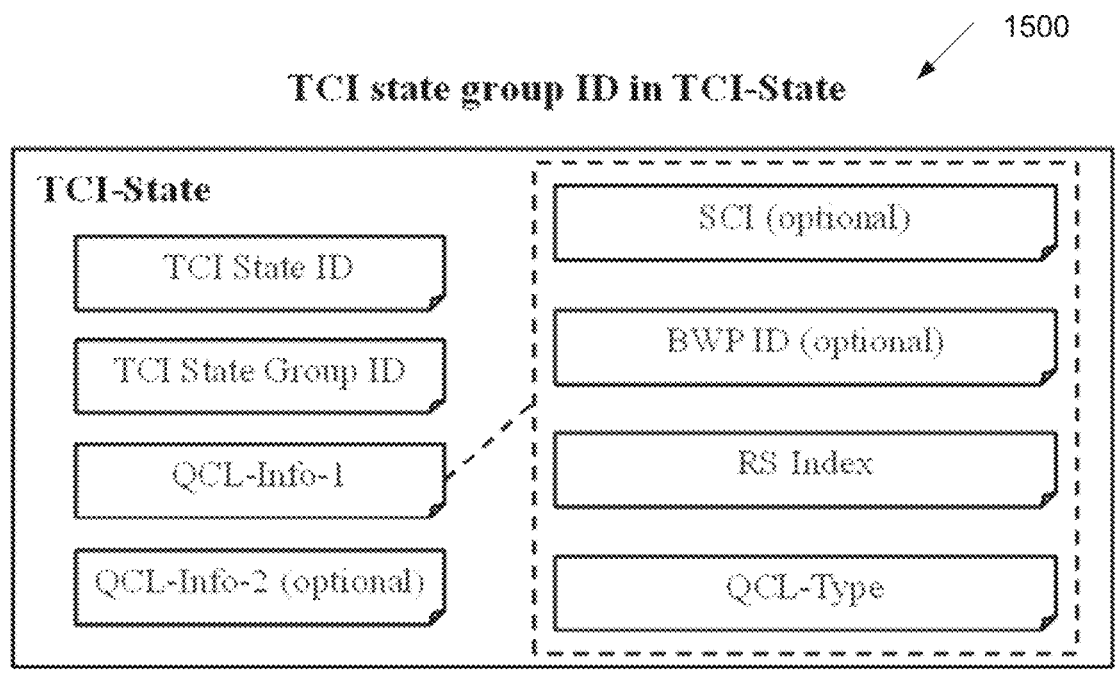
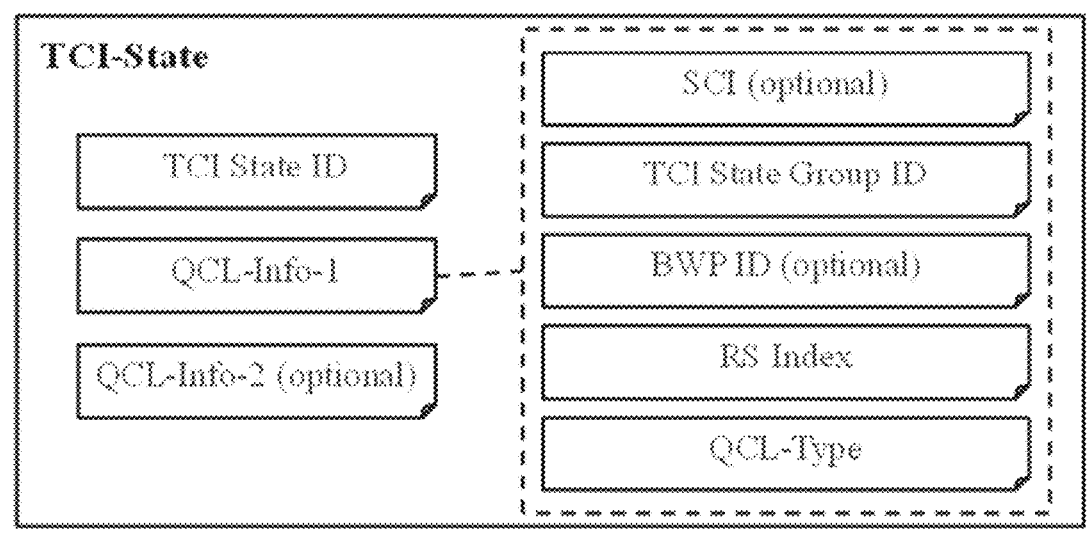
FIG. 15A
FIG. 15B

| Serving/non-serving cell PCIs | TCI states | | | | | | | | | | |
|---|---|---|---|---|---|---|---|---|---|---|---|
| | TCI state group | | | TCI state group | | | TCI state group | | | TCI state group | |
| Serving cell PCI #x_0 | TCI state ID #x_0(0) | TCI state ID #x_0(1) | ... | TCI state ID #x_0(N−1) | | | | | | | |
| Non-serving cell PCI #x_1 | | | | | TCI state ID #x_1(0) | TCI state ID #x_1(1) | ... | TCI state ID #x_1(M−1) | | | |
| Non-serving cell PCI #x_2 | | | | | | | | | TCI state ID #x_2(0) | TCI state ID #x_2(1) | ... TCI state ID #x_2(K−1) |
| ⋮ | | | | | | | | | | | |
| Non-serving cell PCI #x_Nnsc | | | | | | | | | | | TCI state ID #x_Nnsc(0) TCI state ID #x_Nnsc(1) ... TCI state ID #x_Nnsc(L−1) |

| Serving/non-serving cell PCIs | Local RS IDs in serving/non-serving cell PCIs | Global RS IDs in TCI states | TCI states |
|---|---|---|---|
| Serving cell PCI #x_0 | RS-ID #0 | RS ID #x_0(0) | TCI state ID #x_0(0) |
| | RS-ID #1 | RS ID #x_0(1) | TCI state ID #x_0(1) |
| | ⋮ | ⋮ | ⋮ |
| | RS-ID #Msc−1 | RS ID #x_0(N−1) | TCI state ID #x_0(N−1) |
| Non-serving cell PCI #x_1 | RS-ID #0 | RS ID #x_1(0) | TCI state ID #x_1(0) |
| | RS-ID #1 | RS ID #x_1(1) | TCI state ID #x_1(1) |
| | ⋮ | ⋮ | ⋮ |
| | RS-ID #Mnsc−1 | RS #x_1(M−1) | TCI state ID #x_1(M−1) |

The last N rows of the first group and M rows of the second group form TCI state groups.

METHOD AND APPARATUS FOR BEAM MANAGEMENT, MEASUREMENT AND REPORTING FOR INTER-CELL OPERATION

CROSS-REFERENCE TO RELATED APPLICATIONS AND CLAIM OF PRIORITY

The present application claims priority to: U.S. Provisional Patent Application No. 63/141,261, filed on Jan. 25, 2021; U.S. Provisional Patent Application No. 63/142,351, filed on Jan. 27, 2021; U.S. Provisional Patent Application No. 63/244,587, filed on Sep. 15, 2021; U.S. Provisional Patent Application No. 63/254,864, filed on Oct. 12, 2021; U.S. Provisional Patent Application No. 63/275,282, filed on Nov. 3, 2021; U.S. Provisional Patent Application No. 63/285,342, filed on Dec. 2, 2021; and U.S. Provisional Patent Application No. 63/300,916, filed on Jan. 19, 2022. The content of the above-identified patent document is incorporated herein by reference.

TECHNICAL FIELD

The present disclosure relates generally to wireless communication systems and, more specifically, the present disclosure relates to beam management, measurement and reporting for inter-cell operation in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to beam management, measurement and reporting for inter-cell operation in a wireless communication system.

In one embodiment, a user equipment (UE) is provided. The UE includes a transceiver configured to receive a configuration for inter-cell operation; a transmission configuration indication (TCI) state for a channel or a reference signal (RS); information for configuring a TCI state group; and an indication for associating the TCI state group with a physical cell identity (PCI). The UE further includes a processor operably coupled to the transceiver. The processor is configured to determine, based on the information and the indication, an association between the TCI state and a PCI and determine, based on the TCI state and the association, a receive filter for reception of the channel or the RS.

In another embodiment, a base station (BS) is provided. The BS includes a transceiver configured to transmit, to a UE: a configuration for inter-cell operation; a TCI state for a channel or a RS; information for configuring a TCI state group; and an indication for associating the TCI state group with a PCI. The information and the indication indicates an association between the TCI state and a PCI. The TCI state and the association indicates a receive filter for reception of the channel or the RS.

In yet another embodiment, a method for operating a UE is provided. The method includes receiving a configuration for inter-cell operation; receiving a TCI state for a channel or a RS; receiving information for configuring a TCI state group; and receiving an indication for associating the TCI state group with a PCI. The method further includes determining, based on the information and the indication, an association between the TCI state and a PCI and determining, based on the TCI state and the association, a receive filter for reception of the channel or the RS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 15A illustrates an example of indicating TCI state group ID/index in TCI-State and QCL-Info according to embodiments of the present disclosure;

FIG. 15B illustrates an example of a MAC CE command indicating a TCI state group comprising one or more TCI states according to embodiments of the present disclosure;

FIG. 16B illustrates another example of TCI state grouping for inter-cell operation according to embodiments of the present disclosure; and FIG. 17 illustrates an example of TCI state grouping based on QCL source RS IDs according to embodiments of the present disclosure.

DETAILED DESCRIPTION

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v16.4.0, "NR; Physical channels and modulation"; 3GPP TS 36.212 v16.4.0, "NR; Multiplexing and Channel coding"; 3GPP TS 36.213 v16.4.0, "NR; Physical Layer Procedures for Control"; 3GPP TS 36.321 v16.4.0, "E-UTRA, Medium Access Control (MAC) protocol specification"; 3GPP TS 36.331 v16.4.0, "E-UTRA, Radio Resource Control (RRC) Protocol Specification"; 3GPP TS 38.211 v16.4.0, "NR, Physical channels and modulation"; 3GPP TS 38.212 v16.4.0, "NR, Multiplexing and Channel coding"; 3GPP TS 38.213 v16.4.0, "NR, Physical Layer Procedures for Control"; 3GPP TS 38.214 v16.4.0, "NR; Physical Layer Procedures for Data"; 3GPP TS 38.215 v16.4.0, "NR, Physical Layer Measurements"; 3GPP TS 38.321 v16.4.0, "NR; Medium Access Control (MAC) protocol specification"; and 3GPP TS 38.331 v16.4.1, "NR; Radio Resource Control (RRC) Protocol Specification"; and 3GPP TS 38.133 v17.0.0, "NR, Requirements for support of radio resource management."

Figure 1:
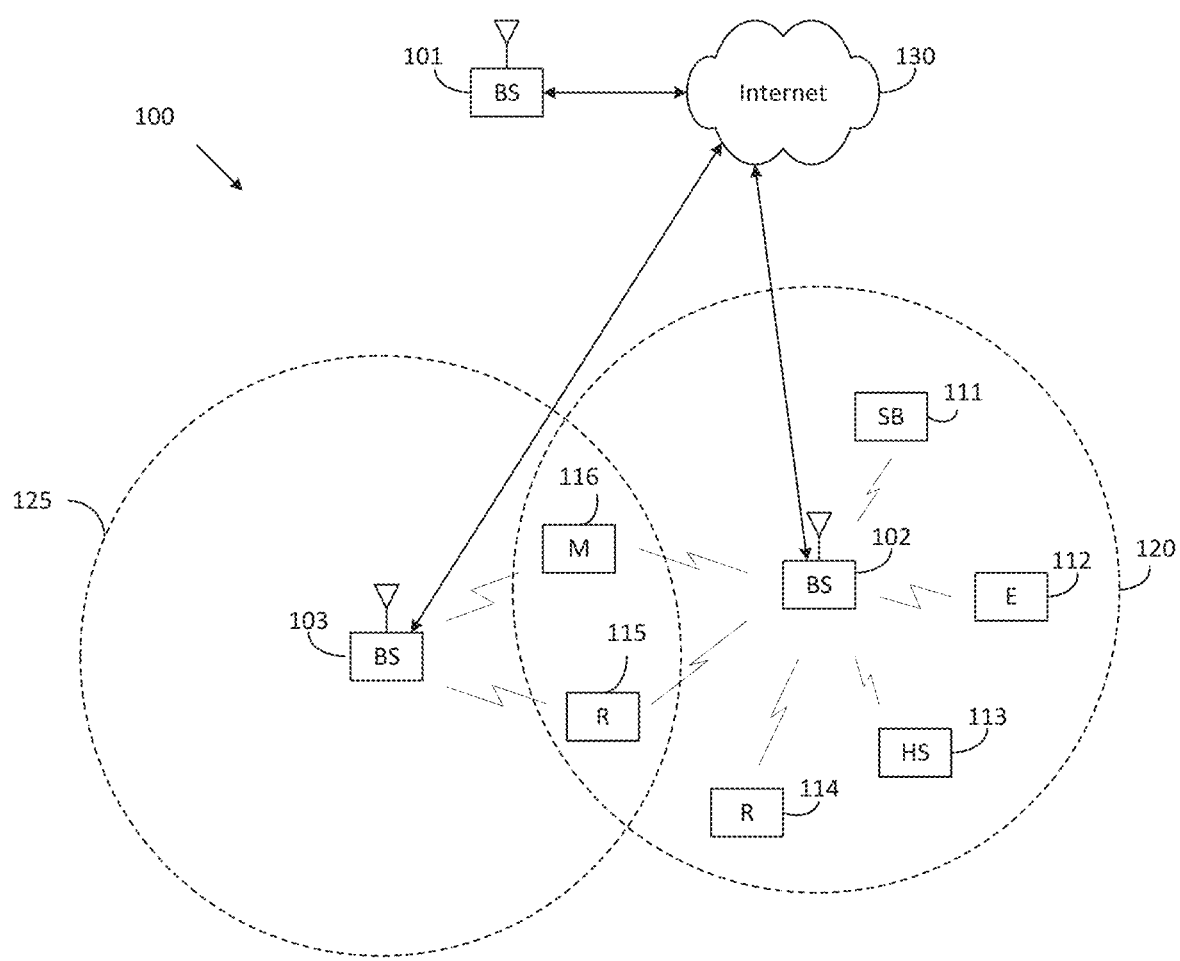
FIG. 1 illustrates an example of wireless network according to embodiments of the present disclosure.
Figure 2:
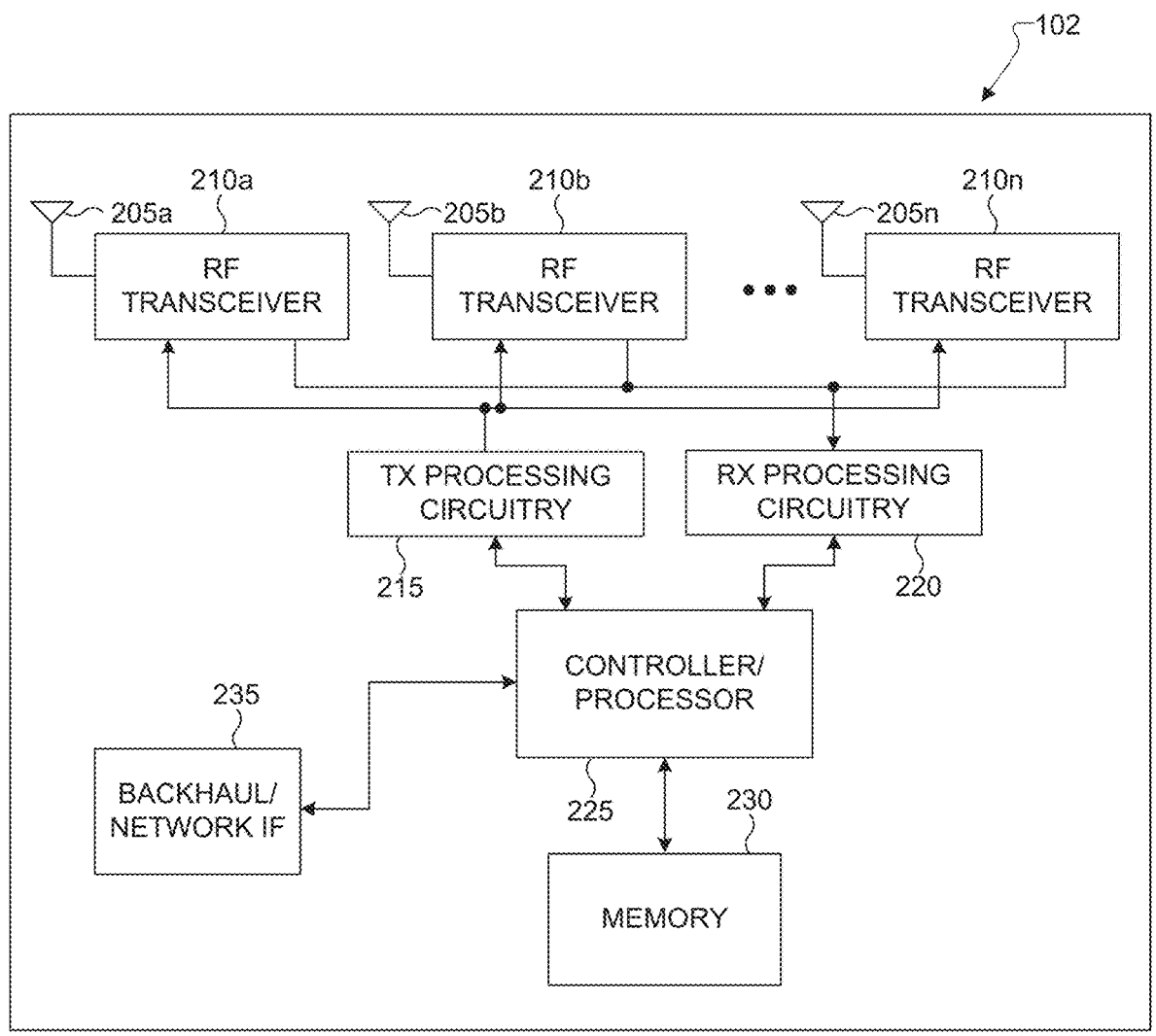
FIG. 2 illustrates an example of gNB according to embodiments of the present disclosure.
Figure 3:
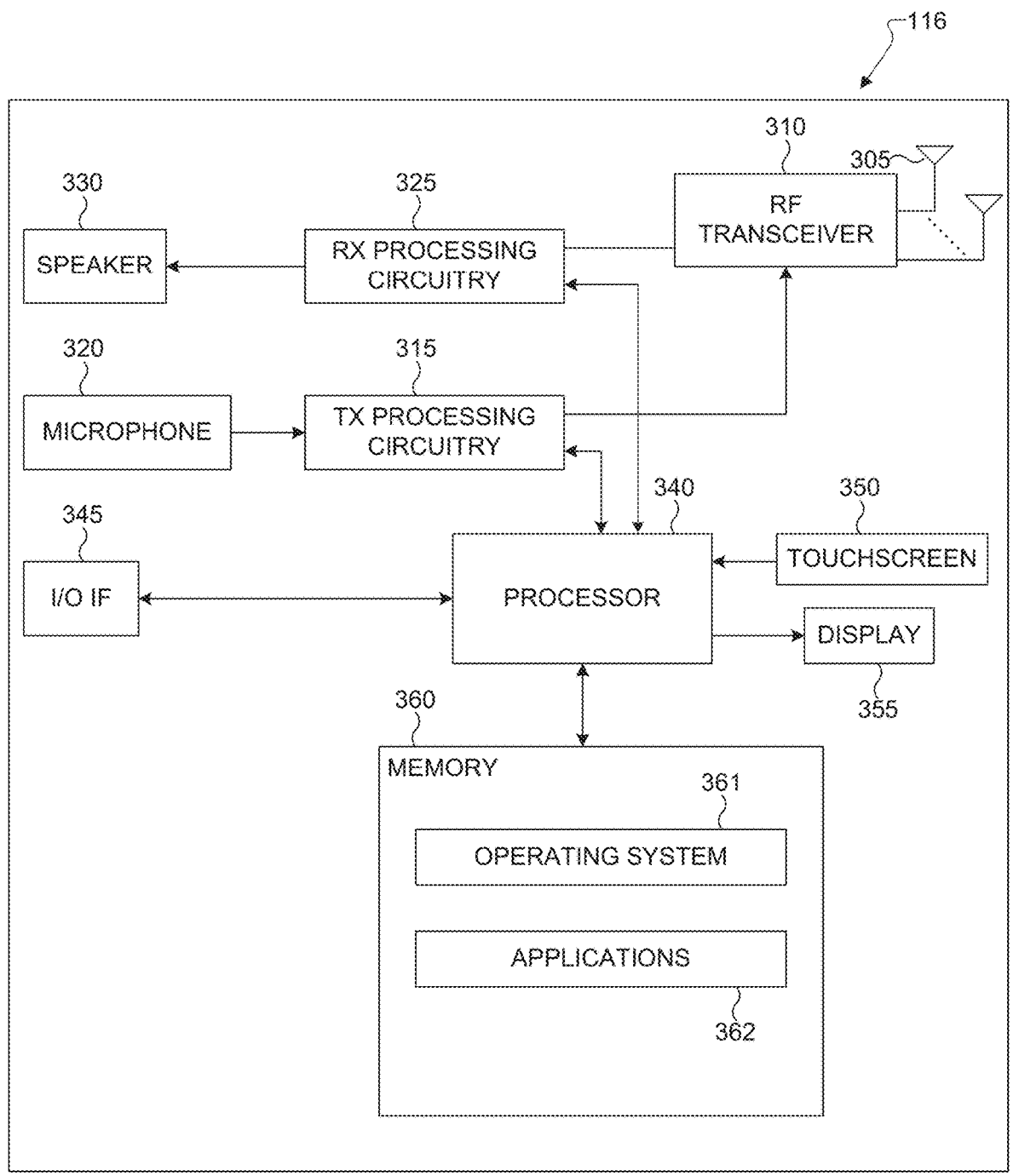
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11 a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for beam management and reporting for inter-cell mobility in a wireless communication system. In certain embodiments, and one or more of the gNBs 101-103 includes circuitry, programing, or a combination thereof, for beam management and reporting for inter-cell mobility in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support beam management and reporting for inter-cell mobility in a wireless communication system. Another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management and reporting for inter-cell mobility in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4A:
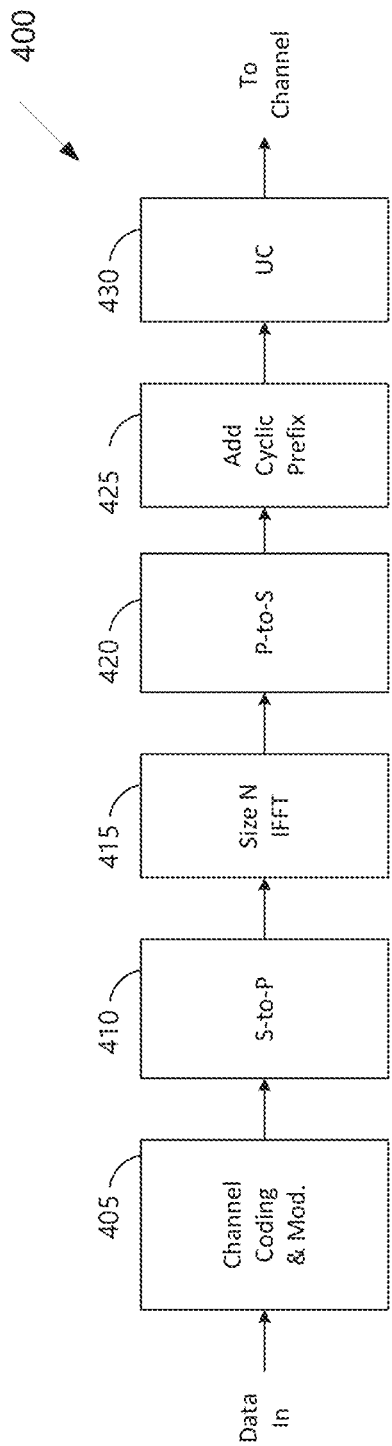
FIGS. 4A and 4B illustrate example of wireless transmit and receive paths according to this disclosure.
Figure 4B:
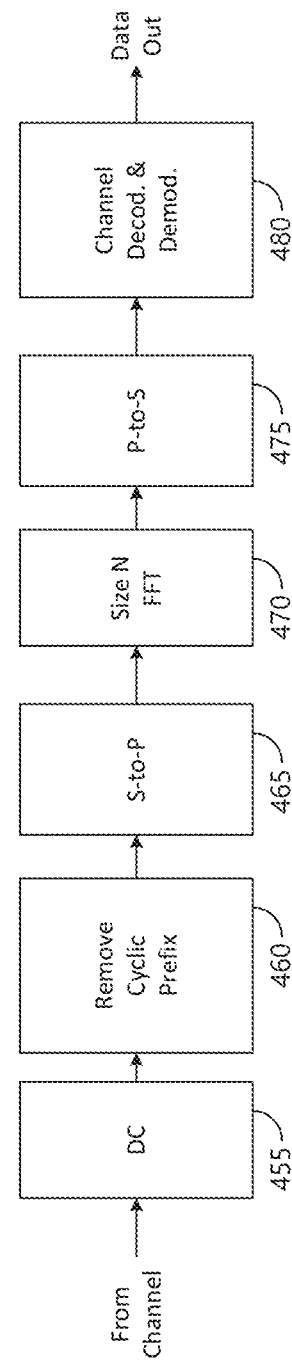

FIGS. 4A and 4B illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

Figure 5:
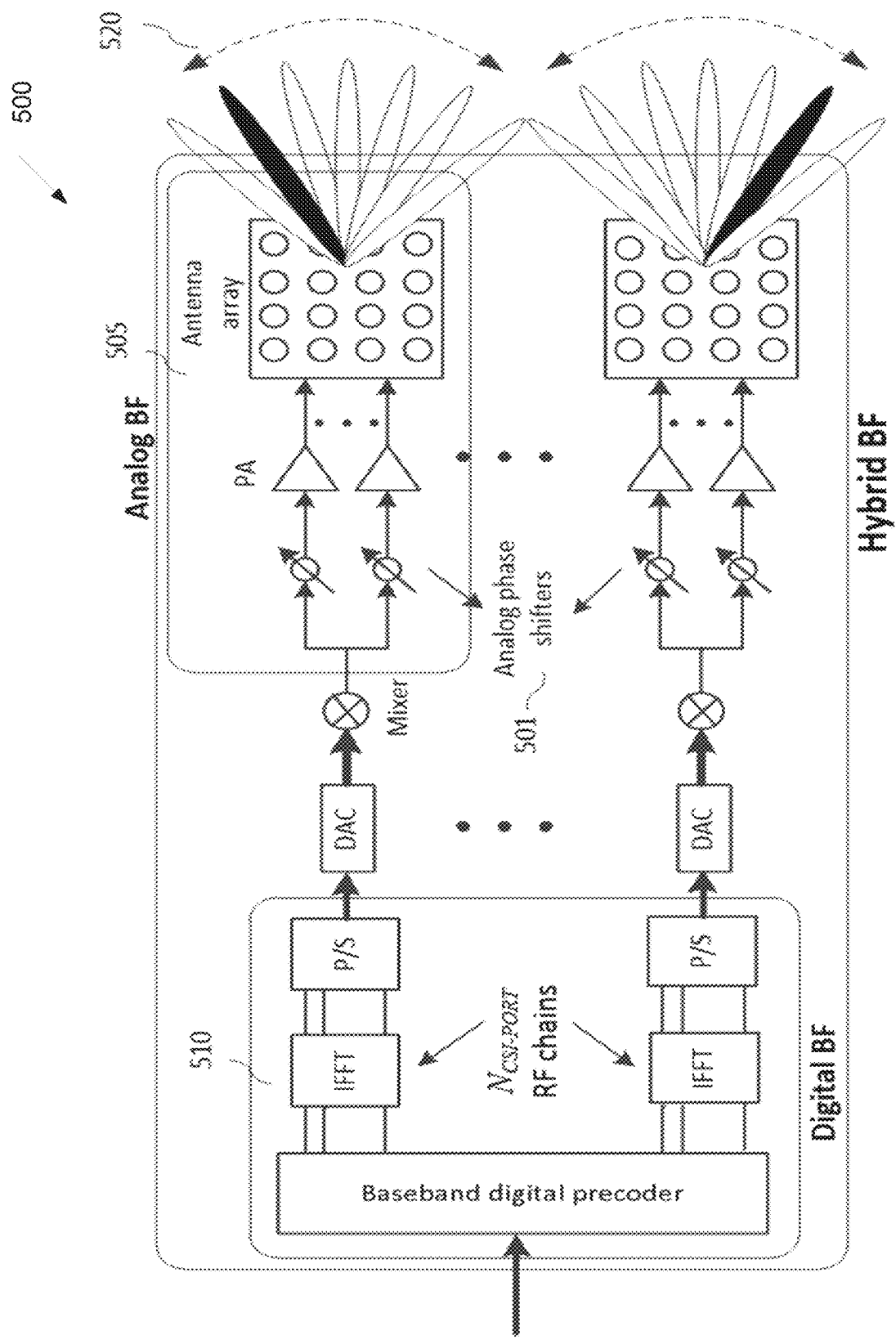
FIG. 5 illustrate an example of beamforming antenna structure according to embodiments of the present disclosure.

The transmit path 400 as illustrated in FIG. 4A includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4A, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time domain signals. The size N FFT block 470 performs an FFT algorithm to generate N parallel frequency-domain signals. The parallel-to-serial block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 as illustrated in FIG. 4A that is analogous to transmitting in the downlink to UEs 111-116 and may implement a receive path 450 as illustrated in FIG. 4B that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4A and FIG. 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4A and FIG. 4B illustrate examples of wireless transmit and receive paths, various changes may be made to FIG. 4A and FIG. 4B. For example, various components in FIG. 4A and FIG. 4B can be combined, further subdivided, or omitted and additional components can be added according to particular needs. Also, FIG. 4A and FIG. 4B are meant to illustrate examples of the types of transmit and receive paths that can be used in a wireless network. Any other suitable architectures can be used to support wireless communications in a wireless network.

In a wireless communications system, a UE could communicate with a large number of remote radio heads (RRHs), distributed within a certain area. Each RRH could be equipped with an antenna array having a certain number of antenna elements. One or more RRHs could be connected through a single baseband processing unit such that signals received at different RRHs could be processed in a centralized manner.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 5.

FIG. 5 illustrate an example of beamforming antenna structure 500 according to embodiments of the present disclosure. An embodiment of the beamforming antenna structure 500 (e.g., receive path as shown in FIGS. 4A and 4B) shown in FIG. 5 is for illustration only.

In this case, one CSI-RS port is mapped onto a large number of antenna elements which can be controlled by a bank of analog phase shifters 501. One CSI-RS port can then correspond to one sub-array which produces a narrow analog beam through analog beamforming 505. This analog beam can be configured to sweep across a wider range of angles (520) by varying the phase shifter bank across symbols or subframes. The number of sub-arrays (equal to the number of RF chains) is the same as the number of CSI-RS ports $N_{CSI-PORT}$. A digital beamforming unit 510 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting," respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

In 3GPP LTE and NR (new radio access or interface), network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring (or non-serving cells) cells by attempting to detect their synchronization signals and/or measuring the associated cell-specific RSs (for instance, by measuring their RSRPs). For next generation cellular systems, efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE. In this case, seamless mobility is a desirable feature. Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or instead, agnostic to beamforming architecture) is desirable.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 5) is used or not. Third, different frequency bands and use cases impose different coverage limitations. For example, mmWave bands impose large propagation losses. Therefore, some form of coverage enhancement scheme is needed. Several candidates include beam sweeping (cf. FIG. 5), repetition, diversity, and/or multi-TRP transmission. For mMTC where transmission bandwidth is small, time-domain repetition is needed to ensure sufficient coverage.

A prerequisite to seamless access is significant reduction of higher-layer procedures for UEs which are already connected to the network. For instance, the existence of cell boundaries (or in general the notion of cells) necessitates RRC (L3) reconfiguration as a UE moves from one cell to another (i.e., inter-cell mobility). For heterogeneous networks with closed subscriber groups, additional overhead associated with higher layer procedures may further tax the system. This can be achieved by relaxing the cell boundaries thereby creating a large "super-cell" wherein a large number of UEs can roam. In this case, high capacity MIMO transmission (especially MU-MIMO) becomes more prevalent. While this presents an opportunity to increase system capacity (measured in terms of the number of sustainable UEs), it requires a streamlined MIMO design. This poses a challenge if applied in the current system.

Therefore, there is a need for an access, radio resource, and mobility management framework which facilitates seamless access by reducing the amount of higher layer procedures. In addition, there is also a need for a streamlined MIMO design that facilitates high capacity MIMO transmission.

In Rel.15 NR, multi-beam operation is designed primarily for single transmit-receive point (TRP) and single antenna panel. Therefore, the specification supports a beam indication for one TX beam wherein a TX beam is associated with a reference RS. For a DL beam indication and measurement, the reference RS can be NZP (non-zero power) CSI-RS and/or SSB (synchronization signal block, which includes primary synchronization signal, secondary synchronization signal, and PBCH). Here, a DL beam indication is done via the transmission configuration indicator (TCI) field in DL-related DCI which includes an index to one (and only one) assigned reference RS. A set of hypotheses or the so-called TCI states is configured via higher-layer (RRC) signaling and, when applicable, a subset of those TCI states is selected/activated via MAC CE for the TCI field code points. For a UL beam indication and measurement, the reference RS can be NZP CSI-RS, SSB, and/or SRS. Here, a UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

In Rel.15/16 NR, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, Rel.15/16 beam management becomes cumbersome and is unlikely able to keep up with more aggressive use cases which require large number of beams and fast beam switching (e.g., higher frequency bands, high mobility, and/or larger number of narrower analog beams). In addition, Rel.15/16 was designed to accommodate a number of unknown or rudimentary capabilities (e.g., UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of PDSCH (since RRC signaling consumes PDSCH resources).

In Rel. 15/16 NR, the handover procedure to handle inter-cell mobility, similar to LTE, and relies heavily on RRC (and even higher layer) reconfigurations to update cell-specific parameters. This reconfigurations usually are slow, and incur large latency (up to several milliseconds). For high mobility UEs, this issue gets worse due to the need for more frequency handovers, hence more frequency RRC reconfigurations.

For high mobility UEs in FR2, the two latency issues mentioned above, one with the hierarchical NW structure (with visible cell boundaries) and the other with the beam management, compound together and make the latency issue much worse, and lead to frequent radio link failures (RLFs). Therefore, there is a need for solutions/mechanisms which can reduce RLFs for high mobility UEs in FR2. One such solution/mechanism, namely, beam management for inter-cell mobility, is provided in the present disclosure.

In the present disclosure, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with one another, or can operate as standalone schemes.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of DL or UL TX beam, such as direction, precoding/beamforming, number of ports, etc. For instance, as the UE receives a reference RS index/ID in a DL assigned represented by a TCI state, the UE applies the known characteristics of the reference RS to the assigned DL transmission. The reference RS can be received and measured by the UE (in this case, the reference RS is a downlink signal such as NZP CSI-RS and/or SSB) with the result of the measurement used for calculating a beam report (in Rel.15 NR, at least one L1-RSRP accompanied by at least one CRI). As the NW/gNB receives the beam report, the NW can be better equipped with information to assign a particular DL TX beam to the UE. Optionally, the reference RS can be transmitted by the UE (in this case, the reference RS is a downlink signal such as SRS). As the NW/gNB receives the reference RS, the NW/gNB can measure and calculate the needed information to assign a particular DL TX beam to the UE. This option is applicable when DL-UL beam pair correspondence holds.

The reference RS can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

The following embodiment is an example of DL multi-beam operation that utilizes a DL beam indication after the network (NW) receives some transmission from the UE. In the first example embodiment, aperiodic CSI-RS is transmitted by the NW and measured by the UE. Although aperiodic RS is used in these two examples, periodic or semi-persistent RS can also be used.

For mmWave (or FR2) or higher frequency bands (such as >52.6 GHz or FR4) where multi-beam operation is especially relevant, transmission-reception process includes the receiver to select a receive (RX) beam for a given TX beam. For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam.

As a result, a TX-RX beam pair is derived. The NW/gNB can perform this operation for all the configured reference RSs (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

In the present disclosure, the term "resource indicator," also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

Figure 6:
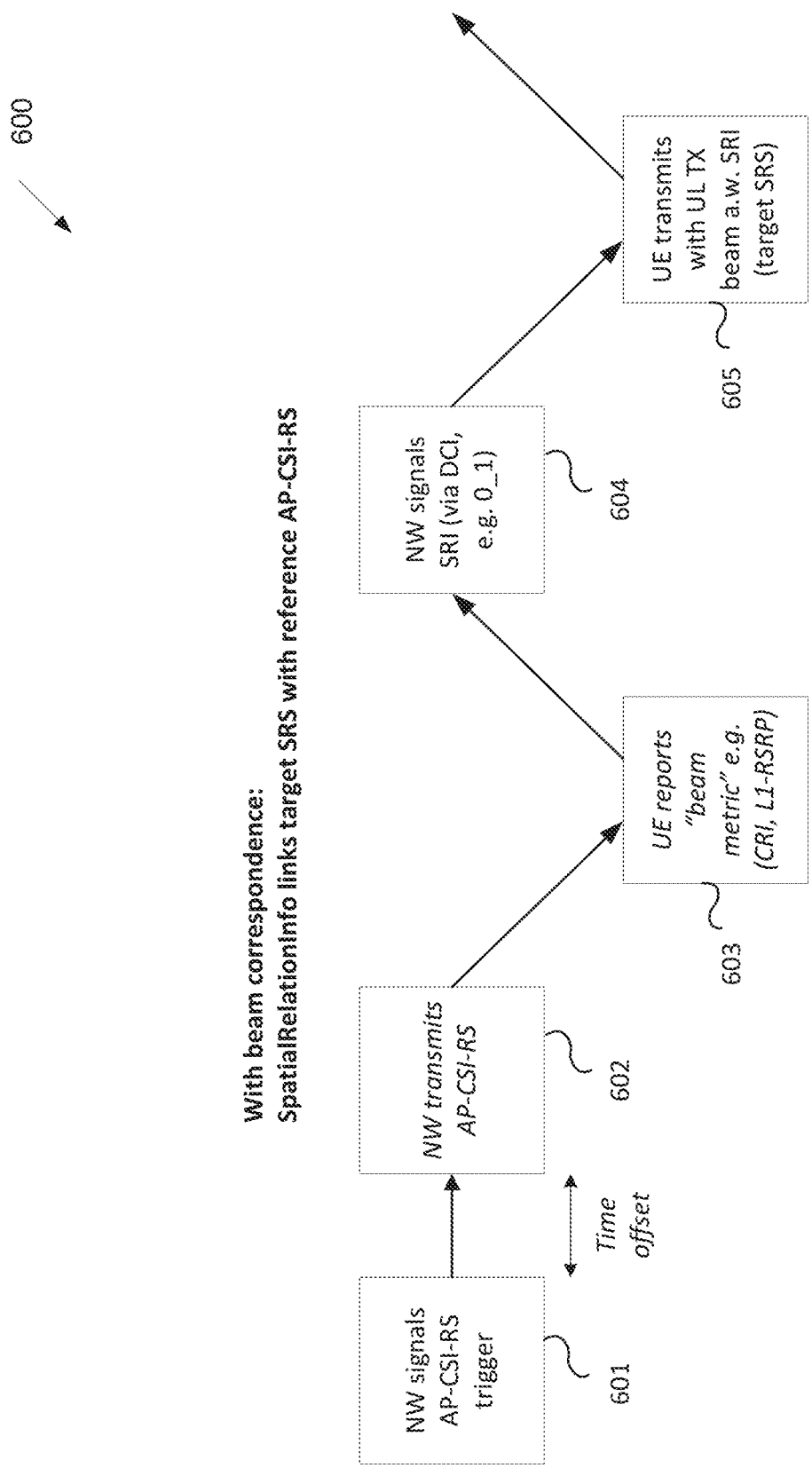
FIG. 6 illustrate an example of UL multi-beam operation according to embodiments of the present disclosure.

FIG. 6 illustrate an example of UL multi-beam operation 600 according to embodiments of the present disclosure. An embodiment of the UL multi-beam operation 600 shown in FIG. 6 is for illustration only.

In one example illustrated in FIG. 6, an UL multi-beam operation 600 starts with the gNB/NW signaling to a UE an aperiodic CSI-RS (AP-CSI-RS) trigger or indication (step 601). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 602), the UE measures the AP-CSI-RS and, in turn, calculates and reports a "beam metric" (indicating quality of a particular TX beam hypothesis) (step 603). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the NW can use the beam report to select an UL TX beam for the UE and indicate the UL TX beam selection (step 604) using the SRI field in the UL-related DCI (that carries the UL grant, such as DCI format 0_1 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH) with the UL TX beam associated with the SRI (step 605).

Figure 7:
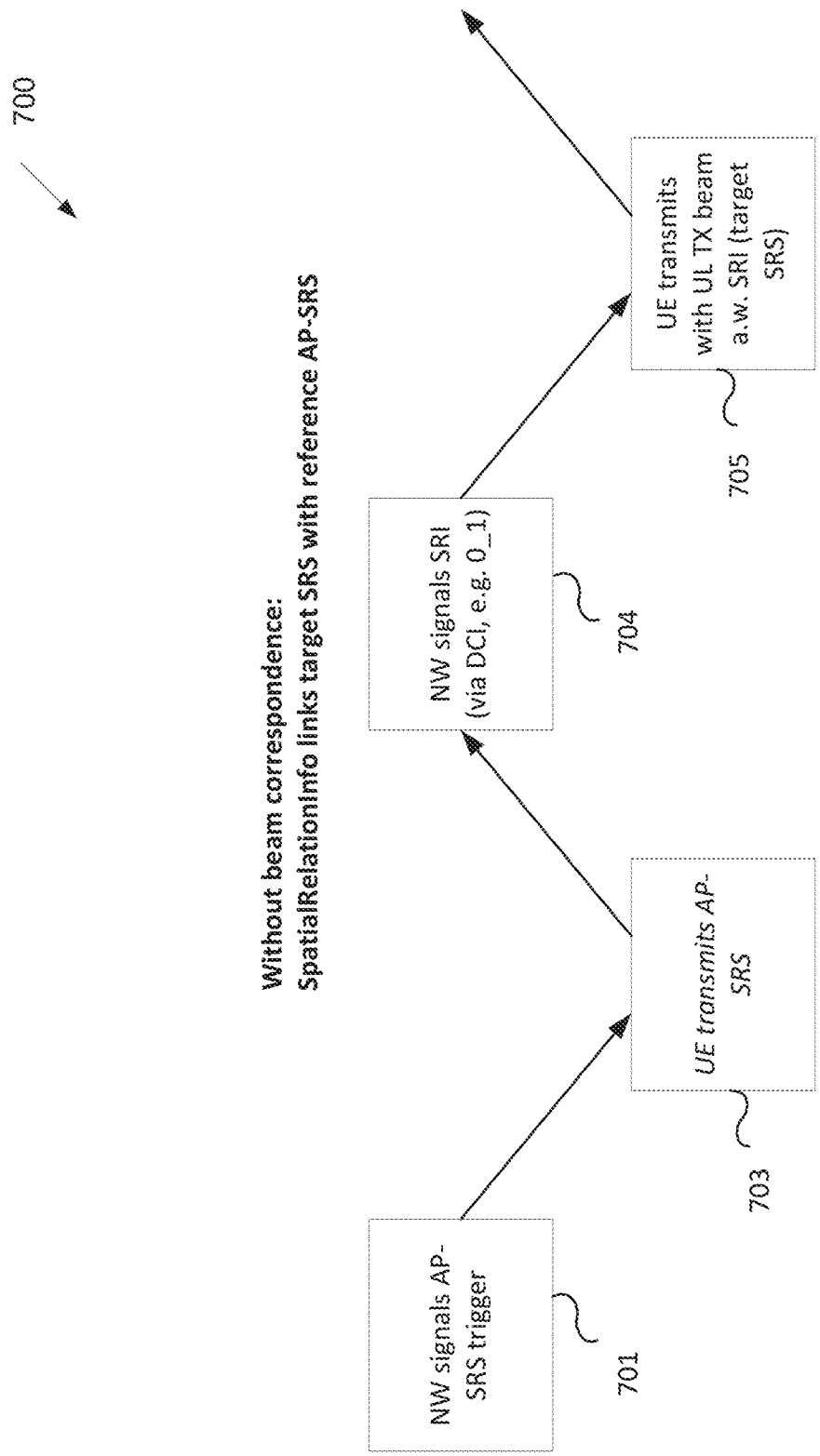
FIG. 7 illustrate another example of UL multi-beam operation according to embodiments of the present disclosure.

FIG. 7 illustrate another example of UL multi-beam operation 700 according to embodiments of the present disclosure. An embodiment of the UL multi-beam operation 700 shown in FIG. 7 is for illustration only.

In another example illustrated in FIG. 7, an UL multi-beam operation 700 starts with the gNB/NW signaling to a UE an aperiodic SRS (AP-SRS) trigger or request (step 701). This trigger can be included in a DCI (either UL-related or DL-related). Upon receiving and decoding the AP-SRS trigger (step 702), the UE transmits AP-SRS to the gNB/NW (step 703) so that the NW (or gNB) can measure the UL propagation channel and select an UL TX beam for the UE. The gNB/NW can then indicate the UL TX beam selection (step 704) using the SRI field in the UL-related DCI (that carries the UL grant, such as DCI format 0_1 in NR). The SRI corresponds to a "target" SRS resource that is linked to a reference RS (in this case, an AP-SRS) via SpatialRelationInfo configuration. Upon successfully decoding the UL-related DCI with the SRI, the UE performs UL transmission (such as data transmission on PUSCH) with the UL TX beam associated with the SRI (step 705).

Figure 8:
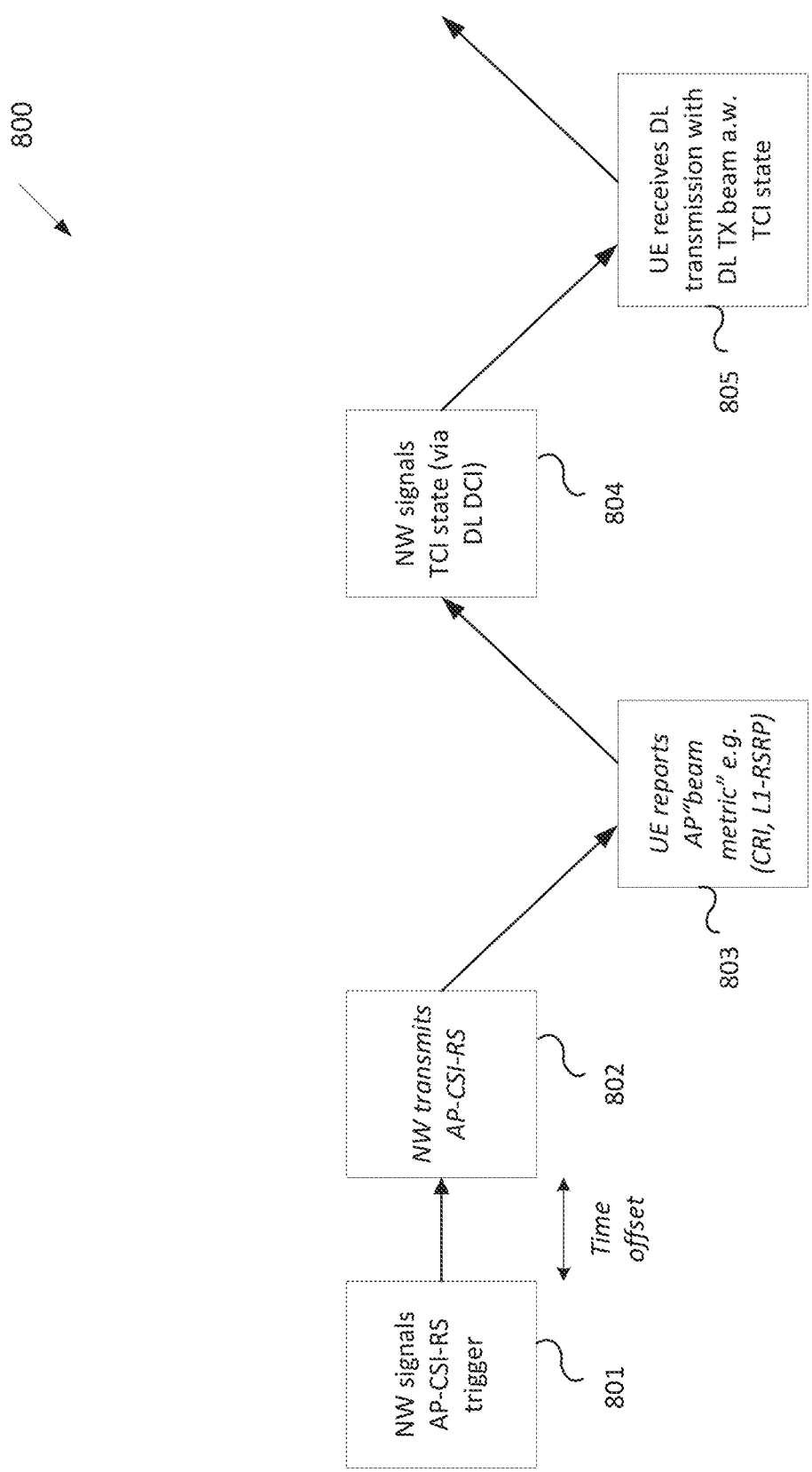
FIG. 8 illustrates an example of DL multi-beam operation according to embodiments of the present disclosure.

FIG. 8 illustrates an example of DL multi-beam operation 800 according to embodiments of the present disclosure. An embodiment of the DL multi-beam operation 800 shown in FIG. 8 is for illustration only.

In another example illustrated in FIG. 8, wherein a UE is configured for measuring/receiving aperiodic CSI-RS (AP-CSI-RS) and reporting aperiodic CSI (AP CSI), a DL multi-beam operation 800 starts with the gNB/NW signaling to a UE an aperiodic CSI-RS (AP-CSI-RS) trigger or indication (step 801). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 802), the UE measures the AP-CSI-RS and, in turn, calculates and reports a "beam metric" (included in the CSI, indicating quality of a particular TX beam hypothesis) (step 803).

Examples of such beam reporting (supported in Rel.15/16 NR) are CSI-RS resource indicator (CRI) or SSB resource indicator (SSB-RI) coupled with its associated L1-RSRP and/or L1-SINR. Upon receiving the beam report from the UE, the NW/gNB can use the beam report to select a DL TX beam for the UE and indicate the DL TX beam selection (step 804) using the TCI field in the DL-related DCI (that carries the DL assignment, such as DCI format 11 in NR). The TCI state corresponds to a reference RS (in this case, an AP-CSI-RS) defined/configured via the TCI state definition (higher-layer/RRC configured, from which a subset is activated via MAC CE for the DCI-based selection). Upon successfully decoding the DL-related DCI with the TCI field, the UE performs DL reception (such as data transmission on PDSCH) with the DL TX beam associated with the TCI field (step 805). In this example embodiment, only one DL TX beam is indicated to the UE.

To facilitate fast beam management, one requirement is to streamline the foundational components (building blocks) for beam management. One key functionality of beam management is beam selection which comprises functions such as beam measurement (including training), reporting (for DL beam management, reporting via UL control channel(s)), and an indication (for DL and UL beam management, an indication via DL control channel(s)). Once the building blocks are streamlined [step 1], additional advanced features to facilitate faster beam management can be added [step 2].

In the present disclosure, a "slim mode" with streamlined designs of such foundational components [step 1] is provided for fast beam management. The slim-mode design, due to its compact nature, can facilitate faster update/reconfiguration via lower-layer control signaling. In other words, L1 control signaling may be the primary signaling mechanism and higher-layer (such as MAC CE or RRC) is used only when necessary. Here, L1 control signaling includes the use of UE-group DCI as well as dedicated (UE-specific) DCI.

In the present disclosure, an advanced feature for faster beam management (multi-beam operation) from intra-cell to inter-cell mobility is provided [step 2]. With such mechanism, seamless access/mobility for RRC_CONNECTED UEs—as if cell boundaries were not observed unless a UE is in initial access or initial-access-like condition—can be achieved.

In Rel. 15/16 beam management (BM), the beam measurement, reporting, and an indication does not include cell-specific information such as cell-ID. Therefore, in order to switch to a beam associated with another cell (e.g., in case of handover), the UE has to first go through the traditional handover procedures to acquire/update cell-specific parameters associated with another cell, and then the UE may go through the necessary steps for BM in order to switch to a beam associated with another cell. This two-step beam switching involving the traditional handover leads to large delay, which is an issue, especially for high mobility scenarios. Two solutions to overcome this issue are provided next.

In the present disclosure, the term "beam," can be associated a spatial transmission of a resource signal (RS) from a "port," "antenna port," or "virtual antenna/port."

The first solution is based on including cell-specific parameters in the BM procedures so that when the UE needs to switch beams across multiple neighboring (or non-serving) cells, the UE can do so without going through the traditional handover procedures. Note that the traditional handover may happen eventually, but until the traditional handover happens, the BM procedures allow a UE to stay connected with the network via alternative beams (potentially transmitted from neighboring cell(s)). An example embodiment is provided next.

In one embodiment (1), the Rel. 15/16 BM is extended to include additional components/entities which facilitate a UE to stay connected with the network (NW) in scenarios such high mobility by providing alternative beam(s) transmitted from different entities (such as cells). In particular, the extended BM procedure includes the following three essential steps: (S1) beam measurement, (S2) beam reporting, and (S3) a beam indication.

For beam measurement (S1), a set of K reference RSs can be configured for measurement via higher-layer (such as RRC) signaling to a UE. The K reference RSs can be NZP CSI-RS, SSB, DL DMRS, or any combination of those. For example, this set can be composed of NZP CSI-RS and SSB. Or the set can be composed of NZP CSI-RS only. Or the set can be composed of SSB only. Each reference RS can be associated with (a) a resource ID of the particular type of RS and (b) an entity ID of the particular type of radio resource (RR) entity, where the reference RS belongs to (or transmitted from) the corresponding RR entity.

In one example, a reference RS can be associated with a TX beam or spatial domain filter, which NW/gNB uses to beamform/precode the reference RS before transmissions of the NW/gNB. The choice of the TX beam or spatial domain filter is up to the NW/gNB, and hence transparent (unknown) to the UE.

In one example, the RR entity is a "cell," the entity ID is a cell-ID, and the reference RS belongs to (or transmitted from) a cell out of a plurality of cells, each with a cell-ID. In another example, the RR entity is a transmit-receive point (TRP), the entity ID is a TRP-ID, and the reference RS belongs to (or transmitted from) a TRP out of a plurality of TRPs, each with a TRP-ID. In another example, the RR entity is a panel, the entity ID is a panel-ID, and the reference RS belongs to (or transmitted from) a panel out of a plurality of panels, each with a panel-ID. In another example, the RR entity is a resource set, the entity ID is a resource-set-ID, and the reference RS belongs to (or transmitted from) a resource set out of a plurality of resource sets, each with a resource-set-ID.

In another example, the RR entity is a port, the entity ID is a port-ID, and the reference RS belongs to (or transmitted from) a port out of a plurality of ports, each with a port-ID. An illustration of the association of K RSs and their resource-IDs and entity-IDs is shown in FIG. 9.

Figure 9:
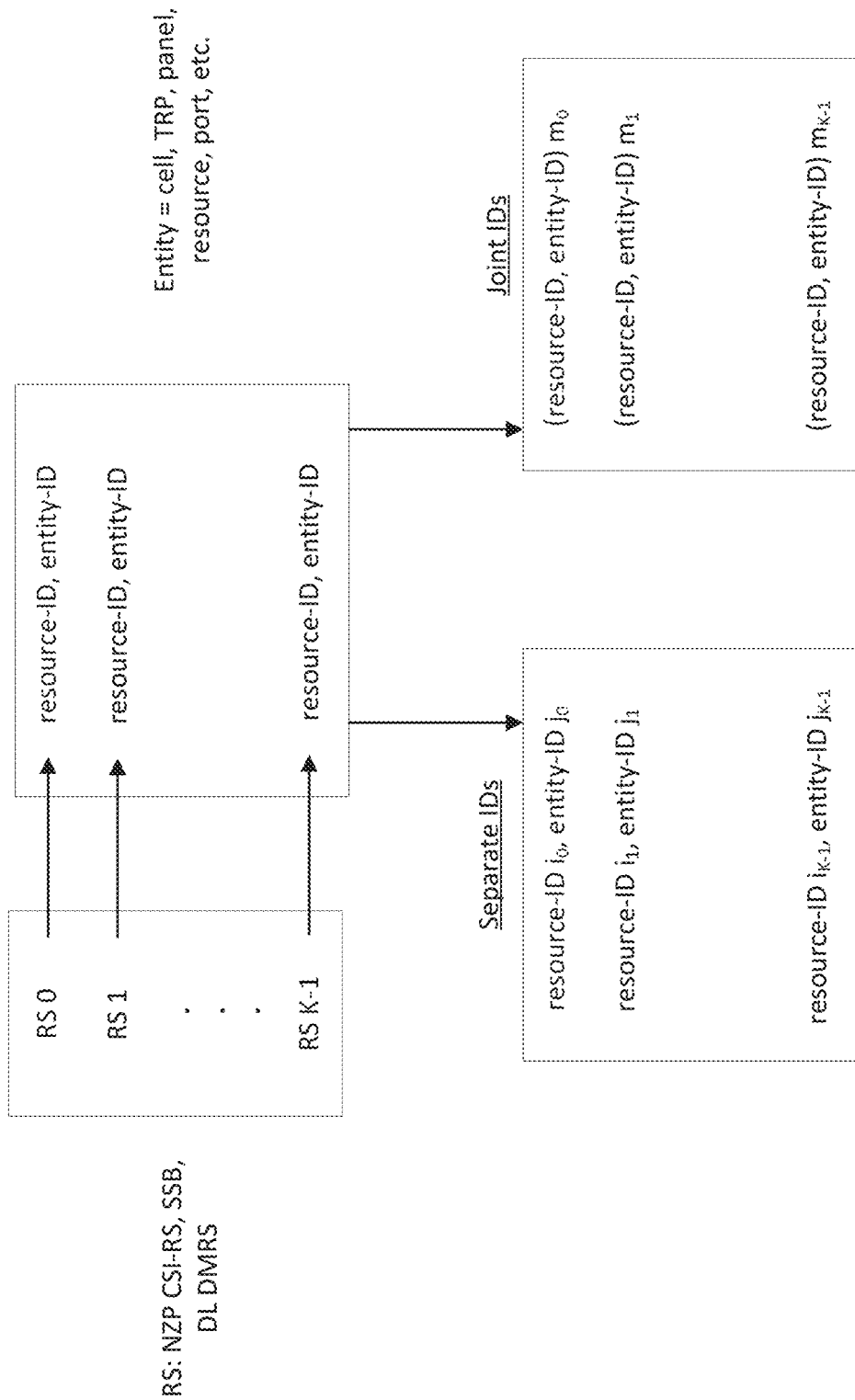
FIG. 9 illustrates an example of association between RSs and RS resource IDs/entity IDs according to embodiments of the present disclosure.

FIG. 9 illustrates an example of association between RSs and RS source IDs/entity IDs 900 according to embodiments of the present disclosure. An embodiment of the association between RSs and RS source IDs/entity IDs 900 shown in FIG. 9 is for illustration only.

Two examples for (resource-ID, entity-ID) are also shown. In one example, resource-ID and entity-ID are separate, i.e., RS 0 is associated with (resource-ID, entity-ID)=$(i_0, j_0)$, RS 1 is associated with (resource-ID, entity-ID)=$(i_1, j_1)$, and RS K−1 is associated with (resource-ID, entity-ID)=$(i_{K-1}, j_{K-1})$, where $i_0, i_1, \ldots, i_{K-1}$ are resource-IDs of the K reference RSs, and $j_0, j_1, \ldots, j_{K-1}$ are corresponding entity-IDs. In another example, resource-ID and entity-ID are joint, i.e., RS 0 is associated with (resource-ID, entity-ID) indexed by $m_0$, RS 1 is associated with (resource-ID, entity-ID) indexed by $m_1$, and RS K−1 is associated with (resource-ID, entity-ID) indexed by $m_{K-1}$, where $m_0, m_1, \ldots, m_{K-1}$ are joint indices of (resource-ID, entity-ID)s associated with the K reference RSs.

The above-mentioned entities are only examples. The embodiments of this disclosure are general and applicable to any other examples of the entity (including the ones mentioned above) or BM component(s) that are functionally equivalent.

An example of RS configuration is given in TABLE 1 where the reference RS set includes NZP CSI-RS and SRS, and K=8. This example is for the case when Resource ID and Entity TD are separate.

TABLE 1

Example of reference RS set, K = 8

| Reference RS index | Reference RS Type | Resource ID for the type | Entity ID |
| --- | --- | --- | --- |
| 0 | NZP CSI-RS | 0 | 1 |
| 1 | NZP CSI-RS | 3 | 1 |
| 2 | NZP CSI-RS | 4 | 2 |
| 3 | NZP CSI-RS | 6 | 3 |
| 4 | NZP CSI-RS | 1 | 4 |
| 5 | NZP CSI-RS | 2 | 4 |
| 6 | SSB | 1 | 1 |
| 7 | SSB | 3 | 3 |

Another example of RS configuration is given in TABLE 2 where the reference RS set includes NZP CSI-RS and SRS, and K=8. This example is for the case when Resource TD and Entity TD are joint.

TABLE 2

Example of reference RS set, K = 8

| Reference RS index | Reference RS Type | Joint ID for Reference-ID and Entity-ID |
| --- | --- | --- |
| 0 | NZP CSI-RS | 1 |
| 1 | NZP CSI-RS | 3 |
| 2 | NZP CSI-RS | 4 |
| 3 | NZP CSI-RS | 6 |
| 4 | NZP CSI-RS | 7 |
| 5 | NZP CSI-RS | 9 |
| 6 | SSB | 0 |
| 7 | SSB | 2 |

| Joint ID | Resource ID for the type | Entity ID |
| --- | --- | --- |
| 0 | 0 | 1 |
| 1 | 3 | 1 |
| 2 | 4 | 2 |
| 3 | 6 | 3 |
| 4 | 1 | 4 |
| 5 | 2 | 4 |
| 6 | 1 | 1 |
| 7 | 3 | 3 |

For beam reporting (S2), the UE is configured to use a subset or all of the configured K reference RSs to determine N beam reports, where $1 \le N \le K$, where each beam report comprises a beam metric or/and a resource indicator. In one example, the beam metric is a L1-RSRP which indicates power level of a reference RS. In another example, the beam metric is a L1-SINR which indicates a ratio of signal power and (noise plus) interference power, where the signal power is determined using a reference RS and the interference power is determined using a ZP CSI-RS resource or/and NZP CSI-RS resource configured to the UE for interference measurement. Regarding the resource indicator, at least one of the following alternatives can be used.

In one example of Alt S2-0, when the resource ID and the entity ID (e.g., cell-ID) associated with reference RS are separate (e.g., FIG. 9), a single resource indicator indicates two separate indices one each for the resource ID and the entity ID (e.g., cell-ID) associated with reference RS.

In one example, when the reference RS is NZP CSI-RS, the single resource indicator can be CRI, which indicates two separate indices one each for the resource ID and the entity ID (e.g., cell-ID) associated with the NZP CSI-RS resource.

In one example, when the reference RS is SSB, the single resource indicator can be SSBRI, which indicates two separate indices one each for the resource ID and the entity ID (e.g., cell-ID) associated with the SSB resource.

In one example of Alt S2-1, when the resource ID and the entity ID (e.g., cell-ID) associated with reference RS are separate (e.g., FIG. 9), then the resource indicator can include two components (X, Y), wherein components X and Y indicate the resource ID and the entity ID (e.g., cell-ID) associated with reference RS, respectively.

In one example, when the reference RS is NZP CSI-RS, the component X can be a CSI-RS resource indicator (CRI), which indicates a resource ID of the NZP CSI-RS resource.

In another example, when the reference RS is SSB, the component can be SSB resource indicator (SSBRI), which indicates a resource ID of SSB resource.

In one example of Alt S2-2, when the resource ID and the entity ID (e.g., cell-ID) associated with reference RS are joint (e.g., FIG. 9), then a single resource indicator indicates both the resource ID and the entity ID (e.g., cell-ID) associated with reference RS jointly.

In one example, when the reference RS is NZP CSI-RS, the single resource indicator can be CRI, which indicates a joint index for the resource ID and the entity ID (e.g., cell-ID) associated with the NZP CSI-RS resource.

In one example, when the reference RS is SSB, the single resource indicator can be SSBRI, which indicates a joint index for the resource ID and the entity ID (e.g., cell-ID) associated with the SSB resource.

In one example of Alt S2-3, the resource indicator indicates only entity ID (e.g., cell-ID) associated with a reference RS.

For a beam indication (S3), the Rel.15/16 TCI-based mechanism can be reused. The TCI-based mechanism links/associates at least one of the K reference RSs to a particular TCI state for a channel (or another/target RS). For instance, the reference RS 0 can be associated with the first TCI state for PDSCH and the reference RS 1 with the second TCI state for PDSCH (wherein at least two TCI states are configured for PDSCH). Such association can take form of the QCL TypeD, which represents a spatial relation or spatial domain filter (or beam or precoder). For DL, two relevant channels include PDSCH and PDCCH (and example of another/target RS include DMRS, CSI-RS, SSB).

Similar to Rel.15/16 NR, a set of TCI states can be configured via higher-layer (RRC) signaling. Optionally, a set of TCI states can be configured via MAC CE. Optionally, a subset of the TCI states can be activated or selected either via MAC CE or L1 control signaling (via either UE-group DCI where a set of UEs share a same TCI state subset, or UE-specific/dedicated DCI). This subset constitutes the TCI states represented by the code points of the TCI field in the corresponding DCI. This update/activation can be performed in either one shot or incrementally. The TCI state indicated by the code point of the TCI field is a reference to the TX beam or the TX spatial filter associated with a reference RS. For DL, given such a reference, the UE can further derive the RX beam or RX spatial filter. The DCI that includes the TCI field (which can be either DL-related DCI or UL-related DCI) performs the function of the so-called a "beam indication."

Figure 10:
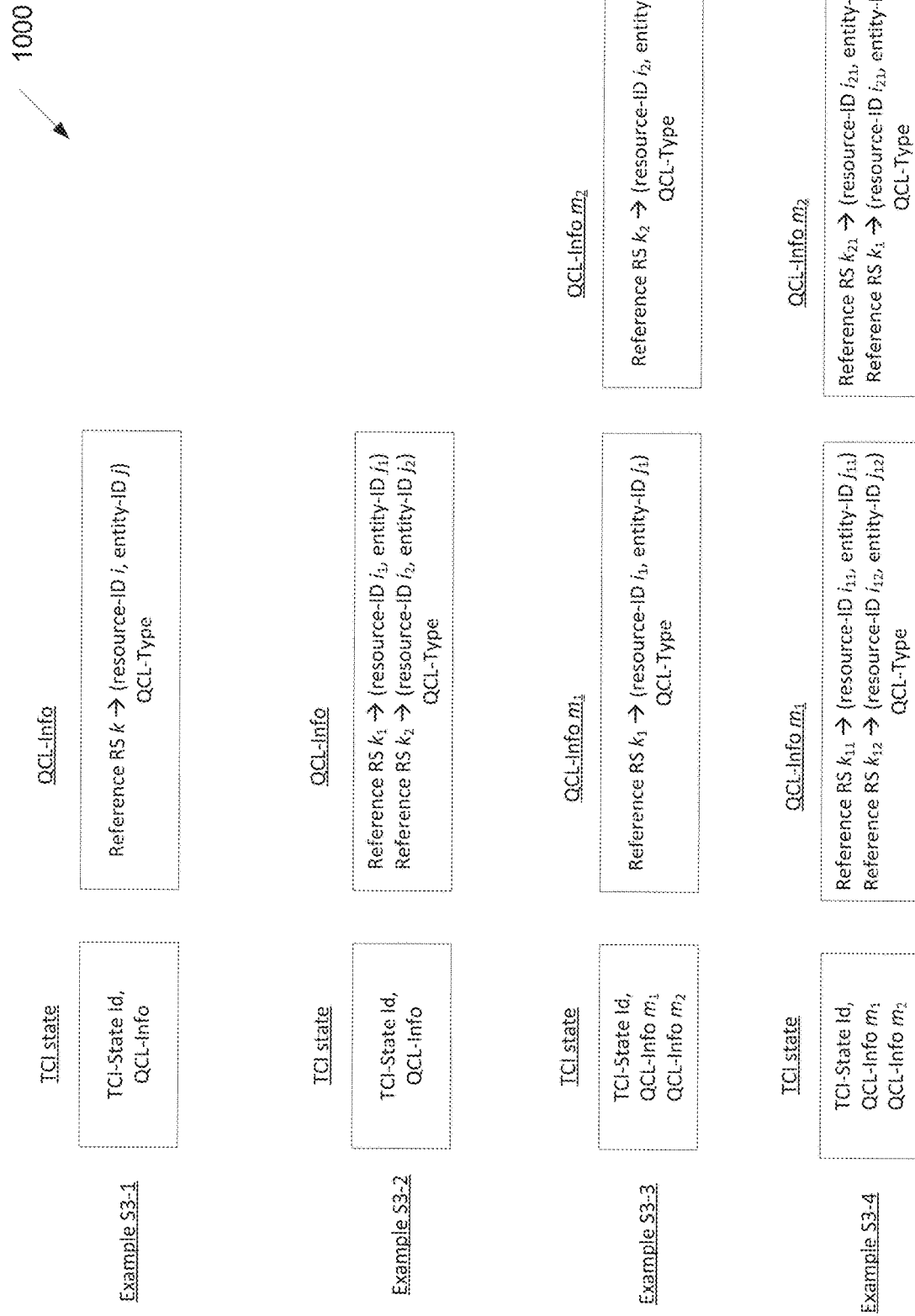
FIG. 10 illustrates an example of TCI states and QCL information according to embodiments of the present disclosure.

FIG. 10 illustrates an example of TCI states and QCL information 1000 according to embodiments of the present disclosure. An embodiment of the TCI states and QCL information 1000 shown in FIG. 10 is for illustration only.

In one example (Ex. S3-1), a TCI state includes a TCI state ID and a QCL-Info parameter, wherein the QCL-Info parameter includes the resource ID and the entity ID (e.g., cell ID) of a reference RS (from K reference RSs), and a QCL-Type, e.g., QCL TypeD.

In another example (Ex. S3-2), a TCI state includes a TCI state ID and a QCL-Info parameter, wherein the QCL-Info includes the resource ID and the entity ID (e.g., cell ID) of $T_1 > 1$ reference RSs (from K reference RSs), and a QCL-Type, e.g., QCL TypeD. In one example, $T_1 = 2$.

In another example (Ex. S3-3), a TCI state includes a TCI state ID and $T_2 > 1$ QCL-Info parameters, wherein each QCL-Info parameter includes the resource ID and the entity ID (e.g., cell ID) of a reference RS (from K reference RSs), and a QCL-Type, e.g., QCL TypeD. In one example, $T_2 = 2$.

In another example (Ex. S3-4), a TCI state includes a TCI state ID and $T_2 > 1$ QCL-Info parameters, wherein each QCL-Info parameter includes the resource ID and the entity ID (e.g., cell ID) of $T_1 > 1$ reference RSs (from K reference RSs), and a QCL-Type, e.g., QCL TypeD.

In one sub-embodiment (1.1), for beam measurement (S1), the UE is configured (via higher layer RRC signaling) with K reference RSs that are SSBs associated with (transmitted from) multiple cells/entities (comprising the serving or/and neighboring cells/entities, where a neighboring cell is equivalent to a non-serving cell). In one example, the configuration includes both location (in frequency domain) and cell-ID/entity-ID associated with each SSB. This configuration can be via RRC signaling including a bitmap indicating cell-IDs/entity-IDs. In another example, the configuration includes only locations (not cell-IDs/entity-IDs) of SSBs, and the UE has to detect (search for) their cell-IDs/entity-IDs. In another example, the configuration includes the frequency band, and the UE has to detect (search for) both locations and cell-IDs/entity-IDs of SSBs.

In one example, the Rel. 15/16 RRC parameter MeasObjectNR can be reused for the configuration. For instance, the parameter ssbFrequency in MeasObjectNR can be used to configure locations of SSBs, and the parameter ssb-ToMeasure in MeasObjectNR can be used to configure the cell-IDs/entity-IDs of SSBs. In another example, one or multiple new parameters (e.g., in MeasObjectNR) is introduced for this configuration.

For beam reporting (S2), the UE is configured to report N beam report(s) according to step (S2) of embodiment 1 (explained above) wherein each beam report includes a beam metric or/and a resource indicator. The beam metric is either L1-RSRP or L1-SINR. The resource indicator includes a resource-ID or/and a cell-ID/entity-ID associated with a SSB, wherein the resource indicator is according to at least one of Alt S2-1 through Alt S2-4.

For a beam indication (S3), the TCI-based mechanism as explained in embodiment 1 is used.

In one sub-embodiment (1.2), for beam measurement (S1), the UE is configured (via higher layer RRC signaling) with K reference RSs that are (NZP) CSI-RSs associated with (transmitted from) multiple cells/entities (comprising the serving or/and neighboring cells/entities, where a neighboring cell is equivalent to a non-serving cell). In one example, the configuration includes both location (in time-frequency domain) and cell-ID/entity-ID associated with each CSI-RS. This configuration can be via RRC signaling including a bitmap indicating cell-IDs/entity-IDs. In one example, the Rel. 15/16 RRC parameter CSI-RS-ResourceConfigMobility can be reused for the configuration.

For beam reporting (S2), the UE is configured to report N beam report(s) according to step (S2) of embodiment 1 (explained above) wherein each beam report includes a beam metric or/and a resource indicator. The beam metric is either L1-RSRP or L1-SINR. The resource indicator includes a resource-ID or/and a cell-ID/entity-ID associated with a CSI-RS, wherein the resource indicator is according to at least one of Alt S2-1 through Alt S2-4.

For a beam indication (S3), the TCI-based mechanism as explained in embodiment 1 is used.

In one sub-embodiment (1.3), for beam measurement (S1), the UE is configured (via higher layer RRC signaling) with K reference RSs that are a combination of SSBs and (NZP) CSI-RSs associated with (transmitted from) multiple cells/entities (comprising the serving or/and neighboring cells/entities, where a neighboring cell is equivalent to a non-serving cell). In one example, for SSBs, the configuration includes both location (in frequency domain) and cell-ID/entity-ID associated with each SSB.

This configuration can be via RRC signaling including a bitmap indicating cell-IDs/entity-IDs. In another example, for SSBs, the configuration includes only locations (not cell-IDs/entity-IDs) of SSBs, and the UE has to detect (search for) their cell-IDs/entity-IDs. In another example, for SSBs, the configuration includes the frequency band, and the UE has to detect (search for) both locations and cell-IDs/entity-IDs of SSBs. In one example, for CSR-RSs, the configuration includes both location (in time-frequency domain) and cell-ID/entity-ID associated with each CSI-RS.

In one example, for SSBs, the Rel. 15/16 RRC parameter MeasObjectNR can be reused for the configuration. For instance, the parameter ssbFrequency in MeasObjectNR can be used to configure locations of SSBs, and the parameter ssb-ToMeasure in MeasObjectNR can be used to configure the cell-IDs/entity-IDs of SSBs. In another example, for SSBs, one or multiple new parameters (e.g., in MeasObjectNR) is introduced for this configuration. In one example, for CSI-RSs, the Rel. 15/16 RRC parameter CSI-RS-ResourceConfigMobility can be reused for the configuration.

For beam reporting (S2), the UE is configured to report N beam report(s) according to step (S2) of embodiment 1 (explained above) wherein each beam report includes a beam metric or/and a resource indicator. The beam metric is either L1-RSRP or L1-SINR. The resource indicator includes a resource-ID or/and a cell-ID/entity-ID associated with a SSB or a CSI-RS, wherein the resource indicator is according to at least one of Alt S2-1 through Alt S2-4.

For a beam indication (S3), the TCI-based mechanism as explained in embodiment 1 is used.

In one sub-embodiment (1.4), the cell-ID in embodiment 1, and sub-embodiments 1.1 through 1.3 can be according to at least one of the following examples.

In example 1.4.1, the cell ID is a Serving cell ID (SCI or ServCellIndex) that is used to identify a serving cell (i.e., the PCell, the PSCell, an SCell, or an SSCell). In one example, Value 0 applies for the PCell, while the SCellIndex that has previously been assigned applies for SCells. Here, PCell is a primary cell, which is one of the cells belonging to master cell group (MCG) configured to the UE; SCell is a secondary cell, which is one or more of the cells belonging to the MCG configured to the UE; PSCell is a primary SCell, which is one of the cells belonging to the secondary cell group (SCG) configured to the UE; and SSCell is a secondary Scell, which is one or more of the cells belonging to the SCG configured to the UE.

In one example, a serving cell ID in the above-mentioned beam management procedures can take any value from $\{0, 1, \ldots, \text{maxNrofServingCells}-1\}$. In one example, maxNrofServingCells=32 or 31.

In another example, a serving cell ID in the above-mentioned beam management procedures can take any value from a subset S of the set of allowed values T. For example, when T={0,1, . . . , maxNrofServingCells−1}, S is subset of T. In one example, this subset T is fixed. In another example, this subset T is configured to the UE, e.g., via higher layer RRC signaling. For example, a list of ServCellIndex values can be configured, e.g., via RRC parameter sci-List or sci-List-BeamManagement.

An example of QCL-Info for a beam (or TCI state) indication is shown in Example I in TABLE 3. Example 1.4.1 can be restricted to qcl-Type=typeD. Or examples can be any applicable to other qcl-Types from {typeA, typeB, typeC, typeD}.

In one example 1.4.2, the cell ID is a Physical cell ID (PCI or PhysCellId) that is used to identify a physical cell index. In one example, the physical cell index refers to (or indicates) either the serving cell or a non-serving cell (neighboring cell).

In one example, PCI in the above-mentioned beam management procedures can take any value from the set of allowed values, e.g., {0,1, . . . , 1007}.

In another example, PCI in the above-mentioned beam management procedures can take any value from a subset S of the set of allowed values T. For example, when T={0, 1, . . . , 1007}, S is subset of T. In one example, this subset T is fixed. In another example, this subset T is configured to the UE, e.g., via higher layer RRC signaling. For example, a list of PCI values can be configured, e.g., via RRC parameter pci-List or pci-List-BeamManagement.

An example of QCL-Info for a beam (or TCI state) indication is shown in Example II in TABLE 3. Example 1.4.2 can be restricted to qcl-Type=typeD. Or example(s) can be any applicable to other qcl-Types from {typeA, typeB, typeC, typeD}.

In example 1.4.3, the cell ID is a pair of a serving cell ID (SCI) and physical cell ID (PCI) that is used to identify a serving cell index and a physical cell index of a cell, respectively. In one example, one joint ID is for both (PCI, SCI). In another example, two separate IDs are used, one for PCI and another for SCI. The details about PCI and SCI are according to example 1.4.1 and 1.4.2.

An example of QCL-Info for a beam (or TCI state) indication is shown in Example III, Example IV, and Example V in Table 3. Example 1.4.3 can be restricted to qcl-Type=typeD. Or example(s) can be any applicable to other qcl-Types from {typeA, typeB, typeC, typed}. In Example III, there are two separate IDs, Cell-ID1 for ServCellIndex and Cell-ID2 for PhysCellId. In Example IV, there are one joint ID, namely Cell-ID=(PCI, SCI), where SCI is for ServCellIndex and PCI is for Cell-ID2 for PhysCellId. In Example V, there is one ID, namely Cell for ServCellIndex, and another ID, namely ID1 or ID2.

ID1=(NZP-CSI-RS-ResourceId, PCI), where NZP-CSI-RS-ResourceId is for NZP-CSIRS resource and PCI is for PhysCellId, ID2=(SSB-Index, PCI), where SSB-Index is for SSB and PCI is for PhysCellId.

TABLE 3

Examples of QCL-Info for beam (or TCI state) indication

```
Example I:
QCL-Info ::=            SEQUENCE {
    Cell                ServCellIndex           OPTIONAL, -- Need R
    bwp-Id              BWP-Id                  OPTIONAL, -- Cond CSI-RS-Indicated
    referenceSignal         CHOICE {
        csi-rs              NZP-CSI-RS-ResourceId,
        ssb                 SSB-Index
    },
    qcl-Type                ENUMERATED {typeA, typeB, typeC, typeD},
    ...
}
Example II:
QCL-Info ::=            SEQUENCE {
    Cell                PhysCellId              OPTIONAL, -- Need R
    bwp-Id              BWP-Id                  OPTIONAL, -- Cond CSI-RS-Indicated
    referenceSignal         CHOICE {
        csi-rs              NZP-CSI-RS-ResourceId,
        ssb                 SSB-Index
    },
    qcl-Type                ENUMERATED {typeA, typeB, typeC, typeD},
    ...
}
Example III:
QCL-Info ::=            SEQUENCE {
    Cell-ID1            ServCellIndex           OPTIONAL, -- Need R
    Cell-ID2            PhysCellId              OPTIONAL, -- Need R
    bwp-Id              BWP-Id                  OPTIONAL, -- Cond CSI-RS-Indicated
    referenceSignal         CHOICE {
        csi-rs              NZP-CSI-RS-ResourceId,
        ssb                 SSB-Index
    },
    qcl-Type                ENUMERATED {typeA, typeB, typeC, typeD},
    ...
}
Example IV:
QCL-Info ::=            SEQUENCE {
    Cell-ID             (PCI, SCI)              OPTIONAL, -- Need R
    bwp-Id              BWP-Id                  OPTIONAL, -- Cond CSI-RS-Indicated
    referenceSignal         CHOICE {
        csi-rs              NZP-CSI-RS-ResourceId,
        ssb                 SSB-Index
    },
```

TABLE 3-continued

Examples of QCL-Info for beam (or TCI state) indication

```
    qcl-Type              ENUMERATED {typeA, typeB, typeC, typeD},
    ...
}
Where
PCI = PhysCellId and SCI = ServCellIndex are physical and serving cell indices of the cell
Example V:
QCL-Info ::=              SEQUENCE {
    Cell              ServCellIndex         OPTIONAL, -- Need R
    bwp-Id            BWP-Id                OPTIONAL, -- Cond CSI-RS-Indicated
    referenceSignal         CHOICE {
        csi-rs        ID1,
        ssb           ID2
    },
    qcl-Type              ENUMERATED {typeA, typeB, typeC, typeD},
    ...
}
Where
ID1 = (NZP-CSI-RS-ResourceId, PhysCellId)
ID2 = (SSB-Index, PhysCellId)
```

In one sub-embodiment (1.5), the cell-ID in embodiment 1, and sub-embodiments 1.1 through 1.3 can be according to at least one of the example 1.4.1 through 1.4.3 except that an SRS resource can also be included as a reference RS. The corresponding examples of QCL-Info is shown in TABLE 4.

TABLE 4

Examples of QCL-Info including SRS resource as a reference RS

```
Example VI:
QCL-Info ::=              SEQUENCE {
    Cell              ServCellIndex         OPTIONAL, -- Need R
    bwp-Id            BWP-Id                OPTIONAL, -- Cond CSI-RS-Indicated
    referenceSignal         CHOICE {
        csi-rs        NZP-CSI-RS-ResourceId,
        ssb           SSB-Index
        srs                 SEQUENCE {
            resourceId          SRS-ResourceId,
            uplinkBWP           BWP-Id
        }
    },
    qcl-Type              ENUMERATED {typeA, typeB, typeC, typeD},
    ...
}
Example VII:
QCL-Info ::=              SEQUENCE {
    Cell              PhysCellId            OPTIONAL, -- Need R
    bwp-Id            BWP-Id                OPTIONAL, -- Cond CSI-RS-Indicated
    referenceSignal         CHOICE {
        csi-rs        NZP-CSI-RS-ResourceId,
        ssb           SSB-Index
        srs                 SEQUENCE {
            resourceId          SRS-ResourceId,
            uplinkBWP           BWP-Id
        }
    },
    qcl-Type              ENUMERATED {typeA, typeB, typeC, typeD},
    ...
}
Example VIII:
QCL-Info ::=              SEQUENCE {
    Cell-ID1          ServCellIndex         OPTIONAL, -- Need R
    Cell-ID2          PhysCellId            OPTIONAL, -- Need R
    bwp-Id            BWP-Id                OPTIONAL, -- Cond CSI-RS-Indicated
    referenceSignal         CHOICE {
        csi-rs        NZP-CSI-RS-ResourceId,
        ssb           SSB-Index
        srs                 SEQUENCE {
            resourceId          SRS-ResourceId,
            uplinkBWP           BWP-Id
        }
    },
    qcl-Type              ENUMERATED {typeA, typeB, typeC, typeD},
    ...
```

TABLE 4-continued

Examples of QCL-Info including SRS resource as a reference RS

```
}
Example IX:
QCL-Info ::=              SEQUENCE {
  Cell-ID            (PCI, SCI)           OPTIONAL, -- Need R
  bwp-Id             BWP-Id               OPTIONAL, -- Cond CSI-RS-Indicated
  referenceSignal           CHOICE {
    csi-rs           NZP-CSI-RS-ResourceId,
    ssb              SSB-Index
      srs                   SEQUENCE {
        resourceId              SRS-ResourceId,
        uplinkBWP               BWP-Id
      }
  },
  qcl-Type           ENUMERATED {typeA, typeB, typeC, typeD},
  ...
}
Where
PCI = PhysCellId and SCI = ServCellIndex are physical and serving cell indices of the cell
Example X:
QCL-Info ::=              SEQUENCE {
  Cell             ServCellIndex           OPTIONAL, -- Need R
  bwp-Id           BWP-Id                  OPTIONAL, -- Cond CSI-RS-Indicated
  referenceSignal           CHOICE {
    csi-rs           ID1,
    ssb              ID2
      srs                   SEQUENCE {
        resourceId              ID3,
        uplinkBWP               BWP-Id
      }
  },
  qcl-Type           ENUMERATED {typeA, typeB, typeC, typeD},
  ...
}
Where
ID1 = (NZP-CSI-RS-ResourceId, PhysCellId)
ID2 = (SSB-Index, PhysCellId)
ID3 = (SRS-ResourceId, PhysCellId)
```

35

In one sub-embodiment (1.6), for a UL, beam (TCI state or spatialRelationInfo) indication, the cell-D in embodiment 1, and sub-embodiments 1.1 through 1.3 can be according to at least one of the example 1.4.1 through 1.4.3. The corresponding examples of QCL-Info is shown in TABLE 5.

TABLE 5

Examples of SRS-SpatialRelationInfo for UL beam
(TCI state or spatialRelationInfo) indication

```
Example XI:
SRS-SpatialRelationInfo ::=            SEQUENCE {
  servingCellId            ServCellIndex           OPTIONAL, -- Need S
  referenceSignal          CHOICE {
    ssb-Index              SSB-Index,
    csi-RS-Index           NZP-CSI-RS-ResourceId,
    srs                    SEQUENCE {
      resourceId             SRS-ResourceId,
      uplinkBWP              BWP-Id
    }
  }
}
Example XII:
SRS-SpatialRelationInfo ::=            SEQUENCE {
  CellId                   PhysCellId              OPTIONAL, -- Need S
  referenceSignal          CHOICE {
    ssb-Index              SSB-Index,
    csi-RS-Index           NZP-CSI-RS-ResourceId,
    srs                    SEQUENCE {
      resourceId             SRS-ResourceId,
      uplinkBWP              BWP-Id
    }
  }
}
Example XIII:
SRS-SpatialRelationInfo ::=            SEQUENCE {
```

TABLE 5-continued

Examples of SRS-SpatialRelationInfo for UL beam
(TCI state or spatialRelationInfo) indication

```
    Cell-ID1                ServCellIndex          OPTIONAL, -- Need S
    Cell-ID2                PhysCellId             OPTIONAL, -- Need S
    referenceSignal             CHOICE {
        ssb-Index               SSB-Index,
        csi-RS-Index            NZP-CSI-RS-ResourceId,
        srs                 SEQUENCE {
            resourceId          SRS-ResourceId,
            uplinkBWP               BWP-Id
        }
    }
}
Example XIV:
SRS-SpatialRelationInfo ::=         SEQUENCE {
    Cell-ID                 (PCI, SCI)             OPTIONAL, -- Need S
    referenceSignal             CHOICE {
        ssb-Index               SSB-Index,
        csi-RS-Index            NZP-CSI-RS-ResourceId,
        srs                 SEQUENCE {
            resourceId          SRS-ResourceId,
            uplinkBWP               BWP-Id
        }
    }
}
Where
PCI = PhysCellId and SCI = ServCellIndex are physical and serving cell indices of the cell
Example XV:
SRS-SpatialRelationInfo ::=         SEQUENCE {
    servingCellId               ServCellIndex          OPTIONAL, -- Need S
    referenceSignal             CHOICE {
        csi-rs              ID1,
        ssb                 ID2
            srs             SEQUENCE {
                resourceId      ID3,
                uplinkBWP           BWP-Id
            }
    },
    qcl-Type                ENUMERATED {typeA, typeB, typeC, typeD},
    ...
}
Where
ID1 = (NZP-CSI-RS-ResourceId, PhysCellId)
ID2 = (SSB-Index, PhysCellId)
ID3 = (SRS-ResourceId, PhysCellId)
```

In some embodiments of this disclosure, the term serving cell is defined as follows, which is described in the 3GPP TS 38.331:

Serving cell: for a UE in RRC_CONNECTED not configured with CA/DC there is only one serving cell comprising of the primary cell. For a UE in RRC_CONNECTED configured with CA/DC the term "serving cells" is used to denote the set of cells comprising of the special cell(s) and all secondary cells;

Primary cell (PCell): the MCG cell, operating on the primary frequency, in which the UE either performs the initial connection establishment procedure or initiates the connection re-establishment procedure;

Special cell: for Dual Connectivity operation the term special cell refers to the PCell of the MCG or the PSCell of the SCG, otherwise the term special cell refers to the PCell;

Secondary cell: for a UE configured with carrier aggregation (CA), a cell providing additional radio resources on top of special cell; and Secondary cell group (SCG): for a UE configured with dual connectivity (DC), the subset of serving cells comprising of the PSCell and zero or more secondary cells.

In some embodiments of this disclosure, the term non-serving cell is defined as a cell that is not a serving cell.

In some embodiments of this disclosure, a reference RS associated with a serving cell can also be referred to as a serving cell RS. A reference RS associated with a non-serving cell can also be referred to as a non-serving cell RS. Alternatively, a non-serving cell RS is a reference RS that is an SSB or has an SSB of a non-serving cell as direct or indirect QCL source. Alternatively, a non-serving cell RS is a reference RS that is an CSI-RS or has an CSI-RS of a non-serving cell as direct or indirect QCL source.

Alternatively, a non-serving cell RS is a reference RS that is an SSB or CSI-RS, or has an SSB or CSI-RS of a non-serving cell as direct or indirect QCL source.

In some embodiments of this disclosure, there is no RRC reconfiguration signaling needed during and after handover when a TCI associated with non-serving cell RS is indicated. This implies that there is no C-RNTI update during inter-cell mobility during and after handover.

In some embodiments of this disclosure, the beam measurement and reporting of non-serving cell RSs is facilitated via incorporating non-serving cell information (such as PCID or non-serving cell ID) with at least some TCI state(s).

In one example, some TCI state(s) is included in (hence is a subset of) a common pool (set) of TCI states configured to the UE. The common pool can include both serving cell RSs and non-serving cell RSs.

In one example, some TCI state(s) is configured separately to the UE. That is, there are two separate pools (sets) of TCI states configured to the UE, one for the serving cell RSs and another for the non-serving cell RSs.

In one example, the metric for the beam measurement and reporting is either (layer 1 RSRP) L1-RSRP or (layer 3 RSRP) L3-RSRP or time-domain-filtered L1-RSRP or spatial-domain-filtered L1-RSRP.

In some embodiments of this disclosure, the beam indication (TCI state update) including a non-serving cell RS is facilitated via incorporating non-serving cell information (such as PCID or non-serving cell ID) into the TCI state definition.

In some embodiments of this disclosure, the configurations for non-serving cell RSs (such as SSBs, CSI-RSs) are provided by the serving cell via RRC. The configurations include information such as time/frequency location, transmission power, etc. Also, such configurations can be provided either separately via dedicated RRC configuration parameters or jointly/together with the configurations for serving cell RSs.

The second solution is based on expanding the so-called entity boundaries for BM procedures by introducing a "super" entity, which encompasses multiple entities (cf. entities defined in embodiment 1). When the UE needs to switch beams across multiple neighboring entities (e.g., non-serving cells), the UE can do so by switching beams associated with the super entity without going through the traditional handover procedures. Note that the traditional handover may happen eventually, but until the traditional handover happens, the BM procedures allow a UE to stay connected with the network via alternative beams. An example embodiment is provided next.

In one embodiment (2), the Rel. 15/16 BM is extended to include a "super" entity which facilitates a UE to stay connected with the network (NW) in scenarios such high mobility by providing alternative beam(s) associated with or transmitted from different entities comprising the super entity. In one example, there is no entity-ID associated with the super entity. In another example, there is an entity-ID associated with the super entity, but it is common for entities that the super entity encompasses. Regardless of whether there exists an entity-ID or not, there is no need to include the entity-ID for the super-entity in the BM procedures. Note that entities comprising the super-entity may have entity-IDs, but the entities are not used/included in the BM procedures according to this embodiment. The extended BM procedure includes the following three essential steps: (S1) beam measurement, (S2) beam reporting, and (S3) a beam indication.

For beam measurement (S1), a set of K reference RSs can be configured for measurement via higher-layer (such as RRC) signaling to a UE. The K reference RSs can be NZP CSI-RS, SSB, DL DMRS, or any combination of those. For example, this set can be composed of NZP CSI-RS and SSB. Or the set can be composed of NZP CSI-RS only. Or the set can be composed of SSB only. The set of K reference RSs are associated with (or transmitted) from entities comprising the super entity. Each reference RS can be associated with (a) a resource ID of the particular type of RS and (b) optionally, an entity ID of the particular type of radio resource (RR) entity.

In one example, a reference RS can be associated with a TX beam or spatial domain filter, which NW/gNB uses to beamform/precode the reference RS before transmissions of the NW/gNB. The choice of the TX beam or spatial domain filter is up to the NW/gNB, and hence transparent (unknown) to the UE.

In one example, the RR entity is a "cell," the super entity encompassing multiple entities is a "super-cell," and each reference RS belongs to (or transmitted from) a cell out of a plurality of cells encompassing the super-cell. In another example, the RR entity is a transmit-receive point (TRP), the super entity encompassing multiple entities is a "super-TRP," and each reference RS belongs to (or transmitted from) a TRP out of a plurality of TRPs encompassing the super-TRP. In another example, the RR entity is a panel, the super entity encompassing multiple entities is a "super-panel," and each reference RS belongs to (or transmitted from) a panel out of a plurality of panels encompassing the super-panel.

In another example, the RR entity is a resource set, the super entity encompassing multiple entities is a "super-resource-set," and each reference RS belongs to (or transmitted from) a TR resource set out of a plurality of resource sets encompassing the super-resource-set. In another example, the RR entity is a port, the super entity encompassing multiple ports is a "super-port," and each reference RS belongs to (or transmitted from) a port out of a plurality of ports encompassing the super-port.

The above-mentioned entities are only examples. The embodiments of this disclosure are general and applicable to any other examples of the entity (including the ones mentioned above) or BM component(s) that are functionally equivalent.

For beam reporting (S2), the UE is configured to use a subset or all of the configured K reference RSs to determine N beam reports, where $1 \leq N \leq K$, where each beam report comprises a beam metric or/and a resource indicator. In one example, the beam metric is a L1-RSRP which indicates power level of a reference RS. In another example, the beam metric is a L1-SINR which indicates a ratio of signal power and (noise plus) interference power, where the signal power is determined using a reference RS and the interference power is determined using a ZP CSI-RS resource or/and NZP CSI-RS resource configured to the UE for interference measurement. The resource indicator indicates a reference RS. In one example, when the reference RS is NZP CSI-RS, the resource indicator can be CRI, which indicates an NZP CSI-RS resource. In another example, when the reference RS is SSB, the single resource indicator can be SSBRI, which indicates a SSB resource.

For a beam indication (S3), the TCI-based mechanism as explained in embodiment 1 is used.

In one sub-embodiment (2.1), for beam measurement (S1), the UE is configured (via higher layer RRC signaling) with K reference RSs that are SSBs associated with (transmitted from) multiple cells/entities (comprising the serving or/and neighboring cells/entities, where a neighboring cell is equivalent to a non-serving cell) comprising the super-entity/super-cell. In one example, the configuration includes both location (in frequency domain) and entity-ID/cell-ID associated with each SSB. This configuration can be via RRC signaling including a bitmap indicating entity-IDs/cell-IDs. In another example, the configuration includes only locations (not entity-IDs/cell-IDs) of SSBs, and the UE has to detect (search for) their entity-IDs/cell-IDs. In another example, the configuration includes the frequency band, and the UE has to detect (search for) both locations and/entity-IDs/cell-IDs of SSBs.

In one example, the Rel. 15/16 RRC parameter MeasObjectNR can be reused for the configuration. For instance, the parameter ssbFrequency in MeasObjectNR can be used to configure locations of SSBs, and the parameter ssb-ToMeasure in MeasObjectNR can be used to configure the entity-IDs/cell-IDs of SSBs. In another example, one or multiple new parameters (e.g., in MeasObjectNR) is introduced for this configuration.

For beam reporting (S2), the UE is configured to report N beam report(s) according to step (S2) of embodiment 2 (explained above). For a beam indication (S3), the TCI-based mechanism as explained in embodiment 1 is used.

In one sub-embodiment (2.2), for beam measurement (S1), the UE is configured (via higher layer RRC signaling) with K reference RSs that are (NZP) CSI-RSs associated with (transmitted from) multiple cells/entities (comprising the serving or/and neighboring cells/entities, where a neighboring cell is equivalent to a non-serving cell) comprising the super-entity/super-cell. In one example, the configuration includes both location (in time-frequency domain) and entity-ID/cell-ID associated with each CSI-RS. This configuration can be via RRC signaling including a bitmap indicating entity-IDs/cell-IDs. In one example, the Rel. 15/16 RRC parameter CSI-RS-ResourceConfigMobility can be reused for the configuration.

For beam reporting (S2), the UE is configured to report N beam report(s) according to step (S2) of embodiment 2 (explained above). For a beam indication (S3), the TCI-based mechanism as explained in embodiment 1 is used.

In one sub-embodiment (2.3), for beam measurement (S1), the UE is configured (via higher layer RRC signaling) with K reference RSs that are a combination of SSBs and (NZP) CSI-RSs associated with (transmitted from) multiple cells/entities (comprising the serving or/and neighboring cells/entities, where a neighboring cell is equivalent to a non-serving cell) comprising the super-entity/super-cell. In one example, for SSBs, the configuration includes both location (in frequency domain) and entity-ID/cell-ID associated with each SSB. This configuration can be via RRC signaling including a bitmap indicating entity-IDs/cell-IDs.

In another example, for SSBs, the configuration includes only locations (not entity-IDs/cell-IDs) of SSBs, and the UE has to detect (search for) their entity-IDs/cell-IDs. In another example, for SSBs, the configuration includes the frequency band, and the UE has to detect (search for) both locations and entity-IDs/cell-IDs of SSBs. In one example, for CSR-RSs, the configuration includes both location (in time-frequency domain) and entity-ID/cell-ID associated with each CSI-RS.

In one example, for SSBs, the Rel. 15/16 RRC parameter MeasObjectNR can be reused for the configuration. For instance, the parameter ssbFrequency in MeasObjectNR can be used to configure locations of SSBs, and the parameter ssb-ToMeasure in MeasObjectNR can be used to configure the entity-IDs/cell-IDs of SSBs. In another example, for SSBs, one or multiple new parameters (e.g., in MeasObjectNR) is introduced for this configuration. In one example, for CSI-RSs, the Rel. 15/16 RRC parameter CSI-RS-ResourceConfigMobility can be reused for the configuration.

In one sub-embodiment (2.A), the network (NW) includes X super-entities (X>1) that are fixed in the NW (e.g., no mobility to super-entity). A UE connects to at least one of the X super-entities at any given time, undergoes the BM procedures to acquire at least one beam for DL channel (PDCCH or/and PDSCH). As the UE moves from one entity to another, the UE stays connected to the NW by switching/updating the at least beam within the super-entity the UE is connected to. The UE may eventually go through the traditional handover procedure to connect to another of the X super-entities. According to this sub-embodiment, the super-entities are fixed (don't move), and a UE moves from one super-entity to another (e.g., in case of high mobility UEs).

In one sub-embodiment (2.B), the network (NW) includes X super-entities (X≥1) and Y entities (Y≥1), both are fixed in the NW (e.g., no mobility to super-entity and entity). A UE connects to at least one of the X super-entities or/and Y entities at any given time, undergoes the BM procedures to acquire at least one beam for DL channel (PDCCH or/and PDSCH). As the UE moves from one entity or super-entity to another, the UE stays connected to the NW by switching/updating the at least beam within the super-entity or entity the UE is connected to. The UE may eventually go through the traditional handover procedure to connect to another of the X super-entities or/and the Y entities. According to this sub-embodiment, the super-entities and entities are fixed (don't move), and a UE moves from one entity/super-entity to another entity/super-entity (e.g., in case of high mobility UEs), for example, entity 1 to super-entity 1 to entity 2.

In one sub-embodiment (2.C), the network (NW) includes X super-entities (X≥1) that are configured (e.g., mobility to super-entity) to a UE, i.e., the formation of X super-entities depends on the UE (e.g., UE mobility). This configuration can be via higher-layer (e.g., RRC) or MAC-CE or DCI or RRC+MAC CE or MAC CE+DCI based signaling. A UE connects to at least one of the X super-entities at any given time, undergoes the BM procedures to acquire at least one beam for DL channel (PDCCH or/and PDSCH). As the UE moves from one entity to another, the UE stays connected to the NW by switching/updating the at least beam within the super-entity the UE is connected to. The UE may eventually go through the traditional handover procedure to connect to another of the X super-entities (configured to the UE). For multiple UEs, the configuration of the X super-entities can be UE-specific. Or the configuration can be UE-common (common for all UEs)) or UE-group-common (common for a group of UEs). When the configuration is via DCI, a UE-group DCI can be used. According to this sub-embodiment, the super-entities are not fixed, the super-entities form and move as a UE moves from one super-entity to another (e.g., in case of high mobility UEs).

In one sub-embodiment (2.D), the network (NW) includes X super-entities (X≥1) and Y entities (Y≥1) that are configured, (e.g., mobility to super-entity and entity) to a UE, i.e., the formation of X super-entities or/and Y entities depends on the UE (e.g., UE mobility). This configuration can be via higher-layer (e.g., RRC) or MAC-CE or DCI or RRC+MAC CE or MAC CE+DCI based signaling. A UE connects to at least one of the X super-entities or/and Y entities at any given time, undergoes the BM procedures to acquire at least one beam for DL channel (PDCCH or/and PDSCH). As the UE moves from one entity or super-entity to another, the UE stays connected to the NW by switching/updating the at least beam within the super-entity or entity the UE is connected to. The UE may eventually go through the traditional handover procedure to connect to another of the X super-entities or/and the Y entities (configured to the UE). For multiple UEs, the configuration of the X super-entities can be UE-specific. Or the configuration can be UE-common (common for all UEs)) or UE-group-common (common for a group of UEs). When the configuration is via DCI, a UE-group DCI can be used. According to this sub-embodiment, the super-entities and entities are not fixed, the super-entities and entities form and move as a UE moves from one entity/super-entity to another entity/super-entity (e.g., in case of high mobility UEs), for example, entity 1 to super-entity 1 to entity 2.

In one embodiment (3), a UE is configured with a beam measurement and reporting for one or multiple non-serving cells (as described in this disclosure), wherein the UE is configured with a reporting setting (e.g., via higher layer parameter csi-ReportConfig) that includes a parameter for beam measurement (e.g., resourcesForChannelMeasurement) and a parameter (e.g., nrofReportedRS) to configure N or up to N beam reports. The beam measurement and N or up to N beam reports are associated with non-serving cell(s). Each beam report comprises a resource RS indicator or/and a beam metric (associated with the resource RS indicator).

In one example N=1. In one example, N>1. In one example, N≥1.

In one example, the UE is configured to report at least one beam report. In another example, the UE can report "none" indicating absence (not reported) of any beam report. Note that in this later example, the UE is allowed not to report any beam report if based on the beam measurement the UE determines that none of the resource RSs from the non-serving cell(s) for example have sufficiently large signal power (i.e., above some threshold).

The value of N is determined/configured according to at least one of the following examples: (1) in one example, the maximum value of N is fixed (e.g., 2 or 3 or 4). Or the minimum value of N is fixed (e.g., 1), Or the minimum and maximum values of N are fixed (e.g., the minimum value is 1 and the maximum value of 4); (2) in another example, the UE is configured with a value of N (e.g., from a set of supported values {2, 3} or {3, 4} or {2, 4} or {2, 3, 4} or {1, 2, 4}. This configuration can be based on higher layer (RRC) signaling (or/and MAC CE based indication or/and DCI based indication); (3) in another example, the UE selects the value of N dynamically (e.g., from a set of supported values {2, 3} or {3, 4} or {2, 4} or {2, 3, 4} or {1, 2, 4}). The set of candidate values of N can be configured to the UE for the dynamic selection; (4) in another example, the value of N (e.g., the maximum value of N) is reported by the UE in its capability reporting; and/or (5) in another example, the UE is configured with a value of N (e.g., the maximum value of N) subject to the value reported via the UE capability.

The value of N is fixed subject to the value reported via the UE capability.

The value of N is selected dynamically subject to the value reported via the UE capability.

When N>1: (1) in one example, the beam report is restricted such that at most one beam report can be reported for a non-serving cell, i.e., each beam report corresponds to a different non-serving cell; (2) in one example, there is no restriction, i.e., up to N beam reports can be reported for a non-serving cell; (3) in one example, the beam report is restricted such that all N or up to N beam reports correspond to the same non-serving cell; (4) in one example, whether there is any restriction on beam reporting can be configured to the UE; (5) in one example, any restriction on beam reporting can be reported by the UE in its capability signaling; and (6) in one example, whether there is any restriction on beam reporting can be configured to the UE subject to UE capability reported by the UE.

In sub-embodiment 3.1, the beam measurement and beam reporting associated with non-serving cell(s) can be mixed with that with serving-cell in one reporting setting, i.e., a single reporting setting, the UE can be configured with beam measurement and reporting for both serving cell(s) and non-serving cell(s), wherein the beam report comprises N or up to N beam reports. The beam measurement and N or up to N beam reports are associated with both serving cells(s) and non-serving cell(s). The details about the value of N and beam reporting are according to embodiment 3.

In sub-embodiment 3.2, the beam metric is determined/configured according to at least one of the following examples.

In example 3.2.1, the beam metric is RSRP.

In one example, the beam metric is a L1-RSRP which indicates power level of a resource RS.

In one example, the beam metric is a L3-RSRP (or SS-RSRP or CSI-RSRP) which indicates power level of a resource RS.

In one example, the beam metric is a hybrid (or a combination of) L1-RSRP and L3-SINR.

In example 3.2.2, the beam metric is SINR.

In another example, the beam metric is a L1-SINR which indicates a ratio of signal power and (noise plus) interference power, where the signal power is determined using a resource RS and the interference power is determined using a ZP CSI-RS resource or/and NZP CSI-RS resource configured to the UE for interference measurement.

In another example, the beam metric is a L3-SINR (or SS-SINR or CSI-SINR).

In one example, the beam metric is a hybrid (or a combination of) L1-SINR and L3-SINR.

In example 3.2.3, the beam metric is a hybrid (or a combination of) RSRP and SINR.

In example 3.2.4, the metric is RSRP (cf. example 3.2.1) for a non-serving cell, and RSRP (cf. example 3.2.1) or/and SINR (cf example 3.2.2) for a serving cell.

In example 3.2.5, the beam metric is L1-RSRP or L1-SINR only when the beam report is aperiodic.

In example 3.2.6, the beam metric is L3-RSRP or L3-SINR only when beam report is periodic.

In example 3.2.7, the beam metric is L3-RSRP or L3-SINR only when beam report is semi-persistent.

In example 3.2.8, the beam metric is L3-RSRP or L3-SINR only when beam report is aperiodic.

The definition of L1-RSRP, L1-SINR, L3-RSRP (or SS-RSRP or CSI-RSRP) and L3-SINR (or SS-SINR or CSI-SINR) can be based on the definition provided in 3GPP LTE or NR specifications.

In one example, L1-RSRP and L1-SINR can be reported as a CSI report, and L3-RSRP and L3-SINR can be reported as a RRC measurement report. In another example, regardless of the beam metric, the beam report is reported as a CSI report.

In sub-embodiment 3.3, the resource RS pool (or set) is determined/configured (e.g., via CSI-ResourceConfig) according to at least one of the following examples.

In example 3.3.1, the resource RSs can only be SSBs for non-serving cell(s), and the resource RSs can be SSBs or/and NZP CSI-RS resources for serving cell(s).

In example 3.3.2, the resource RSs can only be SSBs for both non-serving cell(s) and serving cell(s).

In example 3.3.3, the resource RSs can be SSBs or/and NZP CSI-RS resources for both serving and non-serving cell(s).

In example 3.3.4, when beam reporting is mixed, i.e., for both serving and non-serving cell(s), then the resource RS can only be SSBs. But, when both serving and non-serving cell(s) are separate, i.e., either serving cell(s) or non-serving cell(s), not both, then resource RSs can either be SSBs or CSI-RS resources for serving cell(s), but only SSBs for non-serving cell(s).

In example 3.3.5, when beam reporting is mixed, i.e., for both serving and non-serving cell(s), then the resource RSs can only be SSBs. But, when both serving and non-serving cell(s) are separate, i.e., either serving cell(s) or non-serving cell(s), not both, then either SSBs or CSI-RSs for both serving and non-serving cell(s).

In sub-embodiment 3.4, the resource RS pool (or set) is determined/configured (e.g., via CSI-ResourceConfig) according to at least one of the following examples.

In example 3.4.1, the UE is configured with a common (joint) resource RS pool (or set) regardless of whether the beam reporting associated with non-serving cell(s) can be mixed with that with serving cell(s) in one reporting setting.

In example 3.4.2, the UE is configured with a separate resource RS pool (or set) for serving cell(s) and non-serving cell(s). For example, a first resource RS pool can be configured for serving cell(s), and a second resource RS pool can be configured for non-serving cell(s). The two resource RS pools (or sets) can be configured via a single reporting setting. For example, two IEs resourcesForChannelMeasurementServing and resourcesForChannelMeasurementNonServing can be included in the CSI reporting setting.

Figure 11:
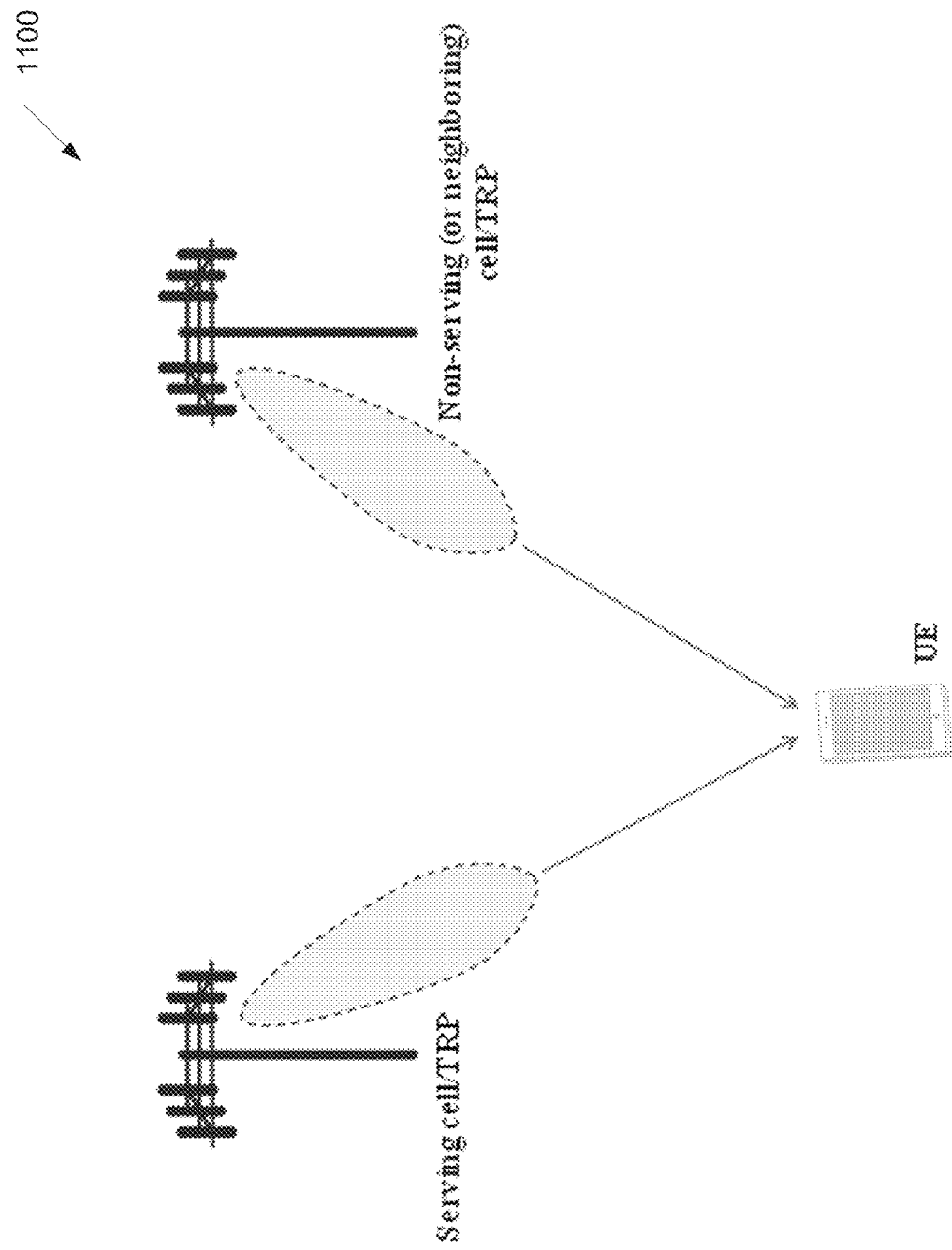
FIG. 11 illustrates an example of inter-cell multi-TRP operation according to embodiments of the present disclosure.

FIG. 11 illustrates an example of inter-cell multi-TRP operation 1100 according to embodiments of the present disclosure. An embodiment of the inter-cell multi-TRP operation 1100 shown in FIG. 11 is for illustration only. For example, the inter-cell multi-TRP operation 1100 as may be performed by a UE such as 111-116 as illustrated in FIG. 1 and a base station such as 101-103 as illustrated in FIG. 1.

Figure 12:
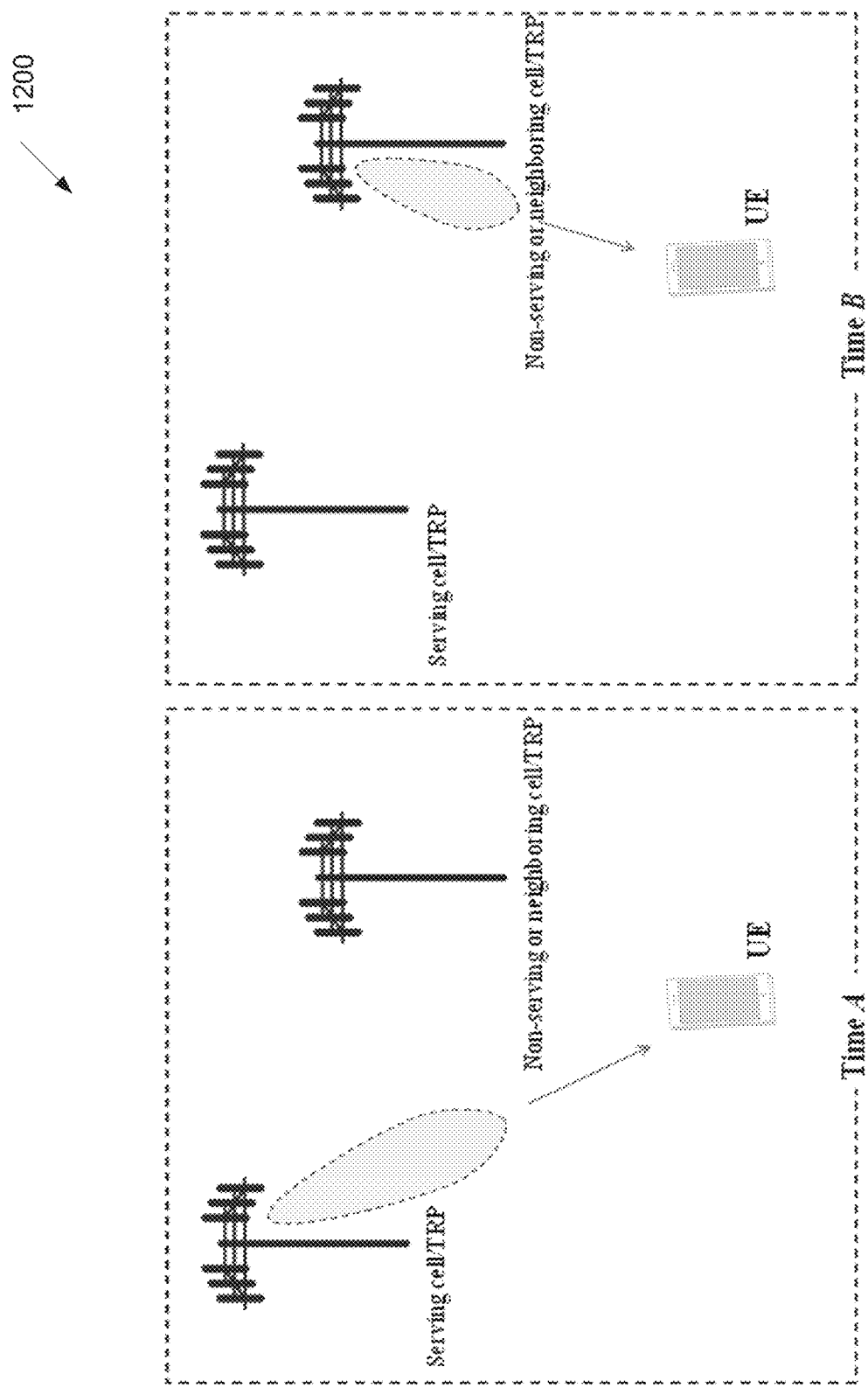
FIG. 12 illustrates an example of inter-cell mobility according to embodiments of the present disclosure.

FIG. 12 illustrates an example of inter-cell mobility 1200 according to embodiments of the present disclosure. An embodiment of the inter-cell mobility 1200 shown in FIG. 12 is for illustration only. For example, the inter-cell mobility 1200 as may be performed by a UE such as 111-116 as illustrated in FIG. 1 and a base station such as 101-103 as illustrated in FIG. 1.

In an inter-cell system depicted in FIGS. 11 and 12, wherein different cells/TRPs could have different PCIs and non-serving (or neighboring) cells/TRPs could have different PCIs from that of the serving cell/TRP, a UE could receive simultaneously from the serving cell/TRP and the non-serving (or neighboring) cell(s)/TRP(s)—FIG. 11, or from at least one cell/TRP, i.e., either the serving cell/TRP or a non-serving (or neighboring) cell/TRP—FIG. 12, various channels/RSs such as a PDCCH and/or a PDSCH in a single (time) slot/mini-slot/symbol/etc. A TRP in the inter-cell system can represent a collection of measurement antenna ports, measurement RS resources and/or control resource sets (CORESETs).

For example, a TRP could be associated with one or more of: (1) a plurality of CSI-RS resources; (2) a plurality of CRIs (CSI-RS resource indices/indicators); (3) a measurement RS resource set, for example, a CSI-RS resource set along with its indicator; (4) a plurality of CORESETs associated with a CORESETPoolIndex; and/or (5) a plurality of CORESETs associated with a TRP-specific index/indicator/identity.

In an inter-cell system, the UE could send to the network beam report(s) for both the serving cell/TRP and non-serving (or neighboring) cell(s)/TRP(s) in a single CSI reporting instance/CSI-Report, wherein the beam report could contain at least one resource indicator such as SSB resource indicator (SSBRI) or CSI-RS resource indicator (CRI) and at least one beam metric such as layer-1 RSRP (L1-RSRP) or layer-1 SINR (L1-SINR). The ordering of the resource indicators (and therefore, the corresponding beam metrics) reported in the same reporting instance for the serving cell/TRP and non-serving (or neighboring) cell(s)/TRP(s) may be specified, and necessary UCI payload reduction strategies such as differential L1-RSRP/L1-SINR reporting are needed.

The present disclosure considers various design aspects/enhancements for beam reporting in an inter-cell system, wherein different cells/TRPs could have different PCIs and one or more PCIs could be different from that of the serving cell/TRP.

In an inter-cell system, wherein different cells/TRPs could have different PCIs and non-serving (or neighboring) cells/TRPs could have different PCIs from that of the serving cell/TRP, the UE could report in a single CSI reporting instance/CSI-Report, $N\_sc \geq 1$ resource indicators such as SSBRIs/CRIs (and therefore, their corresponding $N\_sc$ beam metrics such as L1-RSRPs/L1-SINRs) for the serving cell/TRP and $N\_nsc \geq 1$ resource indicators such as SSBRIs/CRIs (and therefore, their corresponding $N\_nsc$ beam metrics such as L1-RSRPs/L1-SINRs) for $M\_nsc \geq 1$ non-serving (or neighboring) cell(s)/TRP(s).

Denote the number of beam reports—a beam report comprises at least a resource indicator and a corresponding beam metric—for the k-th non-serving (or neighboring) cell/TRP by $n\_nsc[k]$, where $k=1, \ldots, M\_nsc$. It is evident that $N\_nsc = n\_nsc[1] + \ldots + n\_nsc[k] + \ldots + n\_nsc[M\_nsc]$. In this disclosure, a serving cell/TRP could broadcast/be associated with multiple PCIs. For instance, under carrier aggregation (CA) setting, a serving cell/TRP could have more than one $N\_cc > 1$ component carriers (CCs) with each CC associated with a different PCI.

For inter-cell operation in the present disclosure: (1) in one example, in the same reporting instance/CSI-Report, the $N\_sc$ beam reports are for all the $N\_cc$ serving cell/TRP CCs, and the $N\_nsc$ beam reports are for the $M\_nsc$ non-serving (or neighboring) cell(s)/TRP(s)/CC(s); and (2) in another example, in the same reporting instance/CSI-Report, the $N\_sc$ beam reports are for one of the $N\_cc$ serving cell/TRP CCs, and the $N\_nsc$ beam reports are for the $M\_nsc$ non-serving (or neighboring) cell(s)/TRP(s)/CC(s). The one of the $N\_cc$ serving cell/TRP CCs could be determined according to at least one of the following: (i) network's configuration based on UE capability; and (ii) up to UE's implementation and indicate to the network.

The UE could be indicated by the network a list/set/pool of physical cell identities (PCIs), CORESETPoolIndex values or other cell/TRP-specific higher layer signaling index values for the non-serving (or neighboring) cells/TRPs for inter-cell operation; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, the UE could be higher layer configured by the network (e.g., via higher layer RRC signaling) a list/set/pool of $M\_nsc$ PCIs, CORESETPoolIndex values or other cell/TRP-specific higher layer signaling index values for the non-serving (or neighboring) cells/TRPs for the inter-cell operation. In another example, the UE could be first higher layer configured by the network (e.g., via higher layer RRC signaling) a list/set/pool of $M\_nsc\_tot$ PCIs, CORESETPoolIndex values or other cell/TRP-specific higher layer signaling index values for the non-serving (or neighboring) cells/TRPs. The UE could then receive from the network a MAC CE activation command/bitmap to activate $M\_nsc$ entries from the list/set/pool of $M\_nsc\_tot$ non-serving (or neighboring) cells/TRPs as the non-serving (or neighboring) cells/TRPs for the inter-cell operation.

Hence, the k-th non-serving (or neighboring) cell/TRP could correspond to the k-th entry in the list/set/pool of M_nsc non-serving (or neighboring) cells/TRPs for the inter-cell operation. Alternatively, the k-th non-serving (or neighboring) cell/TRP could correspond to the non-serving (or neighboring) cell/TRP with the k-th highest/lowest PCI, CORESETPoolIndex value or other cell/TRP-specific higher layer signaling index value among the list/set/pool of M_nsc non-serving (or neighboring) cells/TRPs.

Optionally, the UE could autonomously determine and indicate to the network the M_nsc non-serving (or neighboring) cells/TRPs for the inter-cell operation. The details about the determination/selection of the non-serving (or neighboring) cell(s)/TRP(s) by the UE are according to the patent application 63/131,682 as incorporated by reference herein.

The value(s) of N_sc, N_nsc or {n_nsc[1], . . . , n_nsc[k], . . . , n_nsc[M_nsc]} could be configured/indicated by the network, or the UE, or both of the network and the UE.

In one embodiment of Method-0 (without any additional signaling), for example, N_sc, N_nsc or {n_nsc[1], . . . , n_nsc[k], . . . , n_nsc[M_nsc]} are all fixed in the system specifications, e.g., to 1. Furthermore, as shown in TABLE 6, when the UE is configured with Rel. 15/16 intra-cell beam reporting, the higher layer parameter nrofReportedRS in CSI-ReportConfig can take a value from {1, 2, 3, 4}. When the UE is configured with Rel. 17 inter-cell beam reporting, however, the higher layer parameter nrofReportedRS has to be {2, 3, 4} and equals nrofReportedRS=N_nsc+N_sc (i.e., at least 1 report for each of serving and non-serving (or neighboring) cell/TRP).

and j's in {1, . . . , M_nsc}. In one example, k is fixed (e.g., k=1) or configured (e.g., via RRC).

In yet another example 1.4, the UE could be indicated by the network the number of beam reports N_sc for the serving cell/TRP, or the total number of beam reports N_nsc for the M_nsc non-serving cells/TRPs, or one or more of the numbers of beam reports n_nsc[1], . . . , n_nsc[k], . . . n_nsc[M_nsc].

In yet another example 1.5, the UE could be indicated by the network the number of beam reports N_sc for the serving cell/TRP, or the total number of beam reports N_tot for both the serving cell/TRP and the M_nsc non-serving cells/TRPs, or one or more of the numbers of beam reports n_nsc[1], . . . , n_nsc[k], . . . , n_nsc[M_nsc].

In yet another example 1.6, the UE could be indicated by the network the total number of beam reports N_tot for both the serving cell/TRP and the M_nsc non-serving (or neighboring) cells/TRPs, or the total number of beam reports N_nsc for the M_nsc non-serving cells/TRPs, or one or more of the numbers of beam reports n_nsc[1], . . . , n_nsc[k], . . . , n_nsc[M_nsc].

The indication of N_sc or N_nsc or N_tot could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the value of N_sc or N_nsc or N_tot is fixed in the specification. For another example, the UE could be higher layer configured by the network (e.g., via higher layer RRC signaling) the exact value of N_sc or N_nsc or N_tot.

TABLE 6

An example of higher layer parameter groupBasedBeamReporting

| | |
|---|---|
| groupBasedBeamReporting | CHOICE { |
| enabled | NULL, |
| disabled | SEQUENCE { |
| nrofReportedRS | ENUMERATED {n1, n2, n3, n4}    OPTIONAL -- Needs |
| } | |
| }, | |

In one embodiment of Method-1, the UE could be indicated/configured by the network the value(s) of N_sc, N_nsc or {n_nsc[1], . . . , n_nsc[k], . . . , n_nsc[M_nsc]}.

In one example 1.1, the UE could be indicated by the network the number of beam reports N_sc for the serving cell/TRP, the total number of beam reports N_nsc for the M_nsc non-serving cells/TRPs, or an indicator to indicate that n_nsc[i]=n_nsc[j]=k for all i's and j's in {1, . . . , M_nsc}. In one example, k is fixed (e.g., k=1) or configured (e.g., via RRC).

In another example 1.2, the UE could be indicated by the network the number of beam reports N_sc for the serving cell/TRP, the total number of beam reports N_tot for both the serving cell/TRP and the M_nsc non-serving (or neighboring) cells/TRPs, or an indicator to indicate that n_nsc[i]=n_nsc[j]=k for all i's and j's in {1, . . . , M_nsc}. In one example, k is fixed (e.g., k=1) or configured (e.g., via RRC).

In yet another example 1.3, the UE could be indicated by the network the total number of beam reports N_tot for both the serving cell/TRP and the M_nsc non-serving (or neighboring) cells/TRPs, the total number of beam reports N_nsc for the M_nsc non-serving (or neighboring) cells/TRPs, or an indicator to indicate that n_nsc[i]=n_nsc[j]=k for all i's Yet for another example, the UE could be first higher layer configured by the network (e.g., via higher layer RRC signaling) a list/set/pool of candidate values for N_sc or N_nsc or N_tot. The UE could then receive from the network a MAC CE activation command/bitmap to activate one value from the list/set/pool of candidate values for N_sc/N_nsc/N_tot as N_sc/N_nsc/N_tot. Furthermore, the indication of n_nsc[1], . . . , n_nsc[k], . . . , n_nsc[M_nsc] could be via higher layer (RRC) or/and MAC CE or/and DCI based signaling or/and any combination of at least two of RRC, MAC CE and DCI based signaling; this indication could be via a separate (dedicated) parameter or joint with another parameter.

For example, the values of n_nsc[1], . . . , n_nsc[k], . . . , n_nsc[M_nsc] are fixed in the specification.

For another example, the UE could be higher layer configured by the network (e.g., via higher layer RRC signaling) the exact values of n_nsc[1], . . . , n_nsc[k], . . . , n_nsc[M_nsc]. Yet for another example, the UE could be first higher layer configured by the network (e.g., via higher layer RRC signaling) multiple lists/sets/pools of candidate values for n_nsc[1], . . . , n_nsc[k], . . . n_nsc[M_nsc]. The UE could then receive from the network a MAC CE activation command/bitmap to activate one list/set/pool from the higher layer configured multiple lists/sets/pools of candidate values for n_nsc[1], . . . , n_nsc[k], . . . , n_nsc[M_nsc] as the values of n_nsc[1], . . . , n_nsc[k], . . . , n_nsc[M_nsc]. In addition, the UE could receive from the network another MAC CE activation command/bitmap to activate one or more values of n_nsc[1], . . . , n_nsc[k], . . . , n_nsc[M_nsc].

For example, when the configuration is RRC, the configuration can be included in the higher layer CSI-Report-Config as shown in TABLE 7, where nrofReportedRSServing maps to N_sc and nrofReportedRSNonServing maps to N_nsc.

TABLE 7

An example of higher layer parameter groupBasedBeamReportingInterCell for inter-cell operation

| groupBasedBeamReportingInterCell | CHOICE { | |
|---|---|---|
| enabled | NULL, | |
| disabled | SEQUENCE { | |
| nrofReportedRSServing | ENUMERATED {n1, n2, ...} | OPTIONAL -- Need S |
| nrofReportedRSNonServing | ENUMERATED {m, m2, ...} | OPTIONAL -- Need S |
| } | | |
| }, | | |

In one example, the set of supported pairs of values for nrofReportedRSServing belong to {n1, n2, n3} or {n1, n2, n3, n4}, and the set of supported pairs of values for nrofReportedRSNonServing belong to {m1, m2, m3} or {m1, m2, m3, m4}. In one example, there is restriction on supported values for nrofReportedRSServing and nrofReportedRSNonServing, for example, their configured values are such that their sum is at most 4.

TABLE 8 shows another example of higher layer parameter groupBasedBeamReportingInterCell for inter-cell operation.

TABLE 8

An example of higher layer parameter groupBasedBeamReportingInterCell for inter-cell operation

| groupBasedBeamReportingInterCell | CHOICE { | |
|---|---|---|
| enabled | NULL, | |
| disabled | SEQUENCE { | |
| nrofReportedR | ENUMERATED {(n1,m1), (n1,m2), ...} | OPTIONAL -- Need S } |
| }, | | |

As illustrated in TABLE 8, nrofReportedR indicates a pair of a values for (N_sc, N_nsc). In one example, the set of supported pairs of values belong to {(n1, m1), (n1, m2), (n1, m3), (n2, m1), (n2, m2), (n1, m3), (n3, m1)}.

In one embodiment of Method-2, the UE could autonomously determine the value(s) of N_sc, N_nsc or {n_nsc[1], . . . , n_nsc[k], . . . , n_nsc[M_nsc]}, and report to the network one or more of them in part of the beam/CSI report or multiplexed with HARQ-ACK or multiplexed with scheduling request (SR) or via higher layer signaling such as MAC CE.

In one example 2.1, the UE could report to the network the number of beam reports N_sc for the serving cell/TRP, the total number of beam reports N_nsc for the M_nsc non-serving cells/TRPs, or n_nsc[i]=n_nsc[j]=k for all i's and j's in {1, . . . , M_nsc}. In one example, k is fixed (e.g., k=1) or configured (e.g., via RRC) or reported by the UE (e.g., as part of the beam report).

In another example 2.2, the UE could report to the network the number of beam reports N_sc for the serving cell/TRP, the total number of beam reports N_tot for both the serving cell/TRP and the M_nsc non-serving (or neighboring) cells/TRPs, or n_nsc[i]=n_nsc[j]=k for all i's and j's in {1, . . . , M_nsc}. In one example, k is fixed (e.g., k=1) or configured (e.g., via RRC) or reported by the UE (e.g., as part of the beam report).

In yet another example 2.3, the UE could report the network the total number of beam reports N_tot for both the serving cell/TRP and the M_nsc non-serving (or neighboring) cells/TRPs, the total number of beam reports N_nsc for the M_nsc non-serving (or neighboring) cells/TRPs, or n_nsc[i]=n_nsc[j]=k for all i's and j's in {1, . . . , M_nsc}. In one example, k is fixed (e.g., k=1) or configured (e.g., via RRC) or reported by the UE (e.g., as part of the beam report).

In yet another example 2.4, the UE could report to the network the number of beam reports N_sc for the serving cell/TRP, or the total number of beam reports N_nsc for the M_nsc non-serving cells/TRPs, or one or more of the numbers of beam reports n_nsc[1], . . . , n_nsc[k], . . . , n_nsc[M_nsc].

In yet another example 2.5, the UE could report to the network the number of beam reports N_sc for the serving cell/TRP, or the total number of beam reports N_tot for both the serving cell/TRP and the M_nsc non-serving cells/TRPs, or one or more of the numbers of beam reports n_nsc[1], . . . n_nsc[k], . . . , n_nsc[M_nsc].

In yet another example 2.6, the UE could report to the network the total number of beam reports N_tot for both the serving cell/TRP and the M_nsc non-serving (or neighboring) cells/TRPs, or the total number of beam reports N_nsc for the M_nsc non-serving cells/TRPs, or one or more of the numbers of beam reports n_nsc[1], . . . , n_nsc[k], . . . , n_nsc[M_nsc].

In one embodiment of Method-3, both the network and the UE could configure one or more of the values of N_sc, N_nsc or {n_nsc[1], . . . , n_nsc[k], . . . , n_nsc[M_nsc]}. If certain value(s) of N_sc, N_nsc or {n_nsc[1], . . . , n_nsc[k], . . . , n_nsc[M_nsc]} is determined/configured by the network, the corresponding configuration/indication methods could follow those specified in Method-1 in the present disclosure (e.g., examples 1.1, 1.2, 1.3, 1.4, 1.5 or 1.6). If certain value(s) of N_sc, N_nsc or {n_nsc[1], . . . , n_nsc[k], . . . , n_nsc[M_nsc]} is determined/configured by the UE, the UE may report to the network the determined value(s) in part of the beam/CSI report or multiplexed with HARQ-ACK or multiplexed with SR, following those specified in Method-2 in the present disclosure (e.g., examples 2.1, 2.2, 2.3, 2.4, 2.5 or 2.6).

In one example, the NW configures the total number of beam reports N_tot for both the serving cell/TRP and the M_nsc non-serving cells/TRPs, and the UE determines N_sc and N_nsc values such that N_tot=N_sc+N_nsc.

In one example, N_sc can be zero. Hence, N_nsc can be up to (at most) N_tot.

In one example, N_sc can be at least one. Hence, N_nsc can be up to (at most) N_tot-1.

In one example, only one (not both) of N_sc and N_nsc can be zero.

In one example, each of N_sc and N_nsc is at least one.

In one example, N_tot>=2.

In one example, N_tot can be 1.

Various reporting formats could be configured for Rel. 15/16 intra-cell beam reporting and/or Rel. 17 inter-cell beam reporting.

In one example: (1) for the intra-cell beam reporting, e.g., as in the Rel. 15/16 group based beam reporting, the UE uses differential beam metric reporting. For instance, the first measured L1-RSRP value in the given CSI reporting instance/CSI-Report is quantized to a 7-bit value in the range [-140, -44] dBm with 1 dB step size, and the remaining measured L1-RSRP values are quantized to a 4-bit value with 2 dB step size with a reference to the first beam metric in the same reporting instance/CSI-Report; and (2) for the inter-cell beam reporting, e.g., based on the Rel. 17 inter-cell operation, the UE uses normal/non-differential beam metric reporting. For instance, all the measured L1-RSRP values are quantized to 7-bit values in the range [-140, -44] dBm with 1 dB step size.

In another example: (1) for the intra-cell beam reporting, e.g., as in the Rel. 15/16 group based beam reporting, the UE uses differential beam metric reporting. For instance, the first measured L1-RSRP value in the given CSI reporting instance/CSI-Report is quantized to a 7-bit value in the range [-140, -44] dBm with 1 dB step size, and the remaining measured L1-RSRP values are quantized to a 4-bit value with 2 dB step size with a reference to the first beam metric in the same reporting instance/CSI-Report; and (2) for the inter-cell beam reporting, e.g., based on the Rel. 17 inter-cell operation, the UE uses differential beam metric reporting for the serving cell/TRP. For instance, the largest measured L1-RSRP value associated with the serving cell/TRP is quantized to a 7-bit value in the range [-140, -44] dBm with 1 dB step size, and the remaining measured L1-RSRP values associated with the serving cell/TRP are quantized to a 4-bit value with 2 dB step size with a reference to the largest measured L1-RSRP value associated with the serving cell/TRP in the same reporting instance/CSI-Report. Furthermore, the UE uses normal/non-differential beam metric reporting for the non-serving (or neighboring) cell(s)/TRP(s). For instance, all the measured L1-RSRP values associated with the non-serving (or neighboring) cell(s)/TRP(s) are quantized to 7-bit values in the range [-140, -44] dBm with 1 dB step size.

In yet another example: (1) for the intra-cell beam reporting, e.g., as in the Rel. 15/16 group based beam reporting, the UE uses differential beam metric reporting. For instance, the first measured L1-RSRP value in the given CSI reporting instance/CSI-Report is quantized to a 7-bit value in the range [-140, -44] dBm with 1 dB step size, and the remaining measured L1-RSRP values are quantized to a 4-bit value with 2 dB step size with a reference to the first beam metric in the same reporting instance/CSI-Report; and (2) for the inter-cell beam reporting, e.g., based on the Rel. 17 inter-cell operation, the UE uses differential beam metric reporting for the non-serving (or neighboring) cell(s)/TRP(s). For instance, the largest measured L1-RSRP value associated with the non-serving (or neighboring) cell(s)/TRP(s) is quantized to a 7-bit value in the range [-140, -44] dBm with 1 dB step size, and the remaining measured L1-RSRP values associated with the non-serving (or neighboring) cell(s)/TRP(s) are quantized to a 4-bit value with 2 dB step size with a reference to the largest measured L1-RSRP value associated the non-serving (or neighboring) cell(s)/TRP(s) in the same reporting instance/CSI-Report. Furthermore, the UE uses normal/non-differential beam metric reporting for the serving cell/TRP. For instance, all the measured L1-RSRP values associated with the serving cell/TRP are quantized to 7-bit values in the range [-140, -44] dBm with 1 dB step size.

In yet another example: (1) for the intra-cell beam reporting, e.g., as in the Rel. 15/16 group based beam reporting, the UE uses differential beam metric reporting. For instance, the first measured L1-RSRP value in the given CSI reporting instance/CSI-Report is quantized to a 7-bit value in the range [-140, -44] dBm with 1 dB step size, and the remaining measured L1-RSRP values are quantized to a 4-bit value with 2 dB step size with a reference to the first beam metric in the same reporting instance/CSI-Report; and (2) for the inter-cell beam reporting, e.g., based on the Rel. 17 inter-cell operation, the UE could use differential beam metric reporting and/or normal/non-differential beam metric reporting for the serving cell/TRP and/or the non-serving cell(s)/TRP(s) according to at least one of the following: (i) a network configuration/indication; and (ii) one or more triggering conditions: e.g., if the total number (N_tot) of beam reports for both the serving cell/TRP and the M_nsc non-serving cells/TRPs is greater than a threshold, the UE uses differential beam metric reporting for all the beam metrics in the same reporting instance/CSI-Report, otherwise (N_tot is less than or equal to the threshold), the UE uses normal/non-differential beam metric reporting for all the beam metrics in the same reporting instance/CSI-Report. The threshold could be a fixed value, e.g., 2, or configured by the network.

In yet another example: (1) for the intra-cell beam reporting, e.g., as in the Rel. 15/16 group based beam reporting, the UE uses differential beam metric reporting. For instance, the first measured L1-RSRP value in the given CSI reporting instance/CSI-Report is quantized to a 7-bit value in the range [-140, -44] dBm with 1 dB step size, and the remaining measured L1-RSRP values are quantized to a 4-bit value with 2 dB step size with a reference to the first beam metric in the same reporting instance/CSI-Report; and (2) for the inter-cell beam reporting, e.g., based on the Rel. 17 inter-cell operation, the UE could use differential beam metric reporting for the serving cell/TRP and/or the non-serving cell(s)/TRP(s). In this example, the differential L1-RSRP values are quantized to a x-bit value with (+/−) ydB step size with a reference to the first beam metric in the same reporting instance/CSI-Report, where the value(s) of x and y could be different from those specified in Rel. 15/16. For instance, in Rel. 15/16, x=4 with y=2, while for Rel. 17 inter-cell beam reporting, x=2 with y=2 and −2. Or equivalently, the differential beam metric reporting table for the inter-cell beam reporting could contain both positive and negative entries, which can be used when the beam metrics in the same reporting instance are not ordered/sorted.

In embodiment of Scheme-0, the ordering of the resource indicators (and therefore, the corresponding beam metrics) of the serving cell/TRP and the non-serving (or neighboring) cell(s)/TRP(s) in a reporting instance/CSI-Report is fixed in the system specifications. If differential RSRP/SINR reporting is enabled, the UE could indicate to the network the reference RSRP/SINR value (e.g., the largest measured RSRP/SINR value) or the position of the corresponding resource indicator/beam metric among all the resource indicators/beam metrics reported in the same reporting instance/CSI-Report. Alternatively, if differential RSRP/SINR reporting is enabled, the (reference) position in the reporting instance/CSI-Report can be fixed, e.g., to the $1^{st}$ beam report or $1^{st}$ beam report associated with the serving cell/TRP or $1^{st}$ position in the reporting instance/CSI-Report.

In one example 0.0, the resource indicators (and therefore, the corresponding beam metrics) of both the serving cell/TRP and the non-serving (or neighboring) cell(s)/TRP(s) reported in the same reporting instance/CSI-Report may be ordered according to the ordering of their associated PCI values/CORESETPoolIndex values/other cell/TRP-specific higher layer signaling index values, e.g., from high (or low) to low (or high). Alternatively, the resource indicators (and therefore, the corresponding beam metrics) of both the serving cell/TRP and the non-serving (or neighboring) cell(s)/TRP(s) reported in the same reporting instance/CSI-Report may be ordered according to the ordering of their associated PCI values/CORESETPoolIndex values/other cell/TRP-specific higher layer signaling index values in the higher layer RRC configured list/set/pool of PCI values/CORESETPoolIndex values/other cell/TRP-specific higher layer signaling index values of the serving cell/TRP and the non-serving (or neighboring) cell(s)/TRP(s).

In another example 0.1, the exact position(s)/ordering of the resource indicators (and therefore, the corresponding beam metrics) of the serving cell/TRP in the CSI reporting instance is fixed. For instance, the first N_sc resource indicators (and therefore, the corresponding N_sc beam metrics) reported in the CSI reporting instance may correspond to the N_sc resource indicators (and therefore, the corresponding N_sc beam metrics) of the serving cell/TRP. Furthermore, the remaining resource indicators (and therefore, the corresponding beam metrics) reported in the same reporting instance/CSI-Report, may correspond to those of the M_nsc non-serving (or neighboring) cells/TRPs and be ordered according to the ordering of their associated (non-serving or neighboring) PCI values/CORESETPoolIndex values/other cell/TRP-specific higher layer signaling index values, e.g., from high (or low) to low (or high), or according to the ordering of their associated PCI values/CORESETPoolIndex values/other cell/TRP-specific higher layer signaling index values in the higher layer RRC configured list/set/pool of PCI values/CORESETPoolIndex values/other cell/TRP-specific higher layer signaling index values of the non-serving (or neighboring) cell(s)/TRP(s).

In one example of Scheme-1, the network configures the ordering of the resource indicators (and therefore, the corresponding beam metrics) in a CSI reporting configuration. Or the UE determines/reports the ordering of the resource indicators (and therefore, the corresponding beam metrics), e.g., as part of the CSI/beam report. Or a combination of both of the network and the UE could first determine/configure the ordering of the resource indicators (and therefore, the corresponding beam metrics) in a reporting instance/CSI-Report. If differential RSRP/SINR reporting is enabled, the UE could indicate to the network the reference RSRP/SINR value (e.g., the largest measured RSRP/SINR value) or the position of the corresponding resource indicator/beam metric among all the resource indicators/beam metrics reported in the same reporting instance/CSI-Report. Alternatively, if differential RSRP/SINR reporting is enabled, the (reference) position in the reporting instance/CSI-Report can be fixed, e.g., to the $1^{st}$ beam report or $1^{st}$ beam report associated with the serving cell/TRP or $1^{st}$ position in the reporting instance/CSI-Report.

In one embodiment of Method-1.1, the UE could be indicated/configured by the network the ordering of the resource indicators (and therefore, the corresponding beam metrics) of the serving cell/TRP and the non-serving (or neighboring) cell(s)/TRP(s) in a reporting instance/CSI-Report; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example 1.1.0, the UE could be explicitly indicated by the network the exact ordering of the resource indicators (and therefore, the corresponding beam metrics) of both the serving cell/TRP and the non-serving (or neighboring) cell(s)/TRP(s) reported in the same reporting instance/CSI-Report. For instance, for a system comprising a serving cell and a non-serving (or neighboring) cell, if the UE reports two SSBRIs for the serving cell (denoted by ssbri_sc_0 and ssbri_sc_1) and one SSBRI for the non-serving (or neighboring) cell (denoted by ssbri_nsc_0), the UE could be indicated by the network to order the reported resource indicators in the same CSI reporting instance as {ssbri_sc_0, ssbri_nsc_0, ssbri_sc_1}.

In another example 1.1.1, the UE could be indicated by the network that the resource indicators (and therefore, the corresponding beam metrics) of both the serving cell/TRP and the non-serving (or neighboring) cell(s)/TRP(s) reported in the same reporting instance/CSI-Report may be ordered according to the ordering of their associated PCI values/CORESETPoolIndex values/other cell/TRP-specific higher layer signaling index values, e.g., from high (or low) to low (or high). Alternatively, the UE could be indicated by the network that the resource indicators (and therefore, the corresponding beam metrics) of both the serving cell/TRP and the non-serving (or neighboring) cell(s)/TRP(s) reported in the same reporting instance/CSI-Report may be ordered according to the ordering of their associated PCI values/CORESETPoolIndex values/other cell/TRP-specific higher layer signaling index values in the higher layer RRC configured list/set/pool of PCI values/CORESETPoolIndex values/other cell/TRP-specific higher layer signaling index values of the serving cell/TRP and the non-serving (or neighboring) cell(s)/TRP(s).

In yet another example 1.1.2, the UE could be first indicated by the network the exact position(s)/ordering of the resource indicators (and therefore, the corresponding beam metrics) of the serving cell/TRP in the CSI reporting instance. For instance, the UE could be indicated by the network that the first N_sc resource indicators (and therefore, the corresponding N_sc beam metrics) reported in the CSI reporting instance may correspond to the N_sc resource indicators (and therefore, the corresponding N_sc beam metrics) of the serving cell/TRP. Furthermore, the UE could be indicated by the network that the remaining resource indicators (and therefore, the corresponding beam metrics) in the same reporting instance/CSI-Report, may correspond to those of the M_nsc non-serving (or neighboring) cells/TRPs and be ordered according to the ordering of their associated (non-serving or neighboring) PCI values/CORE-SETPoolIndex values/other cell/TRP-specific higher layer signaling index values, e.g., from high (or low) to low (or high), or according to the ordering of their associated PCI values/CORESETPoolIndex values/other cell/TRP-specific higher layer signaling index values in the higher layer RRC configured list/set/pool of PCI values/CORESETPoolIndex values/other cell/TRP-specific higher layer signaling index values of the non-serving (or neighboring) cell(s)/TRP(s).

In yet another example 1.1.3, the UE could receive from the network one or more MAC CE commands/bitmaps, each associating with a cell/TRP, to indicate the exact position(s)/ordering of the resource indicators (and therefore, the corresponding beam metrics) of the corresponding cells/TRPs in the CSI reporting instance/CSI-Report. The MAC CE command/bitmap could contain PCI, CORESET-PoolIndex value or other cell/TRP-specific higher layer signaling index value of the indicated cell/TRP. For instance, for a system comprising a serving cell and a non-serving (or neighboring) cell, the UE could report to the network two SSBRIs for the serving cell (denoted by ssbri_sc_0 and ssbri_sc_1) and one SSBRI for the non-serving (or neighboring) cell (denoted by ssbri_nsc_0). The UE could be indicated by the network a bitmap [1 0 1] for the serving cell/TRP and a bitmap [0 1 0] for the non-serving (or neighboring) cell/TRP. Following the indicated bitmaps, the UE could order the reported resource indicators in the same CSI reporting instance as {ssbri_sc_0, ssbri_nsc_0, ssbri_sc_1}.

In yet another example 1.1.4, the UE could be first indicated by the network the exact position(s)/ordering of the resource indicators (and therefore, the corresponding beam metrics) of the serving cell/TRP in the CSI reporting instance. For instance, the UE could be indicated by the network that the first N_sc resource indicators (and therefore, the corresponding N_sc beam metrics) reported in the CSI reporting instance may correspond to the N_sc resource indicators (and therefore, the corresponding N_sc beam metrics) of the serving cell/TRP. Furthermore, the UE could receive from the network one or more MAC CE commands/bitmaps, each associating with a non-serving (or neighboring) cell/TRP, to indicate the exact position(s)/ordering of the resource indicators (and therefore, the corresponding beam metrics) of the corresponding non-serving (or neighboring) cells/TRPs in the reporting instance/CSI-Report. The MAC CE command/bitmap could contain PCI, CORE-SETPoolIndex value or other cell/TRP-specific higher layer signaling index value of the indicated non-serving (or neighboring) cell/TRP.

In yet another example 1.1.5, at least two of the aforementioned design examples 1.1.1 or 1.1.2 or 1.1.3 or 1.1.4 could be used to determine the position(s)/ordering of the resource indicators (and therefore, the corresponding beam metrics) of the serving cell/TRP and the non-serving (or neighboring) cell(s)/TRP(s) in a reporting instance/CSI-Report. For instance, following the example 1.1.3, the UE could receive from the network one or more MAC CE commands/bitmaps, each associating with a cell/TRP, to indicate the exact position(s)/ordering of the resource indicators (and therefore, the corresponding beam metrics) of the corresponding cells/TRPs in the CSI reporting instance/CSI-Report. For the remaining cells/TRPs not associating with any MAC CE commands/bitmaps, the UE could follow the example 1.1.1 to determine the ordering of their resource indicators (and therefore, the corresponding beam metrics) in the same CSI reporting instance/CSI-Report.

In yet another example 1.1.6, the UE could be first indicated by the network one or more reference positions/ordering in the reporting instance/CSI-Report. For instance, the reference position(s)/ordering in the reporting instance/CSI-Report could be used to send the resource indicator(s) with the largest (or the smallest) measured L1-RSRP/L1-SINR; furthermore, the reference position(s)/ordering in the reporting instance/CSI-Report could be used to send the largest (or the smallest) measured L1-RSRP/L1-SINR. The indication of the reference position(s)/ordering in the CSI reporting instance/CSI-Report could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE could receive from the network a bitmap (or a MAC CE command) with each bit position in the bitmap corresponding to a position/ordering in the CSI reporting instance/CSI-Report. If a bit position in the bitmap is enabled, e.g., set to "1," the corresponding position in the CSI reporting instance/CSI-Report is then configured as the reference position/ordering. The ordering of the resource indicators (and therefore, the corresponding beam metrics) for the rest of the position(s) other than the reference position(s) in the same CSI reporting instance/CSI-Report could follow those specified in the design examples 1.1.1, 1.1.2, 1.1.3, 1.1.4 or 1.1.5.

In one embodiment of Method-1.2, the UE could autonomously determine the ordering of the resource indicators (and therefore, the corresponding beam metrics) of the serving cell/TRP and the non-serving (or neighboring) cell(s)/TRP(s) in a reporting instance/CSI-Report; the UE could indicate to the network the determined ordering of the resource indicators (and therefore, the corresponding beam metrics) of the serving cell/TRP and the non-serving (or neighboring) cell(s)/TRP(s) in the reporting instance/CSI-Report; furthermore, the UE could report to the network the indication in part of the beam/CSI report or multiplexed with HARQ-ACK or multiplexed with scheduling request (SR) or via higher layer signaling such as MAC CE.

In one example 1.2.0, the UE could explicitly indicate to the network the exact ordering of the resource indicators (and therefore, the corresponding beam metrics) of both the serving cell/TRP and the non-serving (or neighboring) cell(s)/TRP(s) reported in the same reporting instance/CSI-Report. For instance, for a system comprising a serving cell and a non-serving (or neighboring) cell, if the UE reports two SSBRIs for the serving cell (denoted by ssbri_sc_0 and ssbri_sc_1) and one SSBRI for the non-serving (or neighboring) cell (denoted by ssbri_nsc_0), the UE could first determine the ordering of the reported resource indicators in the same CSI reporting instance as, e.g., {ssbri_sc_0, ssbri_nsc_0, ssbri_sc_1}; the UE could then indicate to the network the determined ordering.

In another example 1.2.1, the UE could indicate to the network that the resource indicators (and therefore, the corresponding beam metrics) of both the serving cell/TRP and the non-serving (or neighboring) cell(s)/TRP(s) reported in the same reporting instance/CSI-Report are ordered according to the ordering of their associated PCI values/ CORESETPoolIndex values/other cell/TRP-specific higher layer signaling index values, e.g., from high (or low) to low (or high). Alternatively, the UE could indicate to the network that the resource indicators (and therefore, the corresponding beam metrics) of both the serving cell/TRP and the non-serving (or neighboring) cell(s)/TRP(s) reported in the same reporting instance/CSI-Report are ordered according to the ordering of their associated PCI values/CORESETPoolIndex values/other cell/TRP-specific higher layer signaling index values in the higher layer RRC configured list/set/pool of PCI values/CORESETPoolIndex values/ other cell/TRP-specific higher layer signaling index values of the serving cell/TRP and the non-serving (or neighboring) cell(s)/TRP(s).

In yet another example 1.2.2, the UE could first determine the position(s)/ordering of the resource indicators (and therefore, the corresponding beam metrics) of the serving cell/TRP in the CSI reporting instance and indicate to the network the determined ordering. For instance, the UE could indicate to the network that the first N_sc resource indicators (and therefore, the corresponding N_sc beam metrics) reported in the CSI reporting instance/CSI-Report correspond to the N_sc resource indicators (and therefore, the corresponding N_sc beam metrics) of the serving cell/TRP. Furthermore, the UE could indicate to the network that the remaining resource indicators (and therefore, the corresponding beam metrics) reported in the same reporting instance/CSI-Report, are ordered according to the ordering of their associated (non-serving or neighboring) PCI values/ CORESETPoolIndex values/other cell/TRP-specific higher layer signaling index values, e.g., from high (or low) to low (or high), or according to the ordering of their associated PCI values/CORESETPoolIndex values/other cell/TRP-specific higher layer signaling index values in the higher layer RRC configured list/set/pool of PCI values/CORESETPoolIndex values/other cell/TRP-specific higher layer signaling index values of the non-serving (or neighboring) cell(s)/TRP(s).

In yet another example 1.2.3, the UE could send to the network one or more MAC CEs/bitmaps, each associating with a cell/TRP, to indicate the exact position(s)/ordering of the resource indicators (and therefore, the corresponding beam metrics) of the corresponding cells/TRPs in the CSI reporting instance/CSI-Report. The MAC CE/bitmap could contain PCI, CORESETPoolIndex value or other cell/TRP-specific higher layer signaling index value of the indicated cell/TRP. For instance, for a system comprising a serving cell and a non-serving (or neighboring) cell, the UE could report to the network two SSBRIs for the serving cell (denoted by ssbri_sc_0 and ssbri_sc_1) and one SSBRI for the non-serving (or neighboring) cell (denoted by ssbri_nsc_0). The UE could send to the network a bitmap [1 0 1] for the serving cell/TRP and a bitmap [0 1 0] for the non-serving (or neighboring) cell/TRP, which indicate the positions/ordering of the reported resource indicators in the same CSI reporting instance as {ssbri_sc_0, ssbri_nsc_0, ssbri_sc_1}.

In yet another example 1.2.4, the UE could first determine the exact position(s)/ordering of the resource indicators (and therefore, the corresponding beam metrics) of the serving cell/TRP in the CSI reporting instance and indicate to the network the determined ordering. For instance, the UE could indicate to the network that the first N_sc resource indicators (and therefore, the corresponding N_sc beam metrics) reported in the CSI reporting instance correspond to the N_sc resource indicators (and therefore, the corresponding N_sc beam metrics) of the serving cell/TRP. Furthermore, the UE could send to the network one or more MAC CEs/bitmaps, each associating with a non-serving (or neighboring) cell/TRP, to indicate the exact position(s)/ordering of the resource indicators (and therefore, the corresponding beam metrics) of the corresponding non-serving (or neighboring) cells/TRPs in the same CSI reporting instance/CSI-Report. The MAC CE/bitmap could contain PCI, CORESETPoolIndex value or other cell/TRP-specific higher layer signaling index value of the indicated non-serving (or neighboring) cell/TRP.

In yet another example 1.2.5, at least two of the aforementioned design examples 1.2.1 or 1.2.2 or 1.2.3 or 1.2.4 could be used to determine the ordering of the resource indicators (and therefore, the corresponding beam metrics) of the serving cell/TRP and the non-serving (or neighboring) cell(s)/TRP(s) in a reporting instance/CSI-Report. For instance, following the example 1.2.3, the UE could indicate to the network one or more MAC CEs/bitmaps, each associating with a cell/TRP, to indicate the exact position(s)/ ordering of the resource indicators (and therefore, the corresponding beam metrics) of the corresponding cells/TRPs in the CSI reporting instance/CSI-Report. For the remaining cells/TRPs not associating with any MAC CEs/bitmaps, the UE could follow the example 1.2.1 to determine the ordering of their resource indicators (and therefore, the corresponding beam metrics) in the same CSI reporting instance/CSI-Report, and indicate to the network the determined ordering.

In one embodiment of Method-1.3, both the network and the UE could determine the ordering of the resource indicators (and therefore, the corresponding beam metrics) of the serving cell/TRP and the non-serving (or neighboring) cell(s)/TRP(s) in a reporting instance/CSI-Report. That is, the UE could be indicated/configured by the network the ordering of the resource indicators (and therefore, the corresponding beam metrics) of one or more cells/TRPs in a reporting instance/CSI-Report following those specified in Method-1.1; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. Furthermore, the UE could autonomously determine the ordering of the resource indicators (and therefore, the corresponding beam metrics) of the remaining cell(s)/TRP(s) in a reporting instance/CSI-Report; the UE could indicate to the network the determined ordering of the resource indicators (and therefore, the corresponding beam metrics) of the remaining cell(s)/TRP(s) in the reporting instance/CSI-Report; the UE could report to the network the indication in part of the beam/CSI report or multiplexed with HARQ-ACK or multiplexed with scheduling request (SR) or via higher layer signaling such as MAC CE.

In one embodiment of Method-1.4, the UE could report in the same CSI reporting instance/CSI-Report K beam qualities including K beam metrics such as L1-RSRPs/L1-SINRs and the corresponding K resource indicators such as SSBRIs or CRIs; the K beam qualities could be associated with both the serving cell or the non-serving cell(s) or only the serving cell or only the non-serving cell(s). Furthermore, the UE could be indicated by the network, or autonomously determine to report a beam quality for a different PCI. In this example, the UE would report in the same reporting instance/CSI-Report K beam qualities including K beam metrics such as L1-RSRPs/L1-SINRs and the corresponding K resource indicators such as SSBRIs or CRIs for K different PCIs. The UE could indicate to the network the K PCI values or K entity ID values corresponding to PCI values, CORESETPoolIndex values, TRP-specific index/ID values, TRP-specific higher layer signaling index values or etc. The K beam qualities including the K resource indicators and their associated K beam metrics are ordered in the same CSI reporting instance/CSI-Report following their associated PCI values or entity ID values in decreasing (or increasing) order.

Alternatively, the UE could report the beam quality including the resource indicator and the associated beam metric associated with the serving cell PCI in the first position/entry in the CSI reporting instance/CSI-Report; the remaining (K−1) beam qualities including the (K−1) resource indicators and their associated (K−1) beam metrics are ordered in the remaining (K−1) positions/entries in the same CSI reporting instance/CSI-Report following their associated PCI values or entity ID values in decreasing (or increasing) order.

As aforementioned, for both Scheme-0 and Scheme-1 based mechanisms to order the resource indicators (and therefore, the corresponding beam metrics) of the serving cell/TRP and the non-serving (or neighboring) cell(s)/TRP (s) in a single reporting instance/CSI-Report, the differential RSRP/SINR reporting could be enabled. There could be various means or conditions to configure/indicate/enable the differential RSRP/SINR reporting for the inter-cell operation.

In one example of Option-I, the UE could be indicated by the network to report the differential RSRP/SINR value(s) for the inter-cell operation; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. Optionally, the UE could receive from the network an indicator (e.g., a two-bit indicator) to indicate whether the differential RSRP/SINR reporting for the inter-cell operation may be applied jointly to both the serving cell/TRP and the non-serving (or neighboring) cell(s)/TRP(s), only the serving cell/TRP, only the non-serving (or neighboring) cell(s)/TRPs, or separately to the serving cell/TRP and the non-serving (or neighboring) cell(s)/TRP(s). For instance, the UE could receive from the network a one-bit indicator with "1"—applied jointly to both the serving cell/TRP and the non-serving (or neighboring) cell(s)/TRP(s) and "0"—applied to only the non-serving (or neighboring) cell(s)/TRP(s).

In one example I.1, the UE may use the differential RSRP/SINR reporting for the inter-cell operation if the inter-cell beam measurement and reporting is enabled/configured by the network. For instance, a higher layer parameter interCellBasedBeamReporting could be included/incorporated in CSI reporting setting, e.g., in the higher layer parameter CSI-ReportConfig, to turn on/off the inter-cell beam measurement and reporting. If the UE is configured with the higher layer parameter interCellBasedBeamReporting set to "enabled," the UE may report in a single reporting instance SSBRIs or CRIs for both the serving cell/TRP and the non-serving (or neighboring) cell(s)/TRP(s) for each reporting setting, wherein the non-serving (or neighboring) cell(s)/TRP(s) broadcasts/is associated with different PCI(s) from the serving cell PCI. That is, the UE may use differential RSRP/SINR reporting for the inter-cell operation if the higher layer parameter interCellBasedBeamReporting is configured as "enabled." An example of the higher layer parameter CSI-ReportConfig incorporating interCellBasedBeamReporting is presented in TABLE 9.

TABLE 9

An example of higher layer parameter CSI-ReportConfig for inter-cell beam reporting

```
CSI-ReportConfig ::=              SEQUENCE {
    reportConfigId                CSI-ReportConfigId,
    carrier                       ServCellIndex   OPTIONAL,
 -- Need S
    resourcesForChannelMeasurement          CSI-ResourceConfigId,
        csi-IM-ResourcesForInterference         CSI-ResourceConfigId   OPTIONAL, -- Need R
        nzp-CSI-RS-ResourcesForInterference     CSI-ResourceConfigId   OPTIONAL, -- Need
R
    interCellBasedBeamReporting       CHOICE {
        enabled                   NULL,
        disabled                  SEQUENCE {
        ...
        }
        ...
    },
    ...
}
```

In another example 1.2, the UE may use the differential RSRP/SINR reporting for the inter-cell operation if the total number of network configured beam report(s) for the non-serving (or neighboring) cell(s)/T-P(s) (i.e., N_nsc) is greater than a threshold, denoted by th_Nnsc.

The threshold for comparing with N_nsc could be a fixed value in the specifications, e.g., 1.

Alternatively, the UE could be indicated by the network the threshold for comparing with N_nsc; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value of the threshold for comparing with N_nsc. For another example, the UE could be first higher layer RRC configured by the network a list of candidate values for the threshold for comparing with Nnsc. The UE could then receive from the network a MAC CE activation command/bitmap to activate one value from the list of candidate values for th_Nnsc as the threshold for comparing with N_nsc.

For instance, a higher layer parameter nrofTotReportedRS_nsc could be included/incorporated in the higher layer parameter interCellBasedBeamReporting (TABLE 9) in CSI-ReportConfig. Here, nrofTotReportedRS_nsc indicates the total number (N_nsc) of measured RS resources for the non-serving (or neighboring) cell(s)/TRP(s) to be reported per reporting setting, where N_nsc may be less than or equal to Nmax_nsc. Nmax_nsc represents the maximum total number of beam report(s) for the non-serving (or neighboring) cell(s)/TRP(s), and is higher layer configured to the UE depending on UE capability. When the field nrofTotReportedRS_nsc is absent, the UE may apply the value 0. With the higher layer parameter nrofTotReportedRS_nsc, the UE may use differential RSRP/SINR reporting for the inter-cell operation if the higher layer parameter nrofTotReportedRS_nsc is configured to be greater than or equal to th_Nnsc. In TABLE 10, an example of the higher layer parameter interCellBasedBeamReporting incorporating nrofTotReportedRS_nsc is presented.

TABLE 10

An example of higher layer parameter interCellBasedBeamReporting for inter-cell beam reporting

| interCellBasedBeamReporting | CHOICE { |
| enabled | NULL, |
| disabled | SEQUENCE { |
| ... | |
| } | |
| nrofTotReportedRS_nsc | ENUMERATED {n1, n2, n3, n4}   OPTIONAL -- Need S |
| ... | |
| } | |

In yet another example 1.3, the UE may use the differential RSRP/SINR reporting for the inter-cell operation if the total number of network configured non-serving (or neighboring) cell(s)/TRP(s) (i.e., M_nsc) is greater than a threshold, denoted by th_Mnsc.

The threshold for comparing with M_nsc could be a fixed value in the specifications, e.g., 1.

Alternatively, the UE could be indicated by the network the threshold for comparing with M_nsc; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value of the threshold for comparing with M_nsc. For another example, the UE could be first higher layer RRC configured by the network a list of candidate values for the threshold for comparing with M_nsc. The UE could then receive from the network a MAC CE activation command/bitmap to activate one value from the list of candidate values for th_Mnsc as the threshold for comparing with M_nsc.

For instance, a higher layer parameter nrofTotNSC could be included/incorporated in the higher layer parameter interCellBasedBeamReporting (TABLE 9) in CSI-ReportConfig. Here, nrofTotNSC indicates the total number (M_nsc) of network configured non-serving (or neighboring) cell(s)/TRP(s) for the inter-cell operation, where M_nsc may be less than or equal to Mmax_nsc. Mmax_nsc represents the maximum total number of network configured non-serving (or neighboring) cell(s)/TRP(s), and is higher layer configured to the UE depending on UE capability. When the field nrofTotNSC is absent, the UE may apply the value 0. With the higher layer parameter nrofTotNSC, the UE may use differential RSRP/SINR reporting for the inter-cell operation if the higher layer parameter nrofTotNSC is configured to be greater than or equal to th_Mnsc.

In TABLE 11, an example of the higher layer parameter interCellBasedBeamReporting incorporating nrofTotNSC is presented.

TABLE 11

Another example of higher layer parameter interCellBasedBeamReporting for inter-cell beam reporting

| interCellBasedBeamReporting | CHOICE { |
| enabled | NULL, |
| disabled | SEQUENCE { |
| ... | |
| } | |
| NrofTotNSC | ENUMERATED {m1, m2, m3, m4}   OPTIONAL -- Need S |
| ... | |
| } | |

In yet another example 1.4, the UE may use the differential RSRP/SINR reporting for the inter-cell operation if the number of network configured beam report(s) for the non-serving (or neighboring) cell/TRP A is greater than a threshold, denoted by th_nnsc.

The threshold th_nnsc could be a fixed value in the specifications, e.g., 1.

Alternatively, the UE could be indicated by the network the threshold th_nnsc; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value of the threshold th_nnsc. For another example, the UE could be first higher layer RRC configured by the network a list of candidate values for the threshold th_nnsc. The UE could then receive from the network a MAC CE activation command/bitmap to activate one value from the list of candidate values for th_nnsc as the threshold th_nnsc In this design example: (1) for example, the non-serving (or neighboring) cell/TRP A could be any of the M_nsc non-serving (or neighboring) cell(s)/TRP(s); (2) for another example, the non-serving (or neighboring) cell/TRP A could be associated with the smallest (or the largest) number of beam report(s) among all the M_nsc non-serving (or neighboring) cell(s)/TRP(s); (3) yet for another example, the non-serving (or neighboring) cell/TRP A could correspond to the k'-th (e.g., k'=1 or k'=k or k'=M_nsc) entry in the higher layer RRC configured list/set/pool of M_nsc non-serving (or neighboring) cells/TRPs for the inter-cell operation; (4) yet for another example, the non-serving (or neighboring) cell/TRP A could correspond to the non-serving (or neighboring) cell/TRP with the k'-th (e.g., k'=1 or k'=k or k'=M_nsc) highest/lowest PCI, CORESETPoolIndex value or other cell/TRP-specific higher layer signaling index value among the higher layer RRC configured list/set/pool of M_nsc non-serving (or neighboring) cells/TRPs; and (5) yet for another example, the UE could receive from the network a MAC CE activation command/bitmap to activate one entry from the higher layer RRC configured list/set/pool of M_nsc non-serving (or neighboring) cells/TRPs as the non-serving (or neighboring) cell/TRP A.

For instance, a higher layer parameter nrofReportedRS_nscList could be included/incorporated in the higher layer parameter interCellBasedBeamReporting (TABLE 9) in CSI-ReportConfig. Here, nrofReportedRS_nscList indicates a list of numbers of measured RS resources to be reported per reporting setting, where the k-th number (n_nsc[k]) of measured RS resources corresponds to the k-th non-serving (or neighboring) cell/TRP (k∈{1, ..., M_nsc}).

Furthermore, n_nsc[k] may be less than or equal to Nmax_nsc, where Nmax_nsc represents the maximum total number of beam report(s) for the non-serving (or neighboring) cell(s)/TRP(s), and is higher layer configured to the UE depending on UE capability. With the higher layer parameter nrofReportedRS_nscList, the UE may use differential RSRP/SINR reporting for the inter-cell operation if the value configured in the higher layer parameter nrofReportedRS_nscList for the non-serving (or neighboring) cell/TRP A is greater than or equal to th_nnsc. In TABLE 12, an example of the higher layer parameter interCellBasedBeamReporting incorporating nrofReportedRS_nscList is presented.

In one embodiment of Option-II, the UE could autonomously determine whether to use the differential RSRP/SINR reporting for the inter-cell operation. The UE may indicate to the network if the UE determines to use the differential RSRP/SINR reporting for the inter-cell operation (e.g., a one-bit flag). The UE could report to the network the indication in part of the beam/CSI report or multiplexed with HARQ-ACK or multiplexed with scheduling request (SR) or via higher layer signaling such as MAC CE. Optionally, the UE could use an indicator (e.g., a two-bit indicator) to indicate to the network whether the differential RSRP/SINR reporting for the inter-cell operation may be applied jointly to both the serving cell/TRP and the non-serving (or neighboring) cell(s)/TRP(s), only the serving cell/TRP, only the non-serving (or neighboring) cell(s)/TRPs, or separately to the serving cell/TRP and the non-serving (or neighboring) cell(s)/TRP(s). For instance, the UE could indicate to the network a one-bit indicator with "1"—applied jointly to both the serving cell/TRP and the non-serving (or neighboring) cell(s)/TRP(s) and "0"—applied to only the non-serving (or neighboring) cell(s)/TRP(s).

In one example 11.1, the UE may use the differential RSRP/SINR reporting for the inter-cell operation if the total number of beam report(s) for the non-serving (or neighboring) cell(s)/TRP(s) (i.e., N_nsc) is greater than a threshold, denoted by th_Nnsc, wherein N_nsc could be determined by the UE and indicated to the network. The configuration/indication of the threshold th_Nnsc could follow those specified in the example 1.2.

In another example 11.2, the UE may use the differential RSRP/SINR reporting for the inter-cell operation if the total number of non-serving (or neighboring) cell(s)/TRP(s) (i.e., M_nsc) for the inter-cell operation is greater than a threshold, denoted by th_Mnsc, wherein M_nsc could be determined by the UE and indicated to the network. The configuration/indication of the threshold th_Mnsc could follow those specified in the example 1.3.

In yet another example 11.3, the UE may use the differential RSRP/SINR reporting for the inter-cell operation if the number of beam report(s) for the non-serving (or neighboring) cell/TRP A is greater than a threshold, denoted by th_nnsc, wherein the number(s) of beam report(s) for the one or more cells/TRPs could be determined by the UE and indicated to the network. The configuration/indication of the threshold th_nnsc could follow those specified in the example 1.4, and the determination of the non-serving (or neighboring) cell/TRP A could also follow those specified in the example 1.4.

In yet another example 11.4, the UE may use the differential RSRP/SINR reporting for the inter-cell operation if the difference between first measured RSRP/SINR value and second measured RSRP/SINR value is greater than or equal to a threshold, denoted by th_bm.

TABLE 12

Another example of higher layer parameter interCellBasedBeamReporting for inter-cell beam reporting

| | |
|---|---|
| interCellBasedBeamReporting | CHOICE { |
| enabled | NULL, |
| disabled | SEQUENCE { |
| ... | |
| } | |
| NrofReportedRS_nscList (1..maxNrofReportedRS_NSC) | SEQUENCE (SIZE (1..NrotNSC)) OF INTEGER |
| ... | |
| } | |

The threshold th_bm could be a fixed value in the specifications.

Alternatively, the UE could be indicated by the network the threshold th_bm; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value of the threshold th_bm. For another example, the UE could be first higher layer RRC configured by the network a list of candidate values for the threshold th_bm. The UE could then receive from the network a MAC CE activation command/bitmap to activate one value from the list of candidate values for th_bm as the threshold th_bm.

For example, the first measured RSRP/SINR value could correspond to the largest measured RSRP/SINR value in the given reporting instance/CSI-Report, while the second measured RSRP/SINR value could correspond to the smallest measured RSRP/SINR value in the same reporting instance/CSI-Report. For another example, the first measured RSRP/SINR value could correspond to the largest measured RSRP/SINR value in the given reporting instance/CSI-Report, while the second measured RSRP/SINR value could correspond to the second largest measured RSRP/SINR value in the same reporting instance/CSI-Report. Yet for another example, the first measured RSRP/SINR value could correspond to the largest measured RSRP/SINR value among all the measured RSRP/SINR values associated with the serving cell/TRP in the given reporting instance/CSI-Report, while the second measured RSRP/SINR value could correspond to the smallest measured RSRP/SINR value among all the measured RSRP/SINR values associated with the non-serving (or neighboring) cell(s)/TRP(s) in the same reporting instance/CSI-Report. Yet for another example, the first measured RSRP/SINR value could correspond to the largest measured RSRP/SINR value among all the measured RSRP/SINR values associated with the serving cell/TRP in the given reporting instance/CSI-Report, while the second measured RSRP/SINR value could correspond to the largest measured RSRP/SINR value among all the measured RSRP/SINR values associated with the non-serving (or neighboring) cell(s)/TRP(s) in the same reporting instance/CSI-Report.

In yet another example 11.5, the UE may use the differential RSRP/SINR reporting for a PCI in the inter-cell operation if the number of beam report(s) for the PCI is greater than a threshold, denoted by th_nnsc', wherein the number(s) of beam report(s) for the PCI could be indicated to the UE by the network or determined by the UE and indicated to the network. The configuration/indication of the threshold th_nnsc' could follow those specified in the example 1.4. For example, the threshold th_nnsc' could be: (1) fixed in the system specifications, e.g., th_nnsc'=1, (2) configured/indicated by the network, or (3) determined by the UE.

If the UE uses the differential RSRP/SINR reporting for the inter-cell operation and the beam metric is L1-RSRP, the following examples can be provided.

In one example of Case 1, the differential L1-RSRP reporting for the inter-cell operation applies jointly to both the serving cell/TRP and the non-serving (or neighboring) cell(s)/TRP(s). In such case: (1) the largest measured L1-RSRP value in the given reporting instance/CSI-Report is quantized to a 7-bit value in the range [−140, −44] dBm with 1 dB step size; and (2) the differential measured L1-RSRP value(s) is quantized to a X_0-bit value with Y_0 dB step size with a reference to the largest measured L1-RSRP value in the same reporting instance/CSI-Report. Wherein: (i) the value(s) of X_0 or Y_0 could be fixed in the specifications, e.g., X_0=4 and Y_0=2; and (ii) alternatively, the UE could be indicated by the network the value(s) of X_0 or Y_0; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value(s) of X_0 or Y_0. For another example, the UE could be first higher layer RRC configured by the network a list of candidate values for X_0 or Y_0. The UE could then receive from the network a MAC CE activation command/bitmap to activate one value from the list of candidate values for X_0 or Y_0 as the value(s) of X_0 or Y_0.

In one example of Case 2, the differential L1-RSRP reporting for the inter-cell operation applies only to the serving cell/TRP. In such case, (1) the largest measured L1-RSRP value among all the measured L1-RSRP values associated with the serving cell/TRP in the given reporting instance/CSI-Report is quantized to a 7-bit value in the range [−140, −44] dBm with 1 dB step size; (2) the measured L1-RSRP value(s) associated with the non-serving (or neighboring) cell(s)/TRP(s) in the same reporting instance/CSI-Report is quantized to a 7-bit value in the range [−140, −44] dBm with 1 dB step size; and (3) the differential measured L1-RSRP value(s) associated with the serving cell/TRP is quantized to a X_1-bit value with Y_1 dB step size with a reference to the largest measured L1-RSRP value associated with the serving cell/TRP in the same reporting instance/CSI-Report. Wherein: (i) the value(s) of X_1 or Y_1 could be fixed in the specifications, e.g., X_1=4 and Y_1=2; and (ii) alternatively, the UE could be indicated by the network the value(s) of X_1 or Y_1; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value(s) of X_1 or Y_1. For another example, the UE could be first higher layer RRC configured by the network a list of candidate values for X_1 or Y_1. The UE could then receive from the network a MAC CE activation command/bitmap to activate one value from the list of candidate values for X_1 or Y_1 as the value(s) of X_1 or Y_1.

In one example of Case 3, the differential L1-RSRP reporting for the inter-cell operation applies only to the non-serving (or neighboring) cell(s)/TRP(s). In such case: (1) the largest measured L1-RSRP value among all the measured L1-RSRP values associated with the non-serving (or neighboring) cell(s)/TRP(s) in the given reporting instance/CSI-Report is quantized to a 7-bit value in the range [−140, −44] dBm with 1 dB step size; (2) the measured L1-RSRP value(s) associated with the serving cell/TRP in the same reporting instance/CSI-Report is quantized to a 7-bit value in the range [−140, −44] dBm with 1 dB step size; and (3) the differential measured L1-RSRP value(s) associated with the non-serving (or neighboring) cell(s)/TRP(s) is quantized to a X_2-bit value with Y_2 dB step size with a reference to the largest measured L1-RSRP value associated with the non-serving (or neighboring) cell(s)/TRP(s) in the same reporting instance/CSI-Report. Wherein:

(i) the value(s) of $X\_2$ or $Y\_2$ could be fixed in the specifications, e.g., $X\_2=4$ and $Y\_2=2$; and (ii) alternatively, the UE could be indicated by the network the value(s) of $X\_2$ or $Y\_2$; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value(s) of $X\_2$ or $Y\_2$. For another example, the UE could be first higher layer RRC configured by the network a list of candidate values for $X\_2$ or $Y\_2$. The UE could then receive from the network a MAC CE activation command/bitmap to activate one value from the list of candidate values for $X\_2$ or $Y\_2$ as the value(s) of $X\_2$ or $Y\_2$.

In one example of Case 4, the differential L1-RSRP reporting for the inter-cell operation applies separately to the serving cell/TRP and the non-serving (or neighboring) cell(s)/TRP(s). In such case, (1) the largest measured L1-RSRP value among all the measured L1-RSRP values associated with the serving cell/TRP in the given reporting instance/CSI-Report is quantized to a 7-bit value in the range [−140, −44] dBm with 1 dB step size; (2) the largest measured L1-RSRP value among all the measured L1-RSRP values associated with the non-serving (or neighboring) cell(s)/TRP(s) in the given reporting instance/CSI-Report is quantized to a 7-bit value in the range [−140, −44] dBm with 1 dB step size; (3) the differential measured L1-RSRP value(s) associated with the serving cell/TRP is quantized to a $X\_1$-bit value with $Y\_1$ dB step size with a reference to the largest measured L1-RSRP value associated with the serving cell/TRP in the same reporting instance/CSI-Report. The configuration/indication of the value(s) of $X\_1$ or $Y\_1$ could follow those specified in Case 2; and (4) the differential measured L1-RSRP value(s) associated with the non-serving (or neighboring) cell(s)/TRP(s) is quantized to a $X\_2$-bit value with $Y\_2$ dB step size with a reference to the largest measured L1-RSRP value associated with the non-serving (or neighboring) cell(s)/TRP(s) in the same reporting instance/CSI-Report. The configuration/indication of value(s) of $X\_2$ and $Y\_2$ could follow those specified in Case 3.

In one example of Case 5, different L1-RSRP reporting formats are separately applied to different PCIs in the inter-cell system, e.g., depending on their associated/corresponding numbers of beam reports reported in the same reporting instance. In such case, if the number of beam report(s) for a same PCI is greater than a threshold, e.g., 1, the differential L1-RSRP reporting for the inter-cell operation applies to the PCI. Wherein: (i) the largest measured L1-RSRP value among all the measured L1-RSRP values associated with the PCI in the given reporting instance/CSI-Report is quantized to a 7-bit value in the range [−140, −44] dBm with 1 dB step; and (ii) the differential measured L1-RSRP value(s) associated with the PCI is quantized to a $X\_k$-bit value with $Y\_k$ dB step size with a reference to the largest measured L1-RSRP value associated with the PCI in the same reporting instance/CSI-Report. The value(s) of $X\_k$ or $Y\_k$ could be fixed in the specifications, e.g., $X\_k=4$ and $Y\_k=2$. Alternatively, the UE could be indicated by the network the value(s) of $X\_k$ or $Y\_k$; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value(s) of $X\_k$ or $Y\_k$. For another example, the UE could be first higher layer RRC configured by the network a list of candidate values for $X\_k$ or $Y\_k$. The UE could then receive from the network a MAC CE activation command/bitmap to activate one value from the list of candidate values for $X\_k$ or $Y\_k$ as the value(s) of $X\_k$ or $Y\_k$.

Also for Case 5, if the number of beam report for a same PCI is equal to 1, the measured L1-RSRP value associated with the PCI in the same reporting instance/CSI-Report as the beam report(s) for other PCI(s) is quantized to a 7-bit value in the range [−140, −44] dBm with 1 dB step size.

If the UE uses the differential RSRP/SINR reporting for the inter-cell operation and the beam metric is L1-SINR, the following cases may be provided.

In one example of Case I, the differential L1-SINR reporting for the inter-cell operation applies jointly to both the serving cell/TRP and the non-serving (or neighboring) cell(s)/TRP(s). In such case, (1) the largest measured L1-SINR value in the given reporting instance/CSI-Report is quantized to a 7-bit value in the range [−23, 40] dB with 0.5 dB step size; and (2) the differential measured L1-SINR value(s) is quantized to a $X'\_0$-bit value with $Y'\_0$ dB step size with a reference to the largest measured L1-SINR value in the same reporting instance/CSI-Report. Wherein: (i) the value(s) of $X'\_0$ or $Y'\_0$ could be fixed in the specifications, e.g., $X'\_0=4$ and $Y'\_0=1$; and (ii) alternatively, the UE could be indicated by the network the value(s) of $X'\_0$ or $Y'\_0$; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value(s) of $X'\_0$ or $Y'\_0$. For another example, the UE could be first higher layer RRC configured by the network a list of candidate values for $X'\_0$ or $Y'\_0$. The UE could then receive from the network a MAC CE activation command/bitmap to activate one value from the list of candidate values for $X'\_0$ or $Y'\_0$ as the value(s) of $X'\_0$ or $Y'\_0$.

In one example of Case II, the differential L1-SINR reporting for the inter-cell operation applies only to the serving cell/TRP. In such case: (1) the largest measured L1-SINR value among all the measured L1-SINR values associated with the serving cell/TRP in the given reporting instance/CSI-Report is quantized to a 7-bit value in the range [−23, 40] dB with 0.5 dB step size; (2) the measured L1-SINR value(s) associated with the non-serving (or neighboring) cell(s)/TRP(s) in the same reporting instance/CSI-Report is quantized to a 7-bit value in the range [−23, 40] dB with 0.5 dB step size; and (3) the differential measured L1-SINR value(s) associated with the serving cell/TRP is quantized to a $X'\_1$-bit value with $Y'\_1$ dB step size with a reference to the largest measured L1-SINR value associated with the serving cell/TRP in the same reporting instance/CSI-Report. Wherein: (i) the value(s) of $X'\_1$ or $Y'\_1$ could be fixed in the specifications, e.g., $X'\_1=4$ and $Y'\_1=1$; and (ii) alternatively, the UE could be indicated by the network the value(s) of $X'\_1$ or $Y'\_1$; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value(s) of $X'\_1$ or $Y'\_1$. For another example, the UE could be first higher layer RRC configured by the network a list of candidate values for $X'\_1$ or $Y'\_1$. The UE could then receive from the network a MAC CE activation command/bitmap to activate one value from the list of candidate values for X'_1 or Y'_1 as the value(s) of X'_1 or Y'_1.

In one example of Case III, the differential L1-SINR reporting for the inter-cell operation applies only to the non-serving (or neighboring) cell(s)/TRP(s). In such case, (1) the largest measured L1-SINR value among all the measured L1-SINR values associated with the non-serving (or neighboring) cell(s)/TRP(s) in the given reporting instance/CSI-Report is quantized to a 7-bit value in the range [−23, 40] dB with 0.5 dB step size; (2) the measured L1-SINR value(s) associated with the serving cell/TRP in the same reporting instance/CSI-Report is quantized to a 7-bit value in the range [−23, 40] dB with 0.5 dB step size; and (3) the differential measured L1-SINR value(s) associated with the non-serving (or neighboring) cell(s)/TRP(s) is quantized to a X'_2-bit value with Y'_2 dB step size with a reference to the largest measured L1-SINR value associated with the non-serving (or neighboring) cell(s)/TRP(s) in the same reporting instance/CSI-Report. Wherein: (i) the value(s) of X'_2 or Y'_2 could be fixed in the specifications, e.g., X'_2=4 and Y'_2=1; and (ii) alternatively, the UE could be indicated by the network the value(s) of X'_2 or Y'_2; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value(s) of X'_2 or Y'_2. For another example, the UE could be first higher layer RRC configured by the network a list of candidate values for X'_2 or Y'_2. The UE could then receive from the network a MAC CE activation command/bitmap to activate one value from the list of candidate values for X'_2 or Y'_2 as the value(s) of X'_2 or Y'_2.

In one example of Case IV, the differential L1-SINR reporting for the inter-cell operation applies separately to the serving cell/TRP and the non-serving (or neighboring) cell(s)/TRP(s). In such case: (1) the largest measured L1-SINR value among all the measured L1-SINR values associated with the serving cell/TRP in the given reporting instance/CSI-Report is quantized to a 7-bit value in the range [−23, 40] dB with 0.5 dB step size; (2) the largest measured L1-SINR value among all the measured L1-SINR values associated with the non-serving (or neighboring) cell(s)/TRP(s) in the given reporting instance/CSI-Report is quantized to a 7-bit value in the range [−23, 40] dB with 0.5 dB step size; (3) the differential measured L1-SINR value(s) associated with the serving cell/TRP is quantized to a X'_1-bit value with Y'_1 dB step size with a reference to the largest measured L1-SINR value associated with the serving cell/TRP in the same reporting instance/CSI-Report. The configuration/indication of the value(s) of X'_1 or Y'_1 could follow those specified in Case II; and (4) the differential measured L1-SINR value(s) associated with the non-serving (or neighboring) cell(s)/TRP(s) is quantized to a X'_2-bit value with Y'_2 dB step size with a reference to the largest measured L1-SINR value associated with the non-serving (or neighboring) cell(s)/TRP(s) in the same reporting instance/CSI-Report. The configuration/indication of value(s) of X'_2 and Y'_2 could follow those specified in Case III.

In one example of Case V, different L1-SINR reporting formats are separately applied to different PCIs in the inter-cell system, e.g., depending on their associated/corresponding numbers of beam reports reported in the same reporting instance. In such case, if the number of beam report(s) for a same PCI is greater than a threshold, e.g., 1, the differential L1-SINR reporting for the inter-cell operation applies to the PCI. Wherein: (i) the largest measured L1-SINR value among all the measured L1-SINR values associated with the PCI in the given reporting instance/CSI-Report is quantized to a 7-bit value in the range [−23, 40] dB with 0.5 dB step; and (ii) the differential measured L1-SINR value(s) associated with the PCI is quantized to a X'_k-bit value with Y'_kdB step size with a reference to the largest measured L1-SINR value associated with the PCI in the same reporting instance/CSI-Report. The value(s) of X'_k or Y'_k could be fixed in the specifications, e.g., X'_k=4 and Y'_k=1. Alternatively, the UE could be indicated by the network the value(s) of X'_k or Y'_k; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value(s) of X'_k or Y'_k. For another example, the UE could be first higher layer RRC configured by the network a list of candidate values for X'_k or Y'_k. The UE could then receive from the network a MAC CE activation command/bitmap to activate one value from the list of candidate values for X'_k or Y'_k as the value(s) of X'_k or Y'_k.

Also for Case V, if the number of beam report for a same PCI is equal to 1, the measured L1-SINR value associated with the PCI in the same reporting instance/CSI-Report as the beam report(s) for other PCI(s) is quantized to a 7-bit value in the range [−23, 40] dB with 0.5 dB step size.

If the UE uses the differential RSRP/SINR reporting for the inter-cell operation given an ordering of the resource indicators (and therefore, the corresponding beam metrics) of the serving cell/TRP and the non-serving (or neighboring) cell(s)/TRP(s) in the reporting instance/CSI-Report (based on either Scheme-0 or Scheme-1), the UE could indicate to the network information related to the largest measured L1-RSRP/L1-SINR value in part of the beam/CSI report or multiplexed with HARQ-ACK or multiplexed with scheduling request (SR) or via higher layer signaling such as MAC CE.

For Case 1 and Case I, the information could include at least one of: (1) the 7-bit quantized value of the largest measured L1-RSRP/L1-SINR among all the reported beam metrics in the same reporting instance/CSI-Report; (2) the position/ordering of the largest measured L1-RSRP/L1-SINR value among all the reported beam metrics in the same reporting instance/CSI-Report. For instance, for a given ordering of the resource indicators/beam metrics in the reporting instance, if the largest measured L1-RSRP/L1-SINR value is the $2^{nd}$ reported beam metric among all five reported beam metrics, the UE could send to the network a bitmap [0 1 0 0 0] to indicate the position/ordering of the largest measured L1-RSRP/SINR value in the reporting instance/CSI-Report; and (3) the position/ordering of the resource indicator (SSBRI or CRI) associated with the largest measured L1-RSRP/L1-SINR value among all the reported resource indicators in the same reporting instance/CSI-Report. For instance, for a given ordering of the resource indicators/beam metrics in the reporting instance, if the SSBRI or CRI associated with the largest measured L1-RSRP/L1-SINR value is the $2^{nd}$ reported resource indicator among all five reported resource indicators, the UE could send to the network a bitmap [0 1 0 0 0] to indicate the position/ordering of the resource indicator associated with the largest measured L1-RSRP/SINR value in the reporting instance/CSI-Report.

For Case 2 and Case II, the information could include at least one of: (1) the 7-bit quantized value of the largest measured L1-RSRP/L1-SINR value among all the measured L1-RSRP/L1-SINR values associated with the serving cell/TRP in the given reporting instance/CSI-Report; (2) the position/ordering of the largest measured L1-RSRP/L1-SINR value among all the measured L1-RSRP/L1-SINR values associated with the serving cell/TRP in the same reporting instance/CSI-Report. For instance, for a given ordering of the resource indicators/beam metrics in the reporting instance, if the largest measured L1-RSRP/L1-SINR value among all the measured L1-RSRP/L1-SINR values associated with the serving cell/TRP is the $2^{nd}$ reported beam metric among all five reported beam metrics, the UE could send to the network a bitmap [0 1 0 0 0] to indicate the position/ordering of the largest measured L1-RSRP/SINR value among all the measured L1-RSRP/SINR values associated with the serving cell/TRP in the reporting instance/CSI-Report; and (3) the position/ordering of the resource indicator (SSBRI or CRI)—among all the reported resource indicators—associated with the largest measured L1-RSRP/L1-SINR value among all the measured L1-RSRP/L1-SINR values associated with the serving cell/TRP in the same reporting instance/CSI-Report. For instance, for a given ordering of the resource indicators/beam metrics in the reporting instance, if the SSBRI or CRI associated with the largest measured L1-RSRP/L1-SINR value among all the measured L1-RSRP/L1-SINR values associated with the serving cell/TRP is the $2^{nd}$ reported resource indicator among all five reported resource indicators, the UE could send to the network a bitmap [0 1 0 0 0] to indicate the position/ordering of the resource indicator associated with the largest measured L1-RSRP/L1-SINR value among all the measured L1-RSRP/L1-SINR values associated with the serving cell/TRP in the reporting instance/CSI-Report.

For Case 3 and Case III, the information could include at least one of: (1) the 7-bit quantized value of the largest measured L1-RSRP/L1-SINR value among all the measured L1-RSRP/L1-SINR values associated with the non-serving (or neighboring) cell(s)/TRP(s) in the given reporting instance/CSI-Report; (2) the position/ordering of the largest measured L1-RSRP/L1-SINR value among all the measured L1-RSRP/L1-SINR values associated with the non-serving (or neighboring) cell(s)/TRP(s) in the same reporting instance/CSI-Report. For instance, for a given ordering of the resource indicators/beam metrics in the reporting instance, if the largest measured L1-RSRP/L1-SINR value among all the measured L1-RSRP/L1-SINR values associated with the non-serving (or neighboring) cell(s)/TRP(s) is the $2^{nd}$ reported beam metric among all five reported beam metrics, the UE could send to the network a bitmap [0 1 0 0 0] to indicate the position/ordering of the largest measured L1-RSRP/SINR value among all the measured L1-RSRP/SINR values associated with the non-serving (or neighboring) cell(s)/TRP(s) in the reporting instance/CSI-Report; and (3) the position/ordering of the resource indicator (SSBRI or CRI)—among all the reported resource indicators—associated with the largest measured L1-RSRP/L1-SINR value among all the measured L1-RSRP/L1-SINR values associated with the non-serving (or neighboring) cell(s)/TRP(s) in the same reporting instance/CSI-Report. For instance, for a given ordering of the resource indicators/beam metrics in the reporting instance, if the SSBRI or CRI associated with the largest measured L1-RSRP/L1-SINR value among all the measured L1-RSRP/L1-SINR values associated with the non-serving (or neighboring) cell(s)/TRP(s) is the $2^{nd}$ reported resource indicator among all five reported resource indicators, the UE could send to the network a bitmap [0 1 0 0 0] to indicate the position/ordering of the resource indicator associated with the largest measured L1-RSRP/L1-SINR value among all the measured L1-RSRP/L1-SINR values associated with the non-serving (or neighboring) cell(s)/TRP(s) in the reporting instance/CSI-Report.

For Case 4 and Case IV, the information could include at least one of: (1) the 7-bit quantized value of the largest measured L1-RSRP/L1-SINR value among all the measured L1-RSRP/L1-SINR values associated with the serving cell/TRP in the given reporting instance/CSI-Report, and the 7-bit quantized value of the largest measured L1-RSRP/L1-SINR value among all the measured L1-RSRP/L1-SINR values associated with the non-serving (or neighboring) cell(s)/TRP(s) in the given reporting instance/CSI-Report; (2) the position/ordering of the largest measured L1-RSRP/L1-SINR value among all the measured L1-RSRP/L1-SINR values associated with the serving cell/TRP in the same reporting instance/CSI-Report, and the position/ordering of the largest measured L1-RSRP/L1-SINR value among all the measured L1-RSRP/L1-SINR values associated with the non-serving (or neighboring) cell(s)/TRP(s) in the same reporting instance/CSI-Report. For instance, for a given ordering of the resource indicators/beam metrics in the reporting instance, if the largest measured L1-RSRP/L1-SINR value among all the measured L1-RSRP/L1-SINR values associated with the serving cell/TRP is the $2^{nd}$ reported beam metric among all five reported beam metrics, and the largest measured L1-RSRP/L1-SINR value among all the measured L1-RSRP/L1-SINR values associated with the non-serving (or neighboring) cell(s)/TRP(s) is the $4^{th}$ reported beam metric among all five reported beam metrics, the UE could send to the network a bitmap [0 1 0 1 0] to indicate the position/ordering of the largest measured L1-RSRP/SINR value among all the measured L1-RSRP/SINR values associated with the serving cell/TRP, and the position/ordering of the largest measured L1-RSRP/SINR value among all the measured L1-RSRP/SINR values associated with the non-serving (or neighboring) cell(s)/TRP(s) in the reporting instance/CSI-Report; and (3) the position/ordering of the resource indicator (SSBRI or CRI)—among all the reported resource indicators—associated with the largest measured L1-RSRP/L1-SINR value among all the measured L1-RSRP/L1-SINR values associated with the serving cell/TRP in the same reporting instance/CSI-Report, and the position/ordering of the resource indicator (SSBRI or CRI)—among all the reported resource indicators—associated with the largest measured L1-RSRP/L1-SINR value among all the measured L1-RSRP/L1-SINR values associated with the non-serving (or neighboring) cell(s)/TRP(s) in the same reporting instance/CSI-Report. For instance, for a given ordering of the resource indicators/beam metrics in the reporting instance, if the SSBRI or CRI associated with the largest measured L1-RSRP/L1-SINR value among all the measured L1-RSRP/L1-SINR values associated with the serving cell/TRP is the $2^{nd}$ reported resource indicator among all five reported resource indicators, and the SSBRI or CRI associated with the largest measured L1-RSRP/L1-SINR value among all the measured L1-RSRP/L1-SINR values associated with the non-serving (or neighboring) cell(s)/TRP(s) is the $4^{th}$ reported resource indicator among all five reported resource indicators, the UE could send to the network a bitmap [0 1 0 1 0] to indicate the position/ordering of the resource indicator—among all the reported resource indicators—associated with the largest measured L1-RSRP/L1-SINR value among all the measured L1-RSRP/L1-SINR values associated with the serving cell/TRP, and the position/ordering of the resource indicator—among all the reported resource indicators—associated with the largest measured L1-RSRP/L1-SINR value among all the measured L1-RSRP/L1-SINR values associated with the non-serving (or neighboring) cell(s)/TRP(s) in the reporting instance/CSI-Report.

In one embodiment of Scheme-2, if the differential RSRP/SINR reporting is enabled, the network or the UE could first determine the position(s)/ordering (or the reference position(s)/ordering) in the CSI reporting instance/CSI-Report for sending one or more reference RSRP/SINR values (e.g., the largest measured L1-RSRP/L1-SINR values). Alternatively, if differential RSRP/SINR reporting is enabled, the (reference) position in the reporting instance/CSI-Report can be fixed, e.g., to the $1^{st}$ beam report or $1^{st}$ beam report associated with the serving cell/TRP or $1^{st}$ position in the reporting instance/CSI-Report.

In one embodiment of Method-2.1, the UE could be indicated by the network the (reference) position(s)/ordering in the given CSI reporting instance/CSI-Report for sending one or more reference RSRP/SINR values; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, if the differential L1-RSRP/L1-SINR reporting for the inter-cell operation applies jointly to both the serving cell/TRP and the non-serving (or neighboring) cell(s)/TRP(s), the UE could be indicated by the network the (reference) position/ordering in the given reporting instance/CSI-Report for sending the largest measured L1-RSRP/L1-SINR value among all the measured beam metrics. For instance, the UE could receive from the network a bitmap. In the bitmap, the bit position configured as "1" indicates the position in the reporting instance/CSI-Report to send the largest measured L1-RSRP/L1-SINR value among all the measured beam metrics or send the corresponding resource indicator.

In one example, if the differential L1-RSRP/L1-SINR reporting for the inter-cell operation applies only to the serving cell/TRP, the UE could be indicated by the network the (reference) position/ordering in the given reporting instance/CSI-Report for sending the largest measured L1-RSRP/L1-SINR value among all the measured L1-RSRP/L1-SINR values associated with the serving cell/TRP. For instance, the UE could receive from the network a bitmap. In the bitmap, the bit position configured as "1" indicates the position in the reporting instance/CSI-Report to send the largest measured L1-RSRP/L1-SINR value among all the measured L1-RSRP/L1-SINR values associated with the serving cell/TRP or send the corresponding resource indicator.

In one example, if the differential L1-RSRP/L1-SINR reporting for the inter-cell operation applies only to the non-serving cell(s)/TRP(s), the UE could be indicated by the network the (reference) position/ordering in the given reporting instance/CSI-Report for sending the largest measured L1-RSRP/L1-SINR value among all the measured L1-RSRP/L1-SINR values associated with the non-serving (or neighboring) cell(s)/TRP(s). For instance, the UE could receive from the network a bitmap. In the bitmap, the bit position configured as "1" indicates the position in the reporting instance/CSI-Report to send the largest measured L1-RSRP/L1-SINR value among all the measured L1-RSRP/L1-SINR values associated with the non-serving (or neighboring) cell(s)/TRP(s) or send the corresponding resource indicator.

In one example, if the differential L1-RSRP/L1-SINR reporting for the inter-cell operation applies separately to the serving cell/TRP and the non-serving (or neighboring) cell(s)/TRP(s), the UE could be indicated by the network the (reference) position/ordering in the given reporting instance/CSI-Report for sending the largest measured L1-RSRP/L1-SINR value among all the measured L1-RSRP/L1-SINR values associated with the serving cell/TRP, and the (reference) position/ordering in the same reporting instance/CSI-Report for sending the largest measured L1-RSRP/L1-SINR value among all the measured L1-RSRP/L1-SINR values associated with the non-serving (or neighboring) cell(s)/TRP(s). For instance, the UE could receive from the network a bitmap. In the bitmap, the first bit position configured as "1" indicates the position in the reporting instance/CSI-Report to send the largest measured L1-RSRP/L1-SINR value among all the measured L1-RSRP/L1-SINR values associated with the serving cell/TRP or send the corresponding resource indicator, and the second bit position configured as "1" indicates the position in the reporting instance/CSI-Report to send the largest measured L1-RSRP/L1-SINR value among all the measured L1-RSRP/L1-SINR values associated with the non-serving (or neighboring) cell(s)/TRP(s) or send the corresponding resource indicator.

Alternatively, the UE could receive from the network two bitmaps. In the first bitmap, the bit position configured as "1" indicates the position in the reporting instance/CSI-Report to send the largest measured L1-RSRP/L1-SINR value among all the measured L1-RSRP/L1-SINR values associated with the serving cell/TRP or send the corresponding resource indicator. In the second bitmap, the bit position configured as "1" indicates the position in the reporting instance/CSI-Report to send the largest measured L1-RSRP/L1-SINR value among all the measured L1-RSRP/L1-SINR values associated with the non-serving (or neighboring) cell(s)/TRP(s) or send the corresponding resource indicator.

In one embodiment of Method-2.2, the UE could autonomously determine and indicate to the network the (reference) position(s)/ordering in the given CSI reporting instance/CSI-Report for sending the one or more reference RSRP/SINR values; the UE could send to the network the indication in part of the beam/CSI report or multiplexed with HARQ-ACK or multiplexed with scheduling request (SR) or via higher layer signaling such as MAC CE.

In one example, if the differential L1-RSRP/L1-SINR reporting for the inter-cell operation applies jointly to both the serving cell/TRP and the non-serving (or neighboring) cell(s)/TRP(s), the UE could send to the network the (reference) position/ordering in the given reporting instance/CSI-Report for sending the largest measured L1-RSRP/L1-SINR value among all the measured beam metrics. For instance, the UE could send to the network a bitmap. In the bitmap, the bit position configured as "1" indicates the position in the reporting instance/CSI-Report to send the largest measured L1-RSRP/L1-SINR value among all the measured beam metrics or send the corresponding resource indicator.

In one example, if the differential L1-RSRP/L1-SINR reporting for the inter-cell operation applies only to the serving cell/TRP, the UE could send to the network the (reference) position/ordering in the given reporting instance/

CSI-Report for sending the largest measured L1-RSRP/L1-SINR value among all the measured L1-RSRP/L1-SINR values associated with the serving cell/TRP. For instance, the UE could send to the network a bitmap. In the bitmap, the bit position configured as "1" indicates the position in the reporting instance/CSI-Report to send the largest measured L1-RSRP/L1-SINR value among all the measured L1-RSRP/L1-SINR values associated with the serving cell/TRP or send the corresponding resource indicator.

In one example, if the differential L1-RSRP/L1-SINR reporting for the inter-cell operation applies only to the non-serving cell(s)/TRP(s), the UE could send to the network the (reference) position/ordering in the given reporting instance/CSI-Report for sending the largest measured L1-RSRP/L1-SINR value among all the measured L1-RSRP/L1-SINR values associated with the non-serving (or neighboring) cell(s)/TRP(s). For instance, the UE could send to the network a bitmap. In the bitmap, the bit position configured as "1" indicates the position in the reporting instance/CSI-Report to send the largest measured L1-RSRP/L1-SINR value among all the measured L1-RSRP/L1-SINR values associated with the non-serving (or neighboring) cell(s)/TRP(s) or send the corresponding resource indicator.

In one example, if the differential L1-RSRP/L1-SINR reporting for the inter-cell operation applies separately to the serving cell/TRP and the non-serving (or neighboring) cell(s)/TRP(s), the UE could send to the network the (reference) position/ordering in the given reporting instance/CSI-Report for sending the largest measured L1-RSRP/L1-SINR value among all the measured L1-RSRP/L1-SINR values associated with the serving cell/TRP, and the (reference) position/ordering in the same reporting instance/CSI-Report for sending the largest measured L1-RSRP/L1-SINR value among all the measured L1-RSRP/L1-SINR values associated with the non-serving (or neighboring) cell(s)/TRP(s). For instance, the UE could send to the network a bitmap. In the bitmap, the first bit position configured as "1" indicates the position in the reporting instance/CSI-Report to send the largest measured L1-RSRP/L1-SINR value among all the measured L1-RSRP/L1-SINR values associated with the serving cell/TRP or send the corresponding resource indicator, and the second bit position configured as "1" indicates the position in the reporting instance/CSI-Report to send the largest measured L1-RSRP/L1-SINR value among all the measured L1-RSRP/L1-SINR values associated with the non-serving (or neighboring) cell(s)/TRP(s) or send the corresponding resource indicator.

Alternatively, the UE could send to the network two bitmaps. In the first bitmap, the bit position configured as "1" indicates the position in the reporting instance/CSI-Report to send the largest measured L1-RSRP/L1-SINR value among all the measured L1-RSRP/L1-SINR values associated with the serving cell/TRP or send the corresponding resource indicator. In the second bitmap, the bit position configured as "1" indicates the position in the reporting instance/CSI-Report to send the largest measured L1-RSRP/L1-SINR value among all the measured L1-RSRP/L1-SINR values associated with the non-serving (or neighboring) cell(s)/TRP(s) or send the corresponding resource indicator.

In one embodiment of Method-2.3, the UE could report in the same CSI reporting instance/CSI-Report K beam qualities including K beam metrics such as L1-RSRPs/L1-SINRs and the corresponding K resource indicators such as SSBRIs or CRIs; the K beam qualities could be associated with both the serving cell or the non-serving cell(s) or only the serving cell or only the non-serving cell(s). The UE could report the reference RSRP/SINR value, e.g., corresponding to the largest measured L1-RSRP value quantized to a 7-bit value in the range [−140, −44] dBm with 1 dB step size, along with the corresponding resource indicator such as SSBRI or CRI, in the first position/entry in the CSI reporting instance/CSI-Report. The UE could report in the same reporting instance the remaining (K−1) beam qualities including (K−1) differential RSRP/SINR values, e.g., corresponding to (K−1) differential measured L1-RSRP values quantized to 4-bit values with 2 dB step size with a reference to the largest measured L1-RSRP value, along with the corresponding (K−1) resource indicators such as SSBRIs or CRIs. The positions/ordering of the remaining (K−1) beam qualities in the same CSI reporting instance/CSI-Report could follow the corresponding (K−1) beam metrics such as the (K−1) measured L1-RSRP/L1-SINR values or the (K−1) differential RSRP/SINR values in decreasing (or increasing) order. The UE could indicate to the network, e.g., in the same CSI reporting instance/CSI-Report, the PCI information/values associated with the reported K beam qualities.

In one example, the UE could report K PCI values, each corresponding to/associated with a position/entry in the CSI reporting instance/CSI-Report, and therefore the corresponding reported beam quality in the same CSI reporting instance/CSI-Report.

In another example, the UE could report K entity ID values, each corresponding to/associated with a position/entry in the CSI reporting instance/CSI-Report, and therefore the corresponding reported beam quality in the same CSI reporting instance/CSI-Report. An entity ID value could correspond to a PCI value, a CORESETPoolIndex value, a TRP-specific index/ID value, a TRP-specific higher layer signaling index value, a one-bit indicator indicating either the serving cell or the non-serving cell, a multi-bit indicator with each state of the multi-bit indicator indicating a PCI, or an index pointing to an entry in a set/list/pool of PCIs higher layer RRC configured to the UE.

In yet another example, the UE could report L bitmaps/MAC CEs each corresponding to a PCI. The reported K beam qualities are associated with the L PCIs. A bitmap/MAC CE includes/contains K entries/bit positions each corresponding to an entry/position in the CSI reporting instance/CSI-Report. If an entry/bit position in a bitmap/MAC CE is set to "1," the corresponding position/entry in the CSI reporting instance/CSI-Report, and therefore, the corresponding reported beam quality (including both the beam metric and the resource indicator) is for the PCI associated with the bitmap/MAC CE. A bitmap/MAC CE could indicate/incorporate a PCI value, a CORESETPoolIndex value, a TRP-specific index/ID value, a TRP-specific higher layer signaling index value or etc.

In one embodiment of Method-2.4, the UE could report in the same CSI reporting instance/CSI-Report K beam qualities including K beam metrics such as L1-RSRPs/L1-SINRs and the corresponding K resource indicators such as SSBRIs or CRIs; the K beam qualities could be associated with both the serving cell or the non-serving cell(s) or only the serving cell or only the non-serving cell(s). The UE could report the reference RSRP/SINR value, e.g., corresponding to the largest measured L1-RSRP value quantized to a 7-bit value in the range [−140, −44] dBm with 1 dB step size, along with the corresponding resource indicator such as SSBRI or CRI, in the first position/entry in the CSI reporting instance/CSI-Report. The UE could report in the same reporting instance the remaining (K−1) beam qualities including (K−1) differential RSRP/SINR values, e.g., corresponding to (K−1) differential measured L1-RSRP values quantized to 4-bit values with 2 dB step size with a reference to the largest measured L1-RSRP value, along with the corresponding (K−1) resource indicators such as SSBRIs or CRIs. The UE could be indicated by the network, or autonomously determine to report a beam quality for a different PCI.

In this example, the UE would report in the same reporting instance/CSI-Report K beam qualities including K beam metrics such as L1-RSRPs/L1-SINRs and the corresponding K resource indicators such as SSBRIs or CRIs for K different PCIs. The UE could indicate to the network the K PCI values or K entity ID values corresponding to PCI values, CORESETPoolIndex values, TRP-specific index/ID values, TRP-specific higher layer signaling index values or etc.

Furthermore, the UE could send to the network the PCI value or the entity ID value for the first position/entry in the CSI reporting instance/CSI-Report, and therefore, the reference beam quality including the reference RSRP/SINR value (e.g., corresponding to the largest measured L1-RSRP value quantized to a 7-bit value in the range [−140, −44] dBm with 1 dB step size) and the corresponding resource indicator such as SSBRI or CRI; here, the entity ID value could correspond to a PCI value, a CORESETPoolIndex value, a TRP-specific index/ID value, a TRP-specific higher layer signaling index value, a one-bit indicator indicating either the serving cell or the non-serving cell, a multi-bit indicator with each state of the multi-bit indicator indicating a PCI, or an index pointing to an entry in a set/list/pool of PCIs higher layer RRC configured to the UE. The positions/ordering of the remaining (K−1) beam qualities in the same CSI reporting instance/CSI-Report could follow their associated PCI values or entity ID values in decreasing (or increasing) order.

For K=2, in one example, the UE could send to the network K=2 PCI values or K=2 entity ID values corresponding to PCI values, CORESETPoolIndex values, TRP-specific index/ID values, TRP-specific higher layer signaling index values or etc. The UE could further indicate to the network a one-bit (flag) indicator for the first position/entry in the CSI reporting instance/CSI-Report, and therefore, the reference beam quality including the reference RSRP/SINR value (e.g., corresponding to the largest measured L1-RSRP value quantized to a 7-bit value in the range [−140, −44] dBm with 1 dB step size) and the corresponding resource indicator such as SSBRI or CRI. The one-bit indicator could indicate either of the K=2 PCI values or K=2 entity ID values. Alternatively, for K=2, the one-bit indicator could indicate either the serving cell or the non-serving cell.

For K=2, in another example, the UE could send to the network K=2 PCI values or K=2 entity ID values corresponding to PCI values, CORESETPoolIndex values, TRP-specific index/ID values, TRP-specific higher layer signaling index values or etc. The UE could further indicate to the network the PCI value or the entity ID value for the first position/entry in the CSI reporting instance/CSI-Report, and therefore, the reference beam quality including the reference RSRP/SINR value (e.g., corresponding to the largest measured L1-RSRP value quantized to a 7-bit value in the range [−140, −44] dBm with 1 dB step size) and the corresponding resource indicator such as SSBRI or CRI.

The UE could indicate to the network information of the cell(s)/TRP(s) associated with the reference RSRP(s)/SINR(s), and therefore, the (reference) position(s)/ordering in the given reporting instance/CSI-Report for sending the reference RSRP(s)/SINR(s).

In one example, for a system comprising a serving cell/TRP and a non-serving (or neighboring) cell/TRP, the UE could send to the network a one-bit indicator to indicate whether the reference RSRP/SINR is associated with the serving cell/TRP (e.g., configured as "1") or the non-serving (or neighboring) cell/TRP (e.g., configured as "0").

In another example, the UE could send to the network a multi-bit indicator with each state of the multi-bit indicator corresponding to a cell/TRP. If the UE indicates to the network a state of the multi-bit indicator, the reference RSRP/SINR is associated with the cell/TRP corresponding to the indicated state.

In yet another example, the UE could send to the network the PCI value(s), CORESETPoolIndex value(s) or other cell/TRP-specific higher layer signaling index values for the cell(s)/TRP(s) associated with the reference RSRP(s)/SINR (s), and therefore, the (reference) position(s)/ordering in the given reporting instance/CSI-Report for sending the reference RSRP(s)/SINR(s).

The ordering of the resource indicators (and therefore, the corresponding beam metrics) for the rest of the position(s) other than the (reference) position(s) for sending the reference RSRP(s)/SINR(s) in the same CSI reporting instance/CSI-Report could follow those specified in Method-1.1, Method-1.2 or Method-1.3 in the present disclosure. Furthermore, the differential RSRP/SINR reporting for the inter-cell operation could be enabled/configured following the conditions specified in Option-I or Option-II in the present disclosure. The detailed differential L1-RSRP/L1-SINR calculations could follow those specified in Case 1, Case 2, Case 3, Case 4, Case I, Case II, Case III or Case IV in the present disclosure.

In a wireless communications system, a base station or a transmission reception point (TRP) can use multiple antennas to form one or more beams to communicate with a UE. The use of multiple antennas is based on the use of one or more antenna ports. A first set of antenna ports can be quasi co-located with a second set of antenna ports such that parameters of a transmission (e.g., Doppler shift, Doppler spread, average delay, delay spread, spatial parameters, etc.) from the first set of antenna ports can be inferred from parameters of a transmission (e.g., Doppler shift, Doppler spread, average delay, delay spread, spatial parameters, etc.) from the second set of antenna ports. The UE can receive from the base station the quasi co-location (QCL) information between an indicated reference signal (RS) and another RS, or between an indicated RS and a downlink transmission. The indicated RS in the QCL can correspond to a synchronization signal block (SSB) or a channel state information reference signal (CSI-RS), e.g., a tracking reference signal (TRS).

In addition, the QCL information also includes one or more QCL types, and in the 3GPP, four QCL types are defined: (1) QCL-TypeA: {Doppler shift, Doppler spread, average delay, delay spread}; (2) QCL-TypeB: {Doppler shift, Doppler spread}; (3) QCL-TypeC: {Doppler shift, average delay}; and (4) QCL-TypeD: {Spatial receive parameters}.

Upon receiving the QCL information from the base station, the UE can assume that one or more antenna ports for a downlink RS/channel (e.g., a NZP CSI-RS or a downlink data/control channel such as PDCCH and PDSCH) is QCL related (or in short QCL'ed) with the indicated RS with respect to the indicated QCL type. For instance, if a TRS is QCL'ed with a SSB indicated in the QCL information, and the indicated QCL type is QCL-TypeC, the UE can process the TRS with the same Doppler shift and average delay parameters used for receiving the indicated SSB. For another example, if PDSCH DMRS is QCL'ed with a TRS indicated in the QCL information, and the indicated QCL type is QCL-TypeD, the UE can use the same spatial domain receive (RX) filter used for receiving the indicated TRS to receive the PDSCH. In various scenarios, by using the previous measurements of the QCL'ed RS, the processing of the current RS/channel can be facilitated.

The UE is provided by the network the QCL information/assumptions for one or more downlink RSs/channels in form of transmission configuration indication (TCI) state indication. For instance, for data transmissions on the shared channel (such as the physical downlink shared channel in NR, i.e. PDSCH), a UE can be configured with a set/pool of TCI states via radio resource control (RRC) signaling. One or more TCI states in the set/pool of RRC configured TCI states can be activated/deactivated by MAC control element (MAC CE) activation/deactivation command. The UE can be indicated, by the network, one or more of the MAC CE activated TCI states via an N bit field in downlink control information (DCI).

In TABLE 13, examples of higher layer parameters TCI-State and QCL-Info are provided. As can be seen from TABLE 13, in TCI-State, a TCI state ID that indicates a TCI state and one or two QCL information (QCL-Info) are included. Note that the second QCL-Info is optional and may not be configured. Furthermore, as illustrated in TABLE 13, a QCL-Info includes a referenceSignal field and a qcl-Type field, indicating the QCL source RS (CSI-RS and/or SSB) and the corresponding QCL type (QCL-TypeA, B, C and/or D), respectively. The QCL-Info further comprises of a ServCellIndex used to identify a serving cell such as a primary cell (PCell) or a secondary cell (SCell) in a carrier aggregation (CA) setting.

The QCL-Info also includes a bandwidth part (BWP) ID that indicates the BWP for which the QCL'ed RS applies. The 3GPP Rel. 15/16 TCI framework is not suited for inter-cell operation, wherein one or more cells or TRPs are associated with physical cell IDs (PCIs) different from the serving cell PCI.

TABLE 13

Examples of higher layer parameters TCI-State and QCL-Info

```
TCI-State ::=        SEQUENCE {
    tci-StateId          TCI-StateId,
    qcl-Type1            QCL-Info,
    qcl-Type2            QCL-Info          OPTIONAL, -- Need R
    ...
}
QCL-Info ::=         SEQUENCE {
    cell                 ServCellIndex     OPTIONAL, -- Need R
    bwp-Id               BWP-Id            OPTIONAL, -- Cond
                                           CSI-RS-Indicated
    referenceSignal      CHOICE {
        csi-rs               NZP-CSI-RS-ResourceId,
        ssb                  SSB-Index
    },
    qcl-Type             ENUMERATED {typeA, typeB, typeC, typeD},
    ...
}
```

Figure 13:
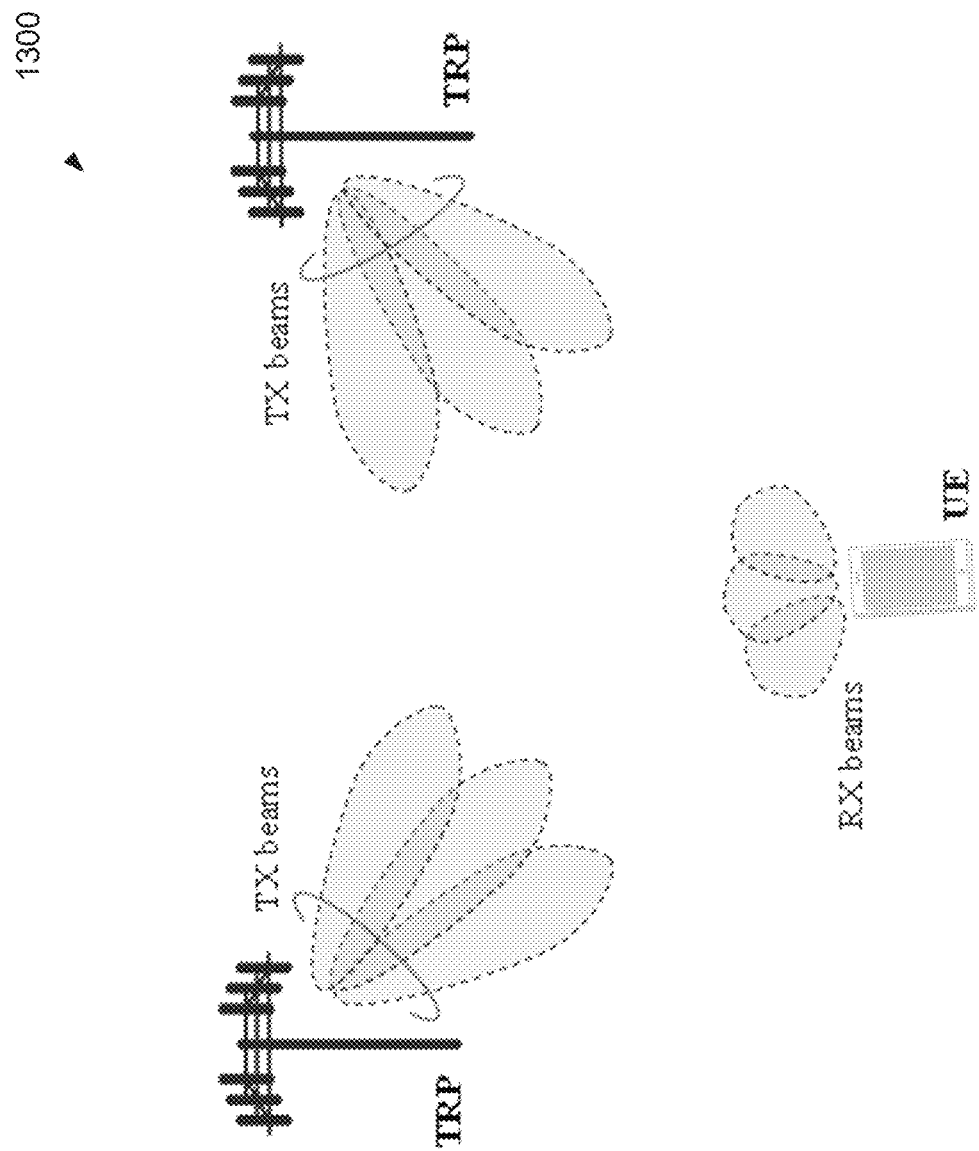
FIG. 13 illustrates another example of multi-TRP operation according to embodiments of the present disclosure.

FIG. 13 illustrates another example of multi-TRP operation 1300 according to embodiments of the present disclosure. An embodiment of the multi-TRP operation 1300 shown in FIG. 13 is for illustration only. For example, the multi-TRP operation 1300 as may be performed by a UE such as 111-116 as illustrated in FIG. 1 and a base station such as 101-103 as illustrated in FIG. 1.

In FIG. 13, an example of multi-TRP transmission, a.k.a. non-coherent joint transmission (NC-JT) is provided assuming that a UE is communicating with two TRPs through one or more transmission-reception (TX-RX) beam pairs, or communication links. In this disclosure, a TRP can represent a collection of measurement antenna ports, measurement RS resources and/or control resource sets (CORESETs).

For example, a TRP could be associated with one or more of: (1) a plurality of CSI-RS resources; (2) a plurality of CRIs (CSI-RS resource indices/indicators); (3) a measurement RS resource set, for example, a CSI-RS resource set along with its indicator; (4) a plurality of CORESETs associated with a CORESETPoolIndex; and/or (5) a plurality of CORESETs associated with a TRP-specific index/indicator/identity.

In the present disclosure, the non-serving cell(s) or the non-serving cell TRP(s) could have/broadcast different physical cell IDs (PCIs) and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, for the inter-cell operation considered in the present disclosure, different cells/TRPs could broadcast different PCIs and/or one or more cells/TRPs (referred to/defined as non-serving cells/TRPs in the present disclosure) could broadcast different PCIs from that of the serving cell/TRP (i.e., the serving cell PCI) and/or one or more cells/TRPs are not associated with valid SCI (e.g., provided by the higher layer parameter ServCellIndex). In the present disclosure, a non-serving cell PCI can also be referred to as an additional PCI, another PCI or a different PCI (with respect to the serving cell PCI).

The present disclosure considers various TCI state/beam indication methods for an inter-cell system, wherein different cells/TRPs could be associated with different PCIs, and the non-serving cell(s) or the non-serving cell TRP(s) could have/broadcast different PCIs and/or other higher layer signaling index values from that of the serving cell or the serving cell TRP (i.e., the serving cell PCI).

In this disclosure, the non-serving cell(s) or the non-serving cell TRP(s) could have/broadcast different physical cell IDs (PCIs) and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, for the inter-cell operation considered in the present disclosure, different cells/TRPs could broadcast different PCIs and/or one or more cells/TRPs (referred to/defined as non-serving cells/TRPs in the present disclosure) could broadcast different PCIs from that of the serving cell/TRP (i.e., the serving cell PCI) and/or one or more cells/TRPs are not associated with valid SCI (e.g., provided by the higher layer parameter ServCellIndex). In the present disclosure, a non-serving cell PCI can also be referred to as an additional PCI, another PCI or a different PCI (with respect to the serving cell PCI).

The UE could be higher layer configured by the network (e.g., via higher layer RRC signaling) a pool of TCI states. The TCI state pool could comprise of TCI states for both the serving cell (associated with the serving cell PCI) and the non-serving (or neighboring) cell(s)/TRP(s)—associated with the non-serving cell PCI(s). The UE could be indicated by the network one or more TCI states indicating one or more QCL source RSs; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. If the UE could identify which TRP, i.e., either the serving cell TRP or the non-serving (or neighboring)

TRP(s), the TCI state(s) is associated with, the UE could know from which TRP, i.e., either the serving cell TRP or the non-serving (or neighboring) TRP(s), the QCL source RS(s) indicated in the corresponding TCI state(s) is transmitted. The UE could then adjust the receive parameters such as spatial domain receive filter to receive the downlink RSs/channels from the corresponding serving cell TRP or the non-serving (or neighboring) cell TRP(s). In the following, several design options for associating the TCI states and the serving/non-serving (or neighboring) cell TRPs are presented.

The TCI states in the higher layer configured TCI state pool can be grouped into G_tci≥1 groups, each associated with a TCI state group identifier (ID)/index. In this disclosure, the TCI state group ID/index could be a PCI value, a CORESETPoolIndex value, a TRP ID/index, a TRP-specific higher layer signaling index value, a one-bit flag indicator and/or etc. The TCI states within the same TCI state group, and therefore, associated with the same TCI state group ID/index, can be associated with either a serving cell/TRP or a non-serving (or neighboring) cell/TRP. Different TCI state groups could be mutually exclusive such that a TCI state belongs to a TCI state group cannot be in a different TCI state group with a different TCI state group ID/index.

Figure 14A:
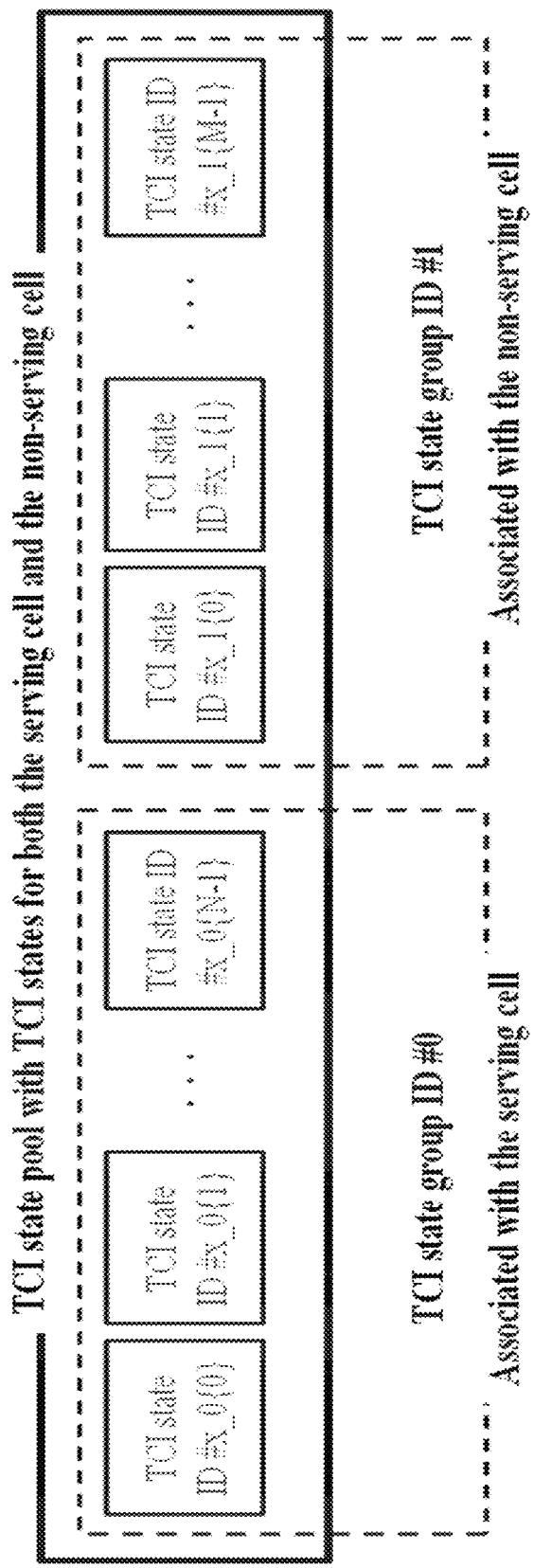
FIG. 14A illustrates an example of TCI state groups and their associations with serving/non-serving cell PCIs according to embodiments of the present disclosure.

FIG. 14A illustrates an example of TCI state groups and their associations with serving/non-serving cell PCIs 1400 according to embodiments of the present disclosure. An embodiment of the TCI state groups and their associations with serving/non-serving cell PCIs 1400 shown in FIG. 14A is for illustration only.

In Example-1.1A, an inter-cell system comprising of a serving cell/TRP and a single (Nnsc=1) non-serving (or neighboring) cell/TRP is considered. In FIG. 14A, the TCI states in the higher layer RRC configured TCI state pool are grouped into two groups, each associated with a TCI state group ID/index. As aforementioned, the TCI state group ID/index could be a PCI value, a CORESETPoolIndex value, a TRP ID/index, a TRP-specific higher layer signaling index value, a one-bit flag indicator and/or etc. The TCI states within the same TCI state group, i.e., with the same TCI state group ID, are associated with either the serving cell/TRP or the non-serving (or neighboring) cell/TRP. As can be seen from the example shown in FIG. 14A, the TCI states in the TCI state group with TCI state group ID #0 {TCI state #x_0{0}, TCI state #x_0{1}, . . . , TCI state #x_0{N−1}} are associated with the serving cell PCI, and the TCI states in the TCI state group with TCI state group ID #1 {TCI state #x_1{0}, TCI state #x_1{1}, . . . , TCI state #x_1{M−1}} are associated with the non-serving (or neighboring) cell PCI different from the serving cell PCI.

Figure 14B:
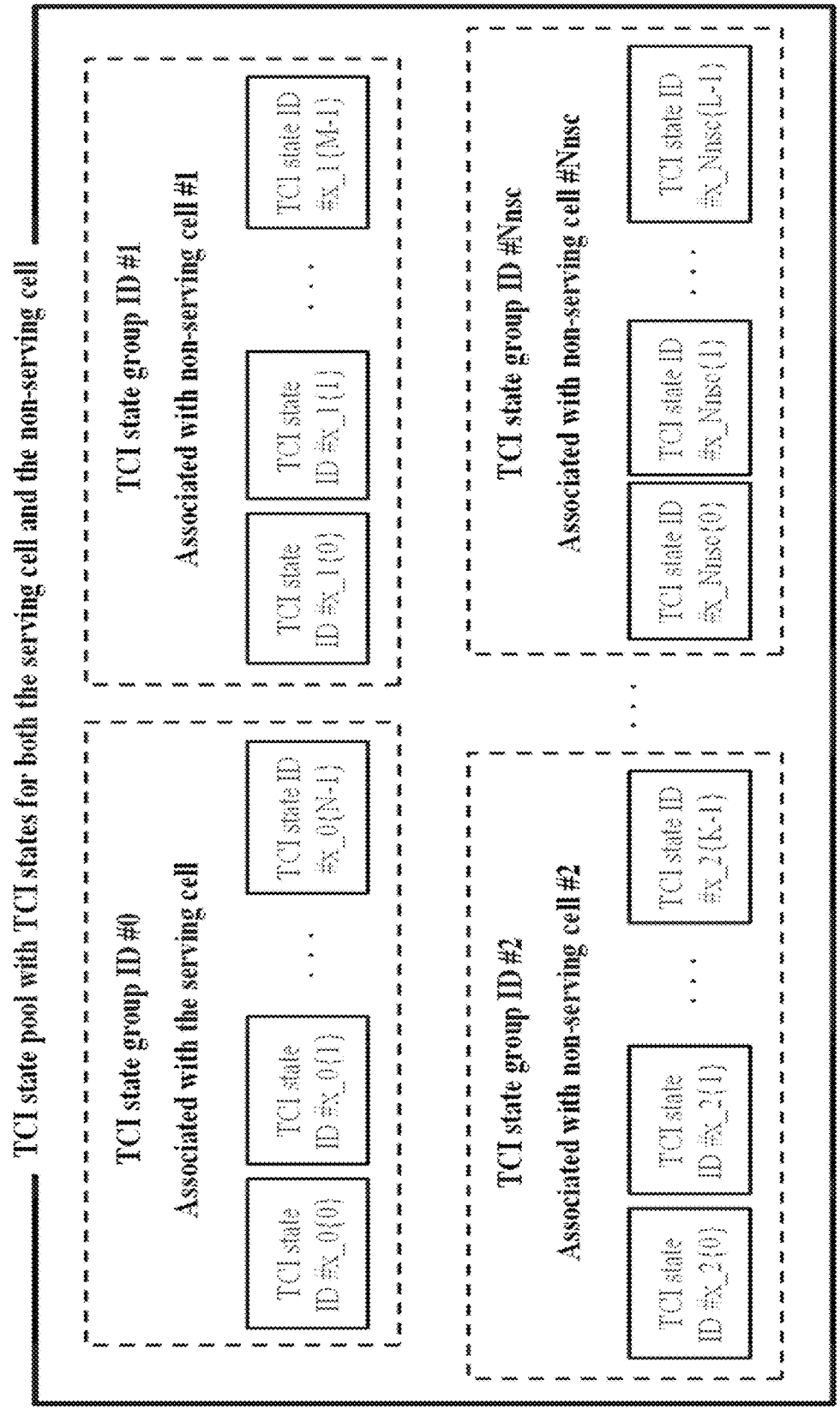
FIG. 14B illustrates another example of TCI state groups and their associations with serving/non-serving cell PCIs according to embodiments of the present disclosure.

FIG. 14B illustrates another example of TCI state groups and their associations with serving/non-serving cell PCIs 1450 according to embodiments of the present disclosure. An embodiment of the TCI state groups and their associations with serving/non-serving cell PCIs 1450 shown in FIG. 14B is for illustration only.

In Example-1.2A, an inter-cell system comprising of a serving cell/TRP and more than one (Nnsc>1) non-serving cells/TRPs is considered. In FIG. 14B, the TCI states in the TCI state pool are grouped into (Nnsc+1) groups, each associated with a TCI state group ID/index. As aforementioned, the TCI state group ID/index could be a PCI value, a CORESETPoolIndex value, a TRP ID/index, a TRP-specific higher layer signaling index value, a one-bit flag indicator and/or etc. The TCI states within the same TCI state group, i.e., associated with the same TCI state group ID, are associated with either the serving cell/TRP or a non-serving (or neighboring) cell/TRP. As can be seen from the example shown in FIG. 14B, the TCI states in the TCI state group with TCI state group ID #0 {TCI state #x_0{0}, TCI state #x_0{1}, . . . , TCI state #x_0{N−1}} are associated with the serving cell/TRP—associated with the serving cell PCI, the TCI states in the TCI state group with TCI state group ID #1 {TCI state #x_1{0}, TCI state #x_1{1}, . . . , TCI state #x_1{M−1}} are associated with the non-serving (or neighboring) cell TRP #1 having a PCI different from the serving cell PCI, the TCI states in the TCI state group with TCI state group ID #2 {TCI state #x_2{0}, TCI state #x_2{1}, . . . , TCI state #x_2{K−1}} are associated with the non-serving (or neighboring) cell TRP #2 having a PCI different from the serving cell PCI, and so on, and the TCI states in the TCI state group with TCI state group ID #Nnsc {TCI state #x_Nnsc{0}, TCI state #x_Nnsc{1}, . . . , TCI state #x_Nnsc{L−1}} are associated with the non-serving (or neighboring) cell TRP #Nnsc having a PCI different from the serving cell PCI.

Various means of indicating the association between a TCI state group ID/index and one or more indicated TCI states are presented below.

In one example (example-i), the association between a TCI state group ID/index and one or more indicated TCI states is fixed in the system specifications. For instance, for an inter-cell system comprising the serving cell PCI and a PCI different from the serving cell PCI, the first half of the TCI states in the higher layer RRC configured TCI state pool could be grouped into a TCI state group associated with the serving cell PCI (or the non-serving cell PCI), and the second half of the TCI states in the higher layer RRC configured TCI state pool could be grouped into another TCI state group associated with the non-serving cell PCI (or the serving cell PCI).

In another example (example-ii), the UE could be provided by the network, e.g., via higher layer RRC signaling, MAC CE or DCI based signaling, the number of configured TCI state groups and the number of TCI states in each TCI state group. The TCI state IDs/indexes are consecutive in increasing (or decreasing) order within the same TCI state group or across different TCI state groups. The TCI state group IDs/indexes are consecutive in increasing (or decreasing) order across different TCI state groups.

In yet another example (example-iii), the UE could be provided by the network, e.g., via higher layer RRC signaling, MAC CE or DCI based signaling, one or more 'TCI state group' fields. Each 'TCI state group' field could contain at least a TCI state group ID/index and one or more TCI states or TCI state IDs/indexes.

FIG. 15A illustrates an example of indicating TCI state group ID/index in TCI-State and QCL-Info 1500 according to embodiments of the present disclosure. An embodiment of indicating the TCI state group ID/index in TCI-State and QCL-Info 1500 shown in FIG. 15A is for illustration only.

TABLE 14

TCI state group ID/index in TCI-state
and TCI state group ID/index in QCL-Info
TCI state group ID/index in TCI-State
TCI state group ID/index in QCL-Info

| | |
|---|---|
| TCI-State ::= | SEQUENCE { |
| tci-StateId | TCI-StateId, |
| tci-StateGroupId | TCI-StateGroupId, |
| qcl-Type1 | QCL-Info |
| qcl-Type2 | QCL-Info        OPTIONAL, --- Need R |
| ... | |

TABLE 14-continued

TCI state group ID/index in TCI-state
and TCI state group ID/index in QCL-Info
TCI state group ID/index in TCI-State
TCI state group ID/index in QCL-Info

```
}
QCL-Info ::=              SEQUENCE {
  tci-StateGroupId        TCI-StateGroupId,
  cell                    ServCellIndex    OPTIONAL, -- Need R
  bwp-Id                  BWP-Id           OPTIONAL, -- Cond
                                           CSI-RS-Indicated
  referenceSignal         CHOICE {
    csi-rs                NZP-CSI-RS-ResourceId,
    ssb                   SSB-Index
  },
  qcl-Type                ENUMERATED {typeA, typeB, typeC, typeD},
  ...
}
```

In yet another example (example-iv), the higher layer parameter, e.g., TCI-State or QCL-Info, configuring a TCI state could include a TCI state group ID/index. A conceptual example of indicating a TCI state group ID/index in the higher layer parameter TCI-State is provided in FIG. 15A, and a conceptual example of indicating a TCI state group ID/index in the higher layer parameter QCL-Info is also presented in FIG. 15A. The corresponding RRC parameters are given in TABLE 14.

In yet another example (example-v), the UE could receive from the network, e.g., via RRC, MAC CE or DCI based signaling, G_tci bitmaps. Each bitmap is associated with a TCI state group (with a TCI state group ID/index) and has N_tci bit positions, where N_tci is the total number of TCI states in the RRC configured TCI state pool. Each bit position in a bitmap corresponds to a TCI state in the RRC configured TCI state pool. If a bit position in a bitmap is set to '1', the TCI state associated to the bit position is (included) in the TCI state group associated to the bitmap.

FIG. 15B illustrates an example of a MAC CE command indicating a TCI state group comprising one or more TCI states 1550 according to embodiments of the present disclosure. An embodiment of the MAC CE command indicating the TCI state group comprising the one or more TCI states 1550 shown in FIG. 15B is for illustration only.

In yet another example (example-vi), the UE could receive from the network G_tci MAC CE commands. Each MAC CE command is associated with a TCI state group (with a TCI state group ID/index). Each MAC CE command could include/indicate one or more TCI states or TCI state IDs/indexes. The TCI states or TCI state IDs/indexes indicated/included in a MAC CE command are (included) in the TCI state group associated with the MAC CE command. In FIG. 15B, a conceptual example of using MAC CE command to indicate a TCI state group comprising one or more TCI states or TCI state IDs/indexes is given. As can be seen from FIG. 15B, the MAC CE command contains a field indicating the TCI state group ID/index (e.g., TCI state group ID #y_0 in FIG. 15B), and one or more fields indicating the TCI states/TCI state IDs/indexes (e.g., TCI state IDs #x_0, #x_1, . . . , #x_N in FIG. 15B) that belong to/are associated with the indicated TCI state group ID/index (e.g., the TCI state group ID #y_0 in FIG. 15B).

In yet another example (example-vii), the UE could be indicated by the network the association/mapping between one or more TCI states/TCI state IDs/indexes and one or more TCI state groups/TCI state group IDs/indexes; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be indicated by the network, e.g., via RRC signaling and/or MAC CE command and/or DCI based signaling, that a TCI state with TCI state ID/index #i belongs to/is associated with a TCI state group with TCI state group ID/index #j, where i∈I and j∈J; I contains all TCI state IDs/indexes and J contains all TCI state group IDs/indexes (e.g., 0, 1, . . . , G_tci−1).

In yet another example (example-viii), the UE could receive from the network one or more MAC CE activation commands. Each MAC CE activation command activates one or more TCI states or TCI state IDs/indexes from the higher layer RRC configured pool/list/set of TCI states. The one or more TCI states or TCI state IDs/indexes activated by the same MAC CE activation command could be associated with the same TCI state group/TCI state group ID/index. The TCI state group ID/index could be included/indicated in the corresponding MAC CE activation command. The UE could receive from the network G_tci MAC CE activation commands as described above each associated with a TCI state group (with a TCI state group ID/index).

Various design options of configuring the TCI state group ID(s)/index(es) for inter-cell operation are provided below.

In one example of Option-1A, for a single non-serving (or neighboring) cell/TRP in the multi-TRP system (Nnsc=1) as discussed in Example-1.1A in the present disclosure, the TCI state group ID/index indicated in the higher layer parameter TCI-State/QCL-Info could be a 1-bit flag, e.g., using either 0 or 1 to indicate either the serving cell/TRP (with the serving cell PCI) or the non-serving (or neighboring) cell/TRP (with a PCI different from the serving cell PCI). In this case, if the one-bit flag indicator is configured as '0' or 'on' or 'enabled' in a higher layer parameter TCI-State/QCL-Info, the corresponding TCI state (and therefore, the QCL source RS(s) indicated therein) is associated with the serving cell/TRP. Furthermore, if the one-bit flag indicator is configured as '1' or 'off' or 'disabled' in a higher layer parameter TCI-State/QCL-Info, the corresponding TCI state (and therefore, the QCL source RS(s) indicated therein) is associated with the non-serving cell/TRP. The TCI states configured with the same value of the one-bit flag indicator, e.g., either 0 or 1, belong to the same TCI state group.

For more than one non-serving (or neighboring) cells/TRPs in the multi-TRP system (Nnsc>1) as discussed in Example-1.2A in the present disclosure, the TCI state group ID/index indicated in the higher layer parameter TCI-State/QCL-Info could be a multi-bit indicator, e.g., n_b bits, to indicate the serving cell/TRP (with the serving cell PCI) and/or the non-serving cells/TRPs (with PCIs different from the serving cell PCI). For instance, the TCI state group IDs/indexes could be configured as $\{0, 1, \ldots, 2^{n\_b}-1\}$ or $\{1, 2, \ldots, 2^{n\_b}\}$.

For Nnsc>1 non-serving (or neighboring) cells/TRPs, in one example, n_b could be ceil(log 2 (Nnsc+1)), where ceil(x) rounds x up to the next largest integer. The first state of the multi-bit indicator (e.g., TCI state group ID/index 0) could correspond to the serving cell/TRP, and the remaining $2^{n\_b}-1$ states (e.g., TCI state group IDs/indexes 1, 2, . . . , $2^{n\_b}-1$) of the multi-bit indicator could correspond to the non-serving cells/TRPs.

For Nnsc>1 non-serving (or neighboring) cells/TRPs, in another example, if the TCI state group ID/index is not configured/enabled or is absent in the higher layer parameter TCI-State/QCL-Info, the UE could expect that the corresponding TCI state, and therefore, the QCL source RS(s) indicated therein, is associated with the serving cell/TRP having the serving cell PCI. In this case, the TCI state group ID/index (the multi-bit indicator) indicated in the higher layer parameter TCI-State/QCL-Info could only indicate the non-serving cell PCIs. For more than one (Nnsc>1) non-serving (or neighboring) cell PCIs, n_b could be ceil(log 2 (Nnsc)). For this case, all the $2^{N\_b}$ states of the multi-bit indicator (e.g., TCI state group IDs/indexes 0, 1, 2, ..., $2^{n\_b}-1$ or 1, 2, ..., $2^{n\_b}$) could correspond to the non-serving (or neighboring) cells/TRPs.

For Nnsc>1 non-serving (or neighboring) cells/TRPs in the inter-cell system, the UE could be indicated/configured by the network the association/mapping relationship between the states of the multi-bit indicator (and therefore, the corresponding TCI state group IDs/indexes) and the serving/non-serving (or neighboring) cells/TRPs, e.g., in term of their PCIs.

In one example, the UE could be configured by the network (e.g., via higher layer RRC signaling) a list/set/pool of TRP-specific ID/index values such as PCIs, CORESETPoolIndex values, TRP ID/index values or TRP-specific higher layer signaling index values for the serving cell/TRP or the non-serving cells/TRPs. The UE could also receive from the network a MAC CE command (or a bitmap or a DCI) activating/indicating one or more TRP-specific ID/index values from the list/set/pool of TRP-specific ID/index values such as PCIs, CORESETPoolIndex values, TRP ID/index values or TRP-specific higher layer signaling index values.

The first state of the multi-bit indicator or the first TCI state group ID/index or the lowest TCI state group ID/index value could be associated with the first (or the last) entry/TRP in the list/set/pool of (MAC CE activated) TRP-specific ID/index values, the second state of the multi-bit indicator or the second TCI state group ID/index or the second lowest TCI state group ID/index value could be associated with the second (or the second last) entry/TRP in the list/set/pool of (MAC CE activated) TRP-specific ID/index values, and so on, and the last state of the multi-bit indicator or the last TCI state group ID/index or the highest TCI state group ID/index value could be associated with the last (or the first) entry/TRP in the list/set/pool of (MAC CE activated) TRP-specific ID/index values. Other explicit methods of associating/mapping between the states of the multi-bit indicator (and therefore, the corresponding TCI state group IDs/indexes) and the serving/non-serving (or neighboring) cells/TRPs are also possible.

In another example, the UE could be configured by the network (e.g., via higher layer RRC signaling) a list/set/pool of TRP-specific ID/index values such as PCIs, CORESETPoolIndex values, TRP ID/index values or TRP-specific higher layer signaling index values for the serving cell/TRP or the non-serving cells/TRPs. The UE could also receive from the network a MAC CE command (or a bitmap or a DCI) activating/indicating one or more TRP-specific ID/index values from the list/set/pool of TRP-specific ID/index values such as PCIs, CORESETPoolIndex values, TRP ID/index values or TRP-specific higher layer signaling index values.

The first state of the multi-bit indicator or the first TCI state group ID/index or the lowest TCI state group ID/index value could be associated with the lowest (or the highest) TRP-specific ID/index value such as PCI value in the list/set/pool of (MAC CE activated) TRP-specific ID/index values, the second state of the multi-bit indicator or the second TCI state group ID/index or the second lowest TCI state group ID/index value could be associated with the second lowest (or the second highest) TRP-specific ID/index value such as PCI value in the list/set/pool of (MAC CE activated) TRP-specific ID/index values, and so on, and the last state of the multi-bit indicator or the last TCI state group ID/index or the highest TCI state group ID/index value could be associated with the highest (or the lowest) TRP-specific ID/index value such as PCI value in the list/set/pool of (MAC CE activated) TRP-specific ID/index values. Other implicit methods of associating/mapping between the states of the multi-bit indicator (and therefore, the corresponding TCI state group IDs/indexes) and the serving/non-serving (or neighboring) cells/TRPs are also possible.

In one example of Option-2A, for an inter-cell system (e.g., an inter-cell multi-TRP system) comprising of a serving cell/TRP and a single non-serving (or neighboring) cell/TRP (Nnsc=1), the serving cell or the serving cell PCI with one or more active TCI states for PDCCH/PDSCH and the non-serving (or neighboring) cell PCI with one or more active TCI states for PDCCH/PDSCH are associated with different values of CORESETPoolIndex if the CORESETPoolIndex is configured. For example, the serving cell PCI with one or more active TCI states for PDCCH/PDSCH could be associated with 'CORESETPoolIndex=0', while the non-serving (or neighboring) cell PCI with one or more active TCI states for PDCCH/PDSCH could be associated with 'CORESETPoolIndex=1'. For another example, the serving cell PCI with one or more active TCI states for PDCCH/PDSCH could be associated with 'CORESETPoolIndex=1', while the non-serving (or neighboring) cell with one or more active TCI states for PDCCH/PDSCH could be associated with 'CORESETPoolIndex=0'.

Or equivalently, when/if the UE is configured with/provided by the network the higher layer parameter interCellBeamManagement or interCellBeamOperation or NumberofAdditionalPCI or AdditionalPCIInfo or etc. and with PDCCH-Config that contains two different CORESETPoolIndex values in CORESET, different PCIs could be associated with different CORESETPoolIndex values, and therefore, the CORESETs corresponding to different CORESETPoolIndex values via the active TCI states of the CORESETs. That is, CORESETs corresponding to one CORESETPoolIndex value (e.g., 'CORESETPoolIndex=0') could be associated with a first PCI (e.g., the serving cell PCI), and CORESETs corresponding to another CORESETPoolIndex value (e.g., 'CORESETPoolIndex=1') could be associated with a second PCI (e.g., the non-serving cell PCI). The first and second PCIs could be different, and one of them (i.e., either the first PCI or the second PCI) could correspond to the serving cell PCI.

As aforementioned, a TCI state group ID/index could correspond to/be configured as a CORESETPoolIndex, and explicitly indicated in the TCI state (e.g., in the higher layer parameter TCI-State/QCL-Info) as shown in FIG. 15A and TABLE 14. Alternatively, the CORESETPoolIndex value(s) could be explicitly indicated in the higher layer parameter TCI-State/QCL-Info similar to the explicit TCI state group ID/index indication in the higher layer parameter TCI-state/QCL-Info as shown in FIG. 15A and TABLE 14.

The UE could be indicated/configured by the network a TCI state associated with a CORESETPoolIndex, and therefore, the corresponding PCI value as discussed above. If the value of the corresponding CORESETPoolIndex is 0, the UE would know that the QCL source RS(s) indicated in the corresponding TCI state via the higher layer parameter TCI-State/QCL-Info is associated with the serving cell PCI. If the value of the corresponding CORESETPoolIndex is 1, the UE would know that the QCL source RS(s) indicated in the corresponding TCI state via the higher layer parameter TCI-State/QCL-Info is associated with the non-serving cell/TRP having a PCI different from the serving cell PCI.

Or equivalently, when/if the UE is configured with/provided by the network the higher layer parameter interCellBeamManagement or interCellBeamOperation or NumberofAdditionalPCI or AdditionalPCIInfo or etc. and with PDCCH-Config that contains two different CORESETPoolIndex values in CORESET, and if the UE receives from the network a MAC CE activation command—e.g., for CORESET(s) associated with each CORESETPoolIndex (as described in clause 6.1.3.14 of TS 38.321) used to map up to 8 TCI states to the codepoints of the DCI field "Transmission Configuration Indication", the activated TCI states corresponding to one CORESETPoolIndex value (e.g., 'CORESETPoolIndex=0') could be associated with a first PCI (e.g., the serving cell PCI), and the activated TCI states corresponding to another CORESETPoolIndex value (e.g., 'CORESETPoolIndex=1') could be associated with a second PCI (e.g., the non-serving cell PCI). The first and second PCIs could be different, and one of them (i.e., either the first PCI or the second PCI) could correspond to the serving cell PCI.

In one example of Option-3A, the TCI states in the TCI state pool comprising of the TCI states for both the serving cell and the non-serving cell(s) can be grouped into multiple groups. Furthermore, the TCI state IDs of all the TCI states in the TCI state pool are different such that the they are unique for the given TCI states. For instance, the TCI state IDs of all the TCI states in the TCI state pool comprising the TCI states for both the serving cell and the non-serving cell(s) are coded/indexed in a consecutive manner such as TCI state #0, TCI state #1, TCI state #2, ..., TCI state #Ntot−1, assuming that the total number of TCI states in the TCI state pool is Ntot.

Figure 16A:
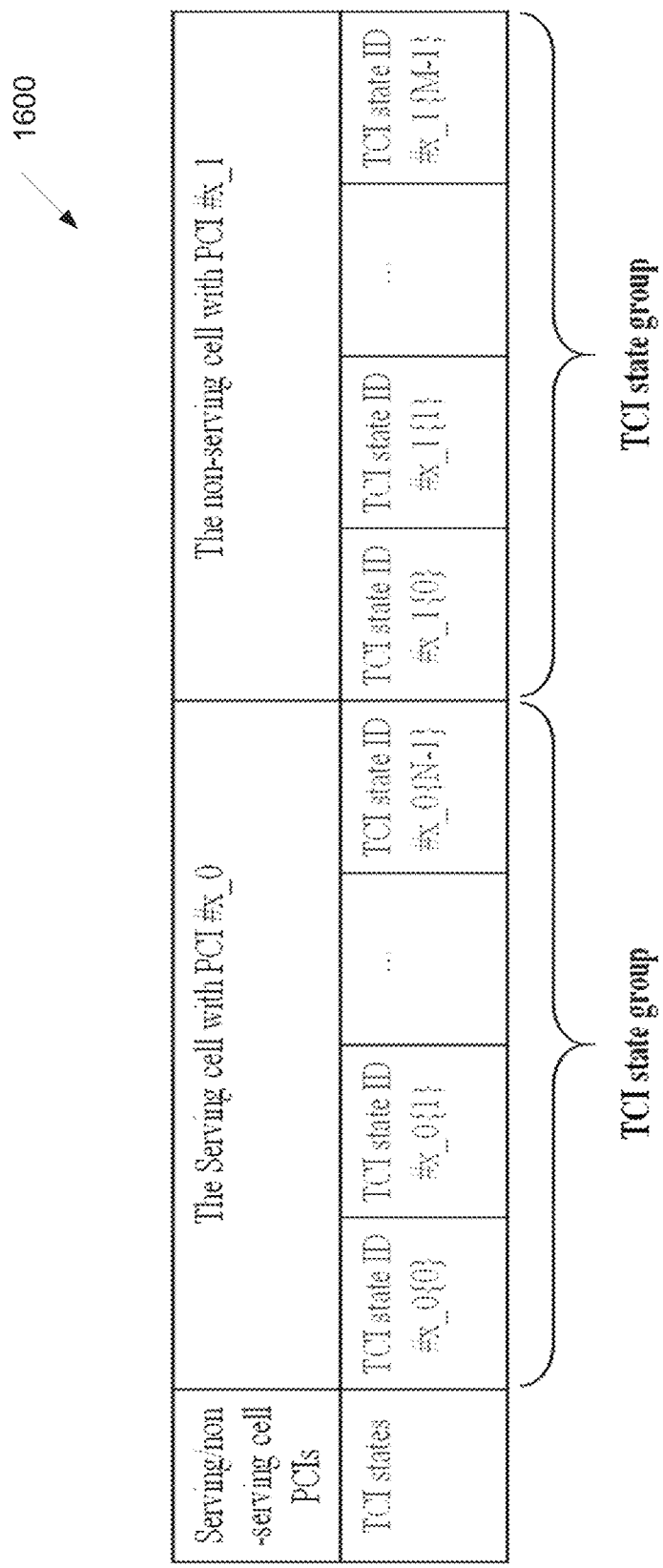
FIG. 16A illustrates an example of TCI state grouping for inter-cell operation according to embodiments of the present disclosure.

FIG. 16A illustrates an example of TCI state grouping for inter-cell operation 1600 according to embodiments of the present disclosure. An embodiment of the TCI state grouping for inter-cell operation 1600 shown in FIG. 16A is for illustration only.

The UE could be explicitly indicated/configured by the network the association rule(s)/mapping relationship(s) between the TCI state groups and the serving/non-serving cells. One example of the mapping relationship between the TCI state groups and the serving/non-serving cells is presented in FIG. 16A assuming a single non-serving cell TRP in the system. In this example, the TCI state IDs #x_0{0}, #x_0{1}, ..., #x_0{N−1}, #x_1{0}, #x_1{1}, ..., #x_1{M−1} are all different from each other.

FIG. 16B illustrates another example of TCI state grouping for inter-cell operation 1650 according to embodiments of the present disclosure. An embodiment of the TCI state grouping for inter-cell operation 1650 shown in FIG. 16B is for illustration only.

In FIG. 16B, one example characterizing the mapping relationship between the TCI state groups and the serving cell and Nnsc>1 non-serving cells is presented. In this example, the TCI state IDs #x_0{0}, #x_0{1}, ..., #x_0{N−1}, #x_1{0}, #x_1{1},..., #x_1{M−1}, #x_2{0}, #x_2{1}, ..., #x_2{K−1}, #x_Nnsc{0}, #x_Nnsc{1}, ..., #x_Nnsc{L−1} are all different from each other. That is, for a system comprising of a single non-serving cell TRP or Nnsc>1 non-serving cells, the UE could be indicated by the network the table depicted in FIG. 16A or the table in FIG. 16B to differentiate the indicated TCI states, and therefore, the corresponding QCL source RSs, between the serving cell and the non-serving cell(s).

Alternatively, the UE could know the mapping relationship between the TCI states in the TCI state pool comprising of the TCI states for both the serving cell and the non-serving cell(s) in an implicit manner. Certain TCI states/TCI state groups are reserved for the serving cell and the non-serving cells. For instance, for a system comprising of a single non-serving cell, the first N_TCI states in the TCI state pool indexed as #x_0{0}, #x_0{1}, ..., x_0{N−1} are reserved for the serving cell, while the remaining M TCI states in the TCI state pool indexed as #x_1{0}, #x_1{1}, ..., x_1{M−1} are reserved for the non-serving cell, which is known to the UE, e.g., via network indication/configuration.

For a system comprising of more than one (Nnsc>1) non-serving cells, the TCI states in the TCI state pool with consecutively indexed/coded TCI state IDs are formed as different TCI state groups, which is known to the UE, e.g., via network indication/configuration. The lowest/smallest PCI is associated with a first TCI state group having the TCI state with the lowest/smallest TCI state ID among all TCI states in the TCI state pool, the second lowest/smallest PCI is associated with a second TCI state group having the TCI state with the lowest/smallest TCI state ID among all TCI states that is larger than the highest/largest TCI state ID in the first TCI state group, and so on, and the highest/largest PCI is associated with a (Nnsc+1)-th TCI state group having the TCI state with the highest/largest TCI state ID among all TCI states in the TCI state pool. Other association rules/mapping relationships are also possible.

In one example of Option-4A, the RS IDs/indices in all the TCI states in the TCI state pool comprising of the TCI states for both the serving cell and the non-serving cells for the purpose of indicating the QCL source RS are all different from each other. For instance, the RS IDs/indices in all the TCI states in the TCI state pool could be coded in a consecutive manner such as RS ID #0, #1, ..., #Ntot−1 assuming that the total number of TCI states in the TCI state pool is Ntot, and each RS ID is associated with a TCI state in the TCI state pool. In this disclosure, the RS IDs/indices in the TCI states could be referred to as global RS IDs/indices. Further, the actual RSs such as SSBs/CSI-RSs transmitted from a serving/non-serving cell are locally indexed at the corresponding cell.

For instance, the SSBs transmitted from the serving cell could be locally indexed from #0, #1, ..., #Msc−1, while the SSBs transmitted from a non-serving cell could be locally indexed from #0, #1, ..., #Mnsc−1. The local RS IDs/indices from the serving and the non-serving cells could be mapped to/associated with the global RS IDs/indices in the TCI states. The UE could be indicated/configured by the network the association rule(s)/mapping relationship(s) between the global RS IDs/indices in the TCI states in the TCI state pool and the local RS IDs/indices from the serving/non-serving cells.

FIG. 17 illustrates an example of TCI state grouping based on QCL source RS IDs 1700 according to embodiments of the present disclosure. An embodiment of the TCI state grouping based on the QCL source RS IDs 1700 shown in FIG. 17 is for illustration only.

In FIG. 17, an example characterizing the mapping relationship between the local RS IDs and the global RS IDs for a system comprising of a single non-serving cell is presented. As can be seen from FIG. 17, the local RS IDs RS-ID #0, RS-ID #1, ..., RS-ID #Msc−1 from the serving cell PCI #x_0 are mapped to the global RS IDs RS ID #x_0{0}, RS ID #x_0{1}, . . . , RS ID #x_0{N−1} in the TCI states, and the local RS IDs RS-ID #0, RS-ID #1, . . . , RS-ID #Mnsc−1 from the non-serving cell PCI #x_1 are mapped to the global RS IDs RS ID #x_1{0}, RS ID #x_1{1}, . . . , RS ID #x_1{M−1} in the TCI states. As discussed before, all the global RS IDs RS ID #x_0{0}, RS ID #x_0{1}, . . . , RS ID #x_0{N−1}, RS ID #x_1{0}, RS ID #x_1{1}, . . . , RS ID #x_1{M−1} in the TCI states are different. E.g., the RS IDs could correspond to #0, #1, . . . , #Ntot−1 assuming that the total number of TCI states in the TCI state pool is Ntot.

Furthermore, as can be seen from FIG. 17, by mapping the local RS IDs from a given cell (either the serving cell or the non-serving cell) to the global RS IDs in the TCI states, the TCI states in the TCI state pool are also implicitly grouped and mapped to either the serving cell or the non-serving cell. For instance, the TCI states with IDs #x_0{0}, #x_0{1}, . . . , x_0{N−1} are regarded as one TCI state group based on the mapping of the local RS IDs from the serving cell and the global RS IDs in the TCI states, and the TCI is mapped to/associated with the serving cell PCI #x_0. Similarly, the TCI states with IDs #x_1{0}, #x_{1}, . . . , x_1{M−1} are regarded as another TCI state group based on the mapping of the local RS IDs from the non-serving cell and the global RS IDs in the TCI states, and the TCI is mapped to/associated with the non-serving cell PCI #x_1. That is, for a system comprising of a single non-serving cell, the UE could be indicated/configured by the network via higher layer RRC signaling the table shown in FIG. 17 for receiving the TCI state indications from both the serving cell and the non-serving cell.

The provided design for a system comprising of a single non-serving cell can be extended to the system comprising of more than one (Nnsc>1) non-serving cells (similar to extending the table in FIG. 16A for a single non-serving cell to the table shown in FIG. 16B for more than one non-serving cells).

The UE could know the mapping relationship(s)/association rule(s) between the global RS IDs in the TCI states in the TCI state pool comprising of the TCI states for both the serving cell and the non-serving cell(s) and the local RS IDs from each of the serving/non-serving cells in the system in an implicit manner. For instance, for a system comprising of a single non-serving cell, the first N global RS IDs in the TCI states indexed as RS ID #x_0{0}, #x_0{1}, . . . , x_0{N−1} are reserved for the serving cell, while the remaining M global RS IDs in the TCI states indexed as RS ID #x_1{0}, #x_1{1}, . . . , x_1{M−1} are reserved for the non-serving cell, which is known to the UE, e.g., via a network indication/configuration.

For a system comprising of more than one (Nnsc>1) non-serving cells, the global RS IDs in the TCI states in the TCI state pool could be consecutively indexed/coded and formed as different global RS ID groups, which is known to the UE, e.g., via a network indication/configuration. The lowest/smallest PCI is associated with a first global RS ID group having the lowest/smallest global RS ID among all global RS IDs in the TCI states, the second lowest/smallest PCI is associated with a second global RS ID group having the lowest/smallest global RS ID among all the global RS IDs in the TCI states that is larger than the highest/largest global RS ID in the first global RS ID group, and so on, and the highest/largest PCI is associated with a (Nnsc+1)-th global RS ID group having the highest/largest global RS ID among all global RS IDs in the TCI states in the TCI state pool. Other association rules/mapping relationships are also possible.

The UE could be configured/indicated by the network via higher layer RRC signaling which design option(s) (e.g., Option-1A, Option-2A, Option-3A, and Option-4A described above) to follow to receive and identify the non-serving cell RS(s) as the QCL source RS(s). The UE could be configured/indicated by the network via higher layer RRC signaling one or more priority rules to execute different design options such as Option-1A, Option-2A, Option-3A, and Option-4A described above.

For instance, if CORESETPoolInde is configured, the UE would follow Option-2A to receive and identify the non-serving cell RS(s) from the indicated TCI state(s). If the CORESETPoolIndex is not configured, the UE could first follow Option-1A. Other priority rules are also possible depending on the system requirements. Further, more than one design options such as Option-1A, Option-2A, Option-3A, and Option-4A described above can be used together.

For instance, Option-1A with 1-bit TCI state group index indication can be jointly used with Option-4A to indicate the TCI states, and therefore the corresponding QCL source RSs, for/from more than one (Nnsc>1) non-serving cells.

The above discussed Option-1A, Option-2A, Option-3A and Option-4A for configuring the TCI state group ID(s)/index(es) for inter-cell operation could be applied to the example-i, example-ii, example-iii, example-iv, example-v, example-vi, example-vii and example-viii in the present disclosure.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to receive configuration information including two different control resource set (CORESET) pool index values by a higher layer signaling; and
a processor operably coupled to the transceiver, the processor configured to identify an association between different cells and different CORESETs via transmission configuration indication (TCI) states,
wherein first CORESETs corresponding to a first CORESET pool index value are associated with a first cell and second CORESETs corresponding to a second CORESET pool index value are associated with a second cell,
wherein first TCI states of the TCI states are associated with the first CORESET pool index value and second TCI states of the TCI states are associated with the second CORESET pool index value, and
wherein first TCI states for the first cell of the TCI states include first quasi co-location (QCL) information including an identifier of the first cell and second TCI states for the second cell of the TCI states include second QCL information including an identifier of the second cell.

2. The UE of claim 1, wherein the transceiver is further configured to receive TCI state configuration information or QCL information including the first QCL information and the second QCL information.

3. The UE of claim 1, wherein:
the first cell is a serving cell and the second cell is a non-serving cell, and
the two different CORESET pool index values are contained in a higher layer parameter PDCCH-Config received via the higher layer signaling.

4. The UE of claim 1, wherein:
the transceiver is further configured to transmit a channel state information (CSI) report including a beam report associated with a non-serving cell,
the beam report includes at least one of a reference signals received power (RSRP), a differential RSRP, a synchronization signal block (SSB) resource indicator (SSBRI), and a CSI-RS resource indicator (CRI).

5. The UE of claim 4, wherein:
the beam report includes the RSRP that is based on a largest measured RSRP value and is quantized to a 7-bit value in a range of [−140,−44] decibel-milliwatts (dBm) with a 1 decibel (dB) step size, and
the beam report includes the differential RSRP that is quantized to a 4-bit value with a 2 dB step size with reference to the largest measured RSRP value.

6. A base station (BS), comprising:
a transceiver configured to transmit configuration information including two different control resource set (CORESET) pool index values by a higher layer signaling,
wherein different cells and different CORESETs are associated via transmission configuration indication (TCI) states,
wherein first CORESETs corresponding to a first CORESET pool index value are associated with a first cell and second CORESETs corresponding to a second CORESET pool index value are associated with a second cell,
wherein first TCI states of the TCI states are associated with the first CORESET pool index value and second TCI states of the TCI states are associated with the second CORESET pool index value, and
wherein first TCI states for the first cell of the TCI states include first quasi co-location (QCL) information including an identifier of the first cell and second TCI states for the second cell of the TCI states include second QCL information including an identifier of the second cell.

7. The BS of claim 6, wherein the transceiver is further configured to transmit TCI state configuration information or QCL information including the first QCL information and the second QCL information.

8. The BS of claim 6, wherein:
the first cell is a serving cell and the second cell is a non-serving cell, and
the two different CORESET pool index values are contained in a higher layer parameter PDCCH-Config transmitted via the higher layer signaling.

9. The BS of claim 6, wherein:
the transceiver is configured to receive a channel state information (CSI) report including a beam report associated with non-serving cell,
the beam report includes at least one of a reference signals received power (RSRP), a differential RSRP, a synchronization signal block (SSB) resource indicator (SSBRI), and a CSI-RS resource indicator (CRI).

10. The BS of claim 9, wherein:
the beam report includes the RSRP that is based on a largest measured RSRP value and is quantized to a 7-bit value in a range of [−140,−44] decibel-milliwatts (dBm) with a 1 decibel (dB) step size, and
the beam report includes the differential RSRP that is quantized to a 4-bit value with a 2 dB step size with reference to the largest measured RSRP value.

11. A method for operating a user equipment (UE), the method comprising:
receiving configuration information including two different control resource set (CORESET) pool index values by a higher layer signaling; and
identifying an association between different cells and different CORESETs via transmission configuration indication (TCI) states,
wherein first CORESETs corresponding to a first CORESET pool index value are associated with a first cell and second CORESETs corresponding to a second CORESET pool index value are associated with a second cell,
wherein first TCI states of the TCI states are associated with the first CORESET pool index value and second TCI states of the TCI states are associated with the second CORESET pool index value, and
wherein first TCI states for the first cell of the TCI states include first quasi co-location (QCL) information including an identifier of the first cell and second TCI states for the second cell of the TCI states include second QCL information including an identifier of the second cell.

12. The method of claim 11, further comprising:
receiving TCI state configuration information or QCL information including the first QCL information and the second QCL information.

13. The method of claim 11, wherein:
the first cell is a serving cell and the second cell is a non-serving cell, and
the two different CORESET pool index values are contained in a higher layer parameter PDCCH-Config received via the higher layer signaling.

14. The method of claim 11, further comprising:
transmitting a channel state information (CSI) report including a beam report associated with second cell,
wherein the beam report includes at least one of a reference signals received power (RSRP), a differential RSRP, a synchronization signal block (SSB) resource indicator (SSBRI), and a CSI-RS resource indicator (CRI).

15. The method of claim 14, wherein:
the beam report includes the RSRP that is based on a largest measured RSRP value and is quantized to a 7-bit value in a range of [−140,−44] decibel-milliwatts (dBm) with a 1 decibel (dB) step size, and
the beam report includes the differential RSRP that is quantized to a 4-bit value with a 2 dB step size with reference to the largest measured RSRP value.

16. A method for operating a base station (BS), the method comprising:
transmitting configuration information including two different control resource set (CORESET) pool index values by a higher layer signaling, wherein different cells and different CORESETs are associated via transmission configuration indication (TCI) states,
wherein first CORESETs corresponding to a first CORESET pool index value are associated with a first cell and second CORESETs corresponding to a second CORESET pool index value are associated with a second cell, wherein first TCI states of the TCI states are associated with the first CORESET pool index value and second TCI states of the TCI states are associated with the second CORESET pool index value, and wherein first TCI states for the first cell of the TCI states include first quasi co-location (QCL) information including an identifier of the first cell and second TCI states for the second cell of the TCI states include second QCL information including an identifier of the second cell.

17. The method of claim 16, further comprising:

transmitting TCI state configuration information or QCL information including the first QCL information and the second QCL information.

18. The method of claim 16, wherein:

the first cell is a serving cell and the second cell is a non-serving cell, and the two different CORESET pool index values are contained in a higher layer parameter PDCCH-Config transmitted via the higher layer signaling.

19. The method of claim 16, further comprising:

receiving a channel state information (CSI) report including a beam report associated with second cell, wherein the beam report includes at least one of a reference signals received power (RSRP), a differential RSRP, a synchronization signal block (SSB) resource indicator (SSBRI), and a CSI-RS resource indicator (CRI).

20. The method of claim 19, wherein:

the beam report includes the RSRP that is based on a largest measured RSRP value and is quantized to a 7-bit value in a range of [−140,−44] decibel-milliwatts (dBm) with a 1 decibel (dB) step size, and the beam report includes the differential RSRP that is quantized to a 4-bit value with a 2 dB step size with reference to the largest measured RSRP value.

* * * * *